US009625025B2

(12) United States Patent
Creager

(10) Patent No.: US 9,625,025 B2
(45) Date of Patent: Apr. 18, 2017

(54) INBOARD SPRING ARRANGEMENT FOR A CLUTCH ACTUATED DIFFERENTIAL

(71) Applicant: Eaton Corporation, Cleveland, OH (US)

(72) Inventor: Christopher W. Creager, Ypsilanti, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 15/095,838

(22) Filed: Apr. 11, 2016

(65) Prior Publication Data
US 2016/0252172 A1 Sep. 1, 2016

Related U.S. Application Data

(63) Continuation of application No. 14/203,816, filed on Mar. 11, 2014, now Pat. No. 9,334,941.
(Continued)

(51) Int. Cl.
*F16H 48/12* (2012.01)
*F16H 48/22* (2006.01)
(Continued)

(52) U.S. Cl.
CPC ............ *F16H 48/22* (2013.01); *F16D 13/56* (2013.01); *F16D 21/00* (2013.01); *F16H 48/08* (2013.01); *F16H 2048/207* (2013.01)

(58) Field of Classification Search
CPC ...... F16H 48/145; F16H 48/14; F16H 48/142; F16H 48/22; F16H 48/19; F16H 57/0426;
(Continued)

(56) References Cited

U.S. PATENT DOCUMENTS 1,477,311 A 12/1923 Cartwright
3,253,483 A 5/1966 McCaw
(Continued)

FOREIGN PATENT DOCUMENTS

EP 0 091 747 A2 10/1983
EP 0 683 333 A1 11/1995
(Continued)

*Primary Examiner* — William Kelleher
*Assistant Examiner* — Jake Cook
(74) *Attorney, Agent, or Firm* — Merchant & Gould P.C.

(57) ABSTRACT

The present disclosure relates to a differential including a differential case adapted to be rotated about an axis of rotation, and a cross-shaft operatively coupled to the differential case such that the cross-shaft and the differential case rotate together about the axis of rotation. The differential includes left and right clutch actuators having opposing inboard sides between which the cross-shaft is positioned and left and right axle hubs positioned on opposite sides of the cross-shaft. The differential includes a left clutch pack that prevents relative rotation between the left clutch actuator and the left axle hub about the axis of rotation when a left clutch engagement pressure is applied to the left clutch pack and a right clutch pack that prevents relative rotation between the right clutch actuator and the right axle hub about the axis of rotation when a right clutch engagement pressure is applied to the right clutch pack. A rotation limiting arrangement at the inboard sides of the left and right clutch actuators is provided for limiting relative rotation between the left and right clutch actuators about the axis of rotation. The rotation limiting arrangement includes a rotation limiter captured between first and second stop surfaces which cooperate to define a limited range of relative rotational movement between the left and right clutch actuators. The rotation limiter has a first location that makes line contact with the first stop surface. The rotation limiter also
(Continued)

has a second location that makes line contact with the second stop surface.

20 Claims, 32 Drawing Sheets

Related U.S. Application Data

(60) Provisional application No. 61/784,560, filed on Mar. 14, 2013, provisional application No. 61/784,595, filed on Mar. 14, 2013, provisional application No. 61/784,637, filed on Mar. 14, 2013, provisional application No. 61/784,672, filed on Mar. 14, 2013.

(51) Int. Cl.
 *F16D 13/56* (2006.01)
 *F16D 21/00* (2006.01)
 *F16H 48/08* (2006.01)
 *F16H 48/20* (2012.01)

(58) Field of Classification Search
 CPC . F16H 57/04; F16D 2041/0605; F16D 25/123
 See application file for complete search history.

(56) References Cited

U.S. PATENT DOCUMENTS

| | | |
|---|---|---|
| 3,264,900 A | 8/1966 | Hartupee |
| 3,611,833 A | 10/1971 | Baremor |
| 3,886,813 A | 6/1975 | Baremor |
| 3,906,812 A | 9/1975 | Kagata |
| 4,136,582 A | 1/1979 | Boor |
| 4,498,355 A | 2/1985 | Schou |
| 4,735,108 A | 4/1988 | Teraoka et al. |
| 4,754,661 A | 7/1988 | Barnett |
| 4,845,831 A | 7/1989 | Schou |
| 4,865,173 A | 9/1989 | Leigh-Monstevens et al. |
| 4,903,809 A | 2/1990 | Kiblawi et al. |
| 4,939,953 A | 7/1990 | Yasui |
| 4,978,329 A | 12/1990 | Yasui et al. |
| 5,019,021 A | 5/1991 | Janson |
| 5,413,015 A | 5/1995 | Zentmyer |
| 5,441,131 A | 8/1995 | Mayer et al. |
| 5,603,397 A | 2/1997 | Meyers |
| 5,715,733 A | 2/1998 | Dissett |
| 5,727,430 A | 3/1998 | Valente |
| 5,823,908 A | 10/1998 | Stefanek |
| 5,901,618 A | 5/1999 | Tyson et al. |
| 5,971,120 A | 10/1999 | Bessemer et al. |
| 6,062,105 A | 5/2000 | Tyson et al. |
| 6,083,134 A | 7/2000 | Godlew |
| 6,105,465 A | 8/2000 | Tyson et al. |
| 6,374,701 B1 | 4/2002 | Tittjung |
| 6,394,927 B1 | 5/2002 | Bongard |
| 6,463,830 B1 | 10/2002 | Ito et al. |
| 6,491,126 B1 | 12/2002 | Robison et al. |
| 6,607,062 B1 | 8/2003 | Heatwole et al. |
| 6,681,654 B2 | 1/2004 | Zentmyer |
| 6,688,194 B2 | 2/2004 | Dissett et al. |
| 6,884,196 B1 | 4/2005 | Ziech |
| 7,104,912 B2 | 9/2006 | Morgensai |
| 7,178,420 B2 | 2/2007 | Barth |
| 7,264,569 B2 | 9/2007 | Fox |
| 7,311,632 B2 | 12/2007 | Dissett et al. |
| 7,361,115 B2 | 4/2008 | Morgensai |
| 7,823,711 B2 | 11/2010 | Uhler et al. |
| 7,874,954 B2 | 1/2011 | Dissett et al. |
| 8,146,458 B2 | 4/2012 | Radzevich |
| 9,334,941 B2 | 5/2016 | Creager |
| 2002/0006845 A1 | 1/2002 | Okazaki |
| 2003/0066386 A1 | 4/2003 | Dissett et al. |
| 2004/0237689 A1 | 12/2004 | Hiltbrand |
| 2005/0288144 A1 | 12/2005 | Wang et al. |
| 2008/0060474 A1 | 3/2008 | Mizukawa et al. |
| 2008/0103008 A1 | 5/2008 | Gleasman et al. |
| 2008/0176703 A1 | 7/2008 | Hoberg |
| 2008/0190240 A1 | 8/2008 | Dissett et al. |
| 2009/0011890 A1 | 1/2009 | Bawks |
| 2010/0113208 A1 | 5/2010 | Haugeberg |
| 2010/0276243 A1 | 11/2010 | Arhab et al. |
| 2011/0021304 A1 | 1/2011 | Radzevich |
| 2011/0021306 A1 | 1/2011 | Radzevich |
| 2014/0141920 A1 | 5/2014 | Creager |
| 2014/0162828 A1 | 6/2014 | Creager |
| 2014/0171252 A1 | 6/2014 | Creager |

FOREIGN PATENT DOCUMENTS

| | | |
|---|---|---|
| EP | 0 838 612 A2 | 4/1998 |
| EP | 1 767 817 A1 | 3/2007 |
| EP | 1 898 124 A2 | 3/2008 |
| FR | 769 239 | 8/1934 |
| FR | 2 382 627 A1 | 9/1978 |
| WO | WO 2005/111471 A1 | 11/2005 |
| WO | WO 2014/085554 A1 | 6/2014 |

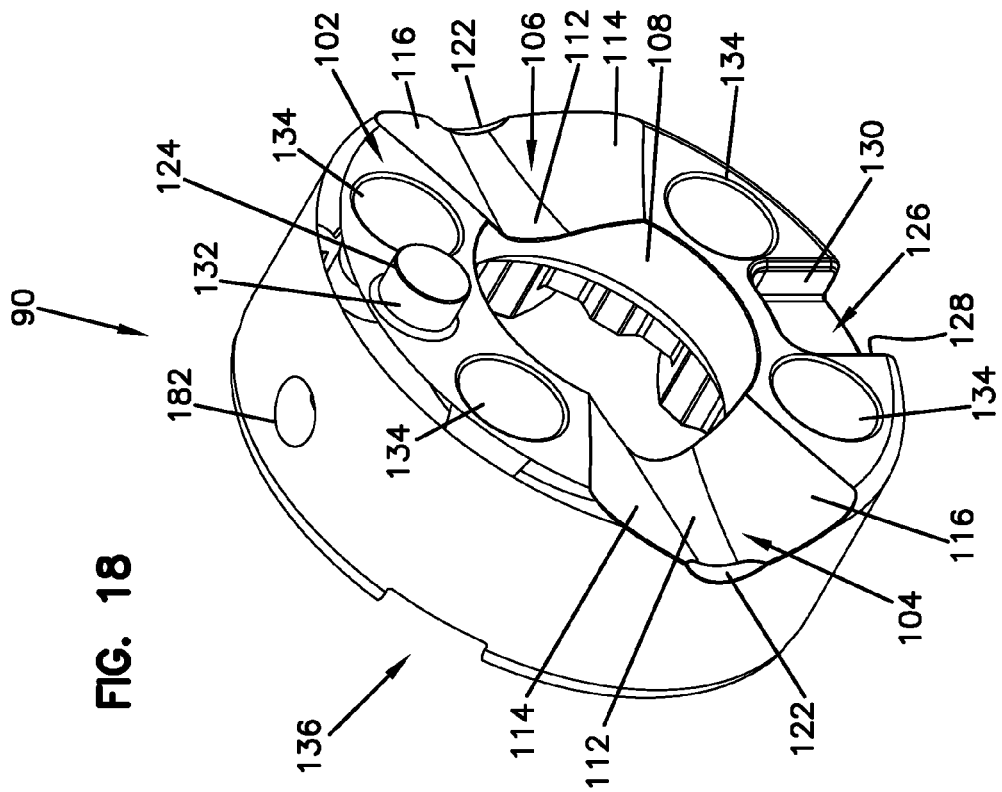
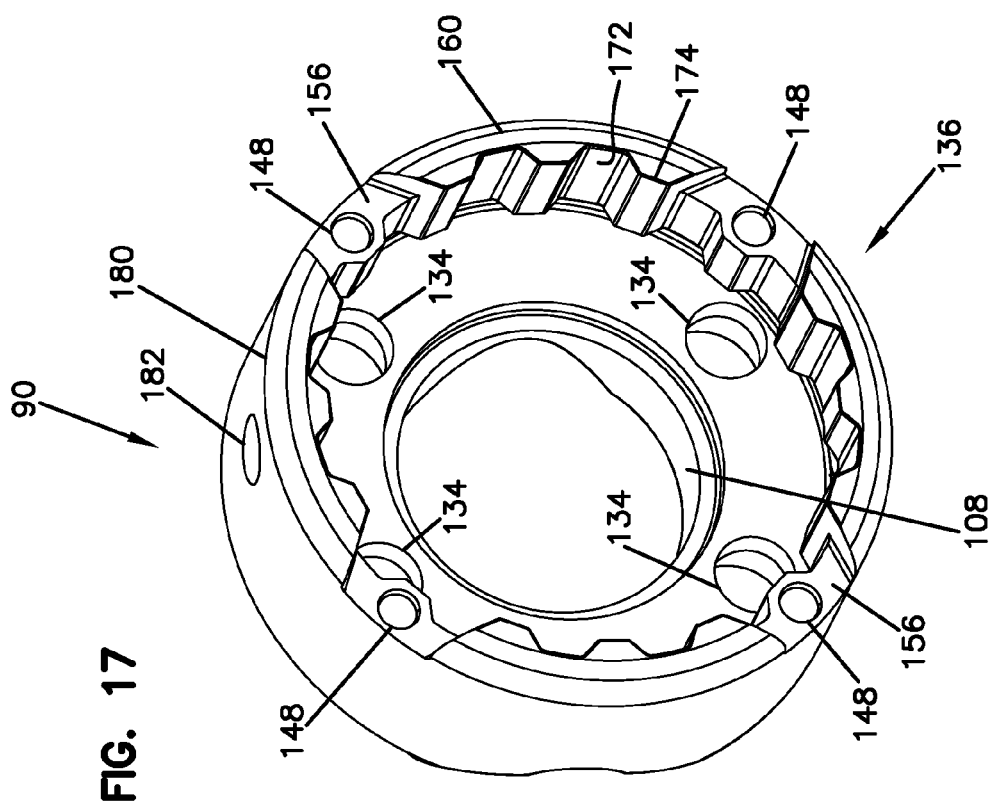

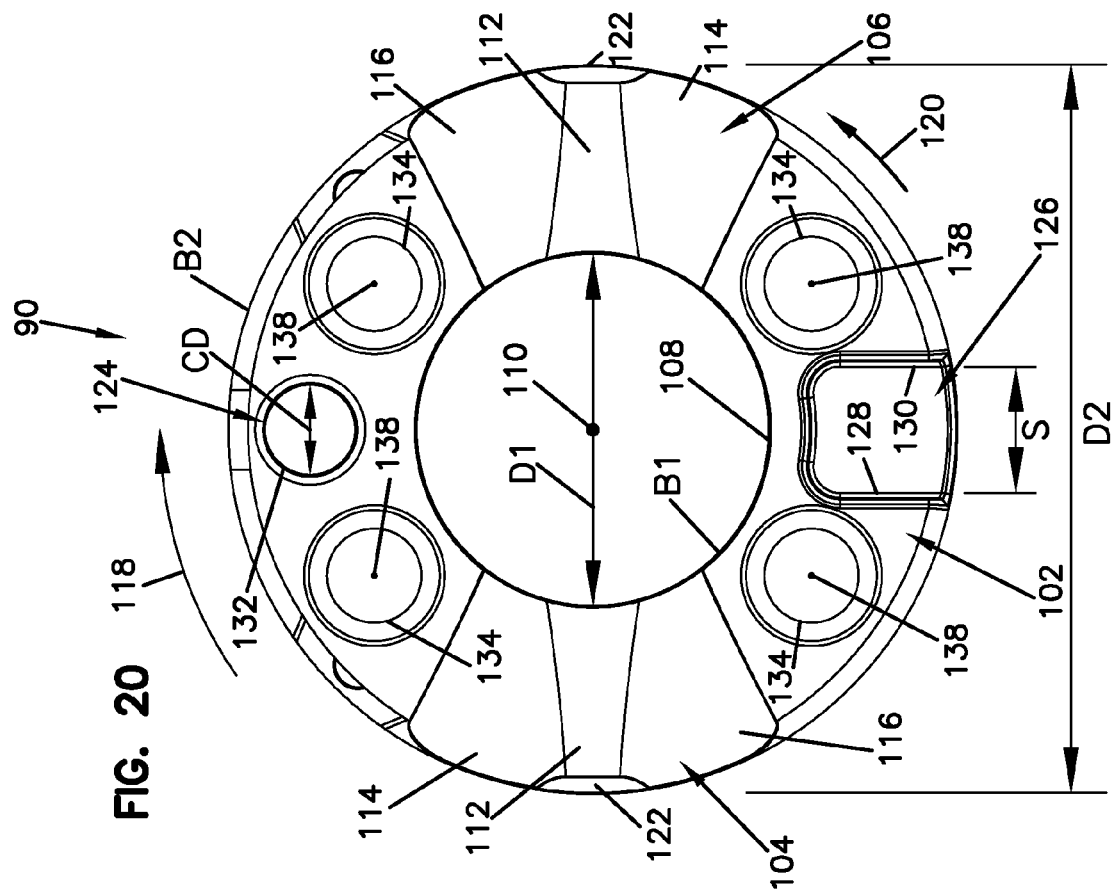
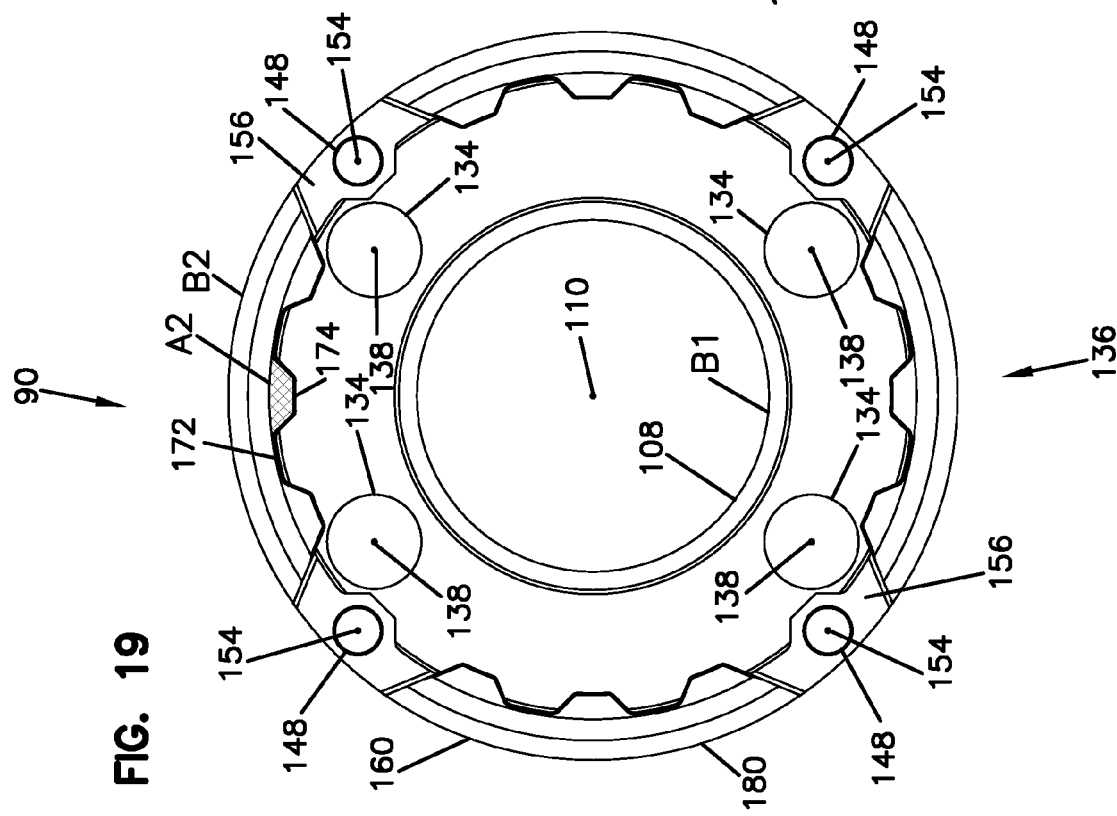

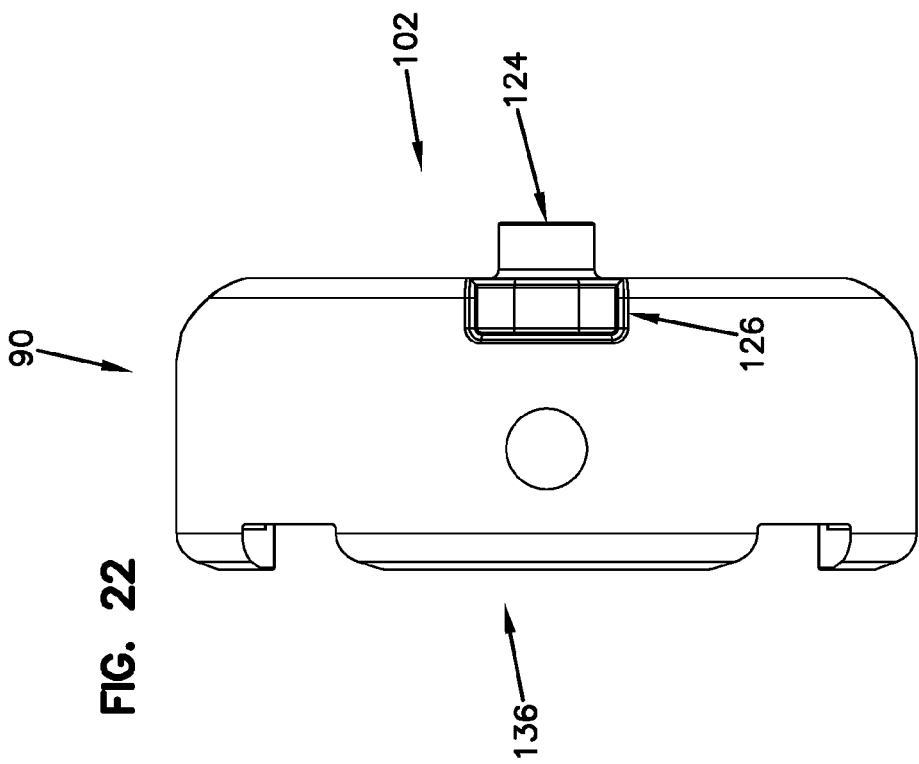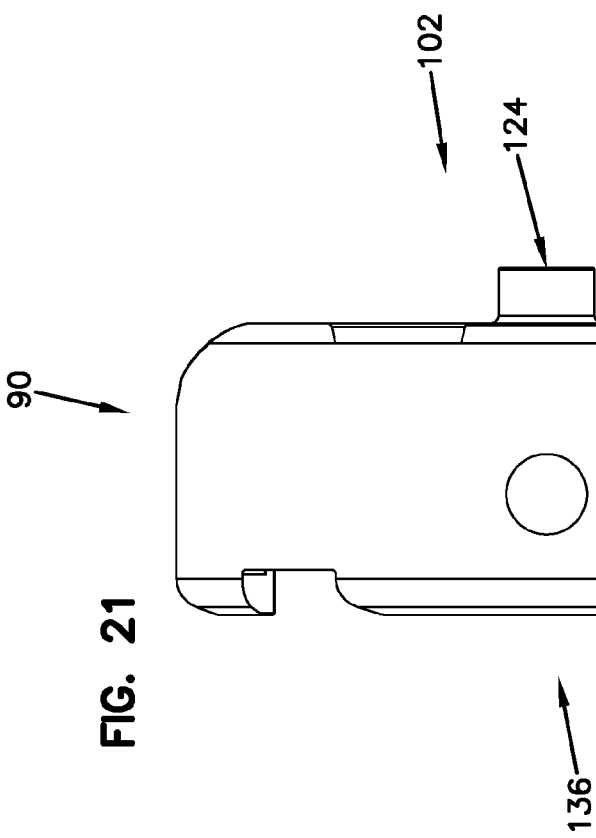

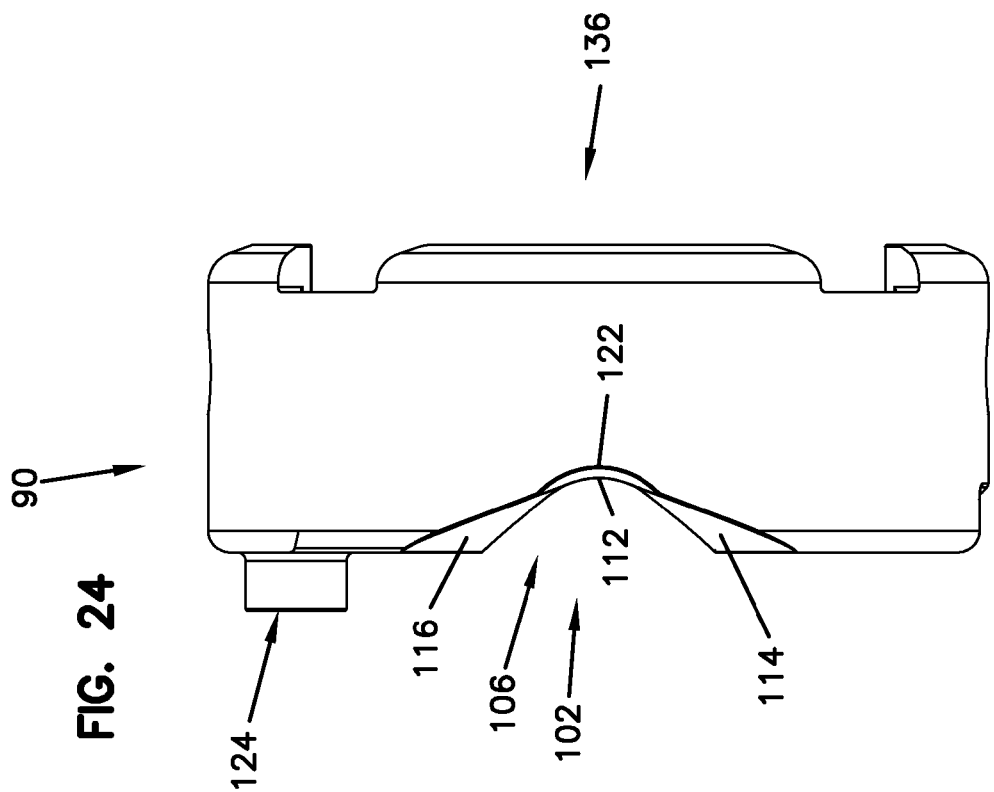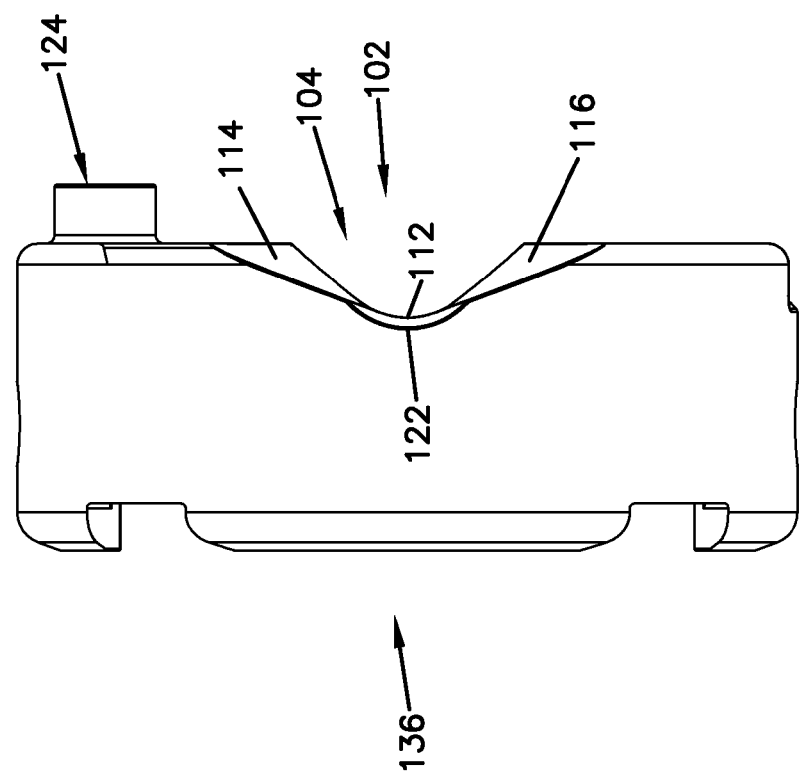

FIG. 38
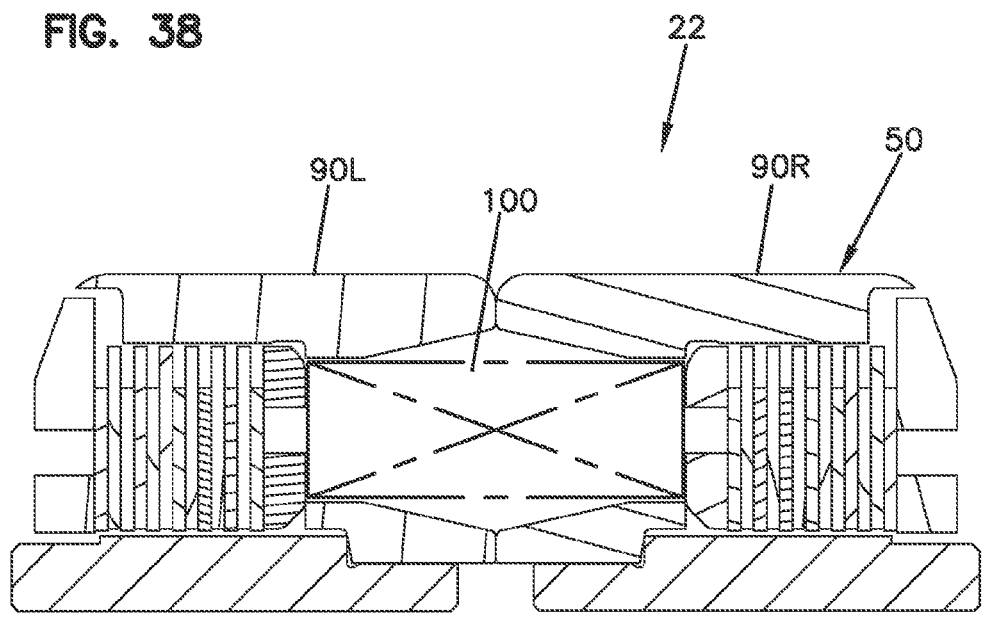
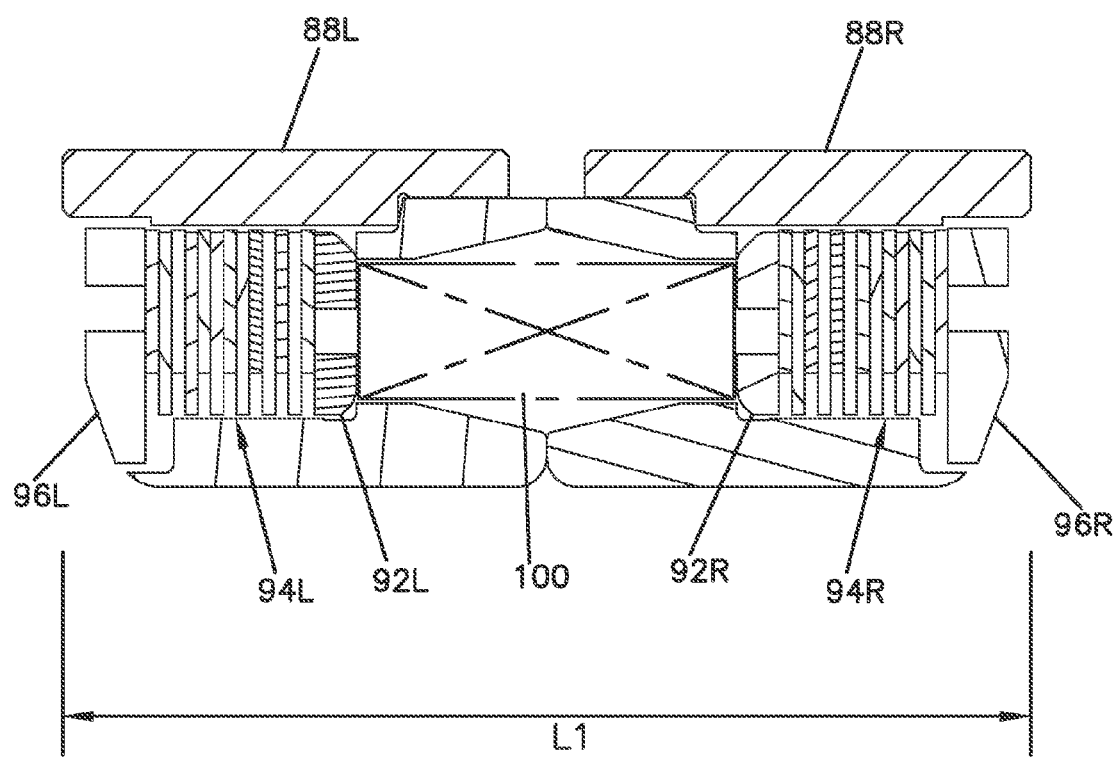

INBOARD SPRING ARRANGEMENT FOR A CLUTCH ACTUATED DIFFERENTIAL

CROSS-REFERENCE TO RELATED APPLICATIONS

This application is a continuation of application Ser. No. 14/203,816, filed Mar. 11, 2014, now U.S. Pat. No. 9,334,941, issued May 10, 2016, which claims priority to U.S. Provisional Patent Application No. 61/784,560, filed Mar. 14, 2013, U.S. Provisional Patent Application No. 61/784,595, filed Mar. 14, 2013, U.S. Provisional Patent Application No. 61/784,637, filed Mar. 14, 2013, and U.S. Provisional Patent Application No. 61/784,672, filed Mar. 14, 2013. The disclosures of each of those applications are hereby incorporated by reference in their entireties.

TECHNICAL FIELD

The present disclosure relates generally to differentials configured to transfer torque to first and second axle shafts of an axle assembly while concurrently allowing for differential rotation between first and second axle shafts.

BACKGROUND

A differential is a component of an axle assembly that is used to transfer torque from a driveshaft to a pair of output shafts (e.g., axle shafts). The driveshaft can be part of a drivetrain powered by a prime mover (e.g., an engine, a motor, etc.). The driveshaft can drive the differential through the use of a drive gear that meshes with an outer gear mounted at the outside of a housing of the differential. In vehicular applications, the differential allows the wheels (e.g., tires) mounted at opposite ends of an axle assembly to rotate at different speeds. This is important when a vehicle is turning because the outer wheel travels over an arc of greater distance than the inner wheel. Thus, the outer wheel must rotate at a faster speed than the inner wheel to compensate for the greater distance of travel. The differential includes a torque transfer arrangement that allows torque to be transferred from the driveshaft to axle shafts of the axle assembly while concurrently allowing the axle shafts to rotate at different speeds as needed. Two example types of differentials include bevel-style differentials and so called "gearless" differentials.

Bevel-style differentials include a differential case that is rotated about an axis of rotation by a driveshaft. The driveshaft can be powered by a prime mover of a vehicle. A gear interface can be used to transfer torque from the driveshaft to the differential case. First and second side bevel gears are mounted within the differential case. The first and second bevel gears are coaxially aligned along the axis of rotation of the differential case and are coupled to axle shafts of an axle assembly. The axle shafts extend through co-axially aligned openings defined by the differential case that are aligned with the axis of rotation of the differential case. An array of pinion bevel gears is mounted within the differential case between the first and second side bevel gears. The pinion bevel gears are rotatably mounted on gear shafts carried with the differential case. The array of pinion bevel gears intermesh with the first and second side bevel gears to form a torque transfer arrangement configured for transferring torque between the pinion bevel gears and the first and second side gears and for allowing the first and second side bevel gears and their corresponding axle shafts to rotate at different rotational speeds with respect to one another.

Similar to a bevel-style differential, a gearless differential includes a differential case that is rotated about an axis of rotation by a driveshaft. A gear interface can be used to transfer torque from the driveshaft to the differential case. The differential case defines co-axially aligned openings aligned along the axis of rotation of the differential case. The co-axially aligned openings receive axle shafts of an axle assembly. Unlike a bevel-style differential, a gearless differential does not include intermeshing gears within the differential case for differentially transferring torque from the differential case to the axle shafts. Instead, gearless differentials include clutches within the differential case for serving this purpose. During normal straight driving conditions, the clutches are engaged (i.e., actuated) such that torque is transferred from the differential case to both axle shafts. During a turn, the clutch corresponding to the outside wheel disengages to allow the outside wheel to rotate faster than the inside wheel. Examples of gearless differentials of the type described above are disclosed by U.S. Pat. Nos. 4,498,355; 5,413,015; 5,715,733; 5,727,430; 6,688,194; 7,874,954; and 8,146,458.

SUMMARY

One aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack.

Another aspect of the present disclosure relates to a differential including a differential case adapted to be rotated about an axis of rotation and a cross-shaft operatively coupled to the differential case such that the cross-shaft and the differential case rotate together about the axis of rotation. The cross-shaft can be transversely aligned relative to the axis of rotation. The differential also includes left and right clutch actuators that have opposing inboard sides between which the cross-shaft is positioned. The inboard sides of the left and right clutch actuators define pockets that cooperate to define a shaft receptacle that receives the cross-shaft. Each pocket can include first and second ramp surfaces separated by a neutral position. The left and right clutch actuators can define spring through-holes each having open inboard and outboard ends. The differential further includes left and right axle hubs that can be positioned on opposite sides of the cross-shaft and a left clutch pack that prevents relative rotation between the left clutch actuator and the left axle hub about the axis of rotation when a left clutch engagement pressure is applied to the left clutch pack. The differential has a right clutch pack that prevents relative rotation between the right clutch actuator and the right axle hub about the axis of rotation when a right clutch engagement pressure is applied to the right clutch pack. The differential has clutch pre-load springs that each applies pre-load pressure to both the left and right clutch packs. The clutch pre-load springs can be positioned inboard of the left and right clutch packs. The clutch pre-load springs can have left portions positioned in the spring through-holes of the left clutch actuator and right portions positioned in the spring through holes of the right clutch actuator. The clutch pre-load springs can extend across an interface between the left and right clutch actuators. Contact between the cross-shaft and one of the first and second ramp surfaces of the left clutch actuator causes the left clutch engagement pressure to be applied to the left clutch pack. Contact between the cross-shaft and one of the first and second ramp surfaces of the right clutch actuator causes the right clutch engagement pressure to be applied to the right clutch pack. The left engagement pressure is not applied to the left clutch pack when the cross-shaft aligns with the neutral position of the left clutch actuator. The right engagement pressure is not applied to the right clutch pack when the cross-shaft aligns with the neutral position of the right clutch actuator.

Another aspect of the present disclosure relates to a differential including a differential case adapted to be rotated about an axis of rotation and a cross-shaft operatively coupled to the differential case such that the cross-shaft and the differential case rotate together about the axis of rotation. The cross-shaft can be transversely aligned relative to the axis of rotation. The differential includes left and right clutch housings that have opposing inboard sides between which the cross-shaft is positioned. The inboard sides of the left and right clutch housings define pockets that cooperate to define a shaft receptacle that receives the cross-shaft and each pocket includes first and second ramp surfaces that are angled relative to one another so as to converge toward a neutral position located between the first and second ramp surfaces. The left and right clutch housings define spring through-holes each having open inboard and outboard ends. The differential includes left and right axle hubs positioned on opposite sides of the cross-shaft. The left and right axle hubs can be co-axially aligned along the axis of rotation. The differential has a left clutch pack that is housed at least partially within the left clutch housing and a right clutch pack that is housed at least partially within the right clutch housing. The left and right clutch packs each include first clutch plates that are interleaved within respect to second clutch plates. The first clutch plates of the left clutch pack are carried with the left clutch housing and the second clutch plates of the left clutch pack are carried with the left axle hub. Relative rotation about the axis of rotation is prevented between the left clutch housing and the left axle hub when a left clutch engagement pressure is applied to the left clutch pack. Relative rotation about the axis of rotation is permitted between the left clutch housing and the left axle hub when only a left clutch pre-load pressure is applied to the left clutch pack. The first clutch plates of the right clutch pack are carried with the right clutch housing and the second clutch plates of the right clutch pack are carried with the right axle hub. Relative rotation about the axis of rotation is prevented between the right clutch housing and the right axle hub when a right clutch engagement pressure is applied to the right clutch pack. Relative rotation about the axis of rotation is permitted between the right clutch housing and the right axle hub when only a right clutch pre-load pressure is applied to the right clutch pack. The differential further includes a plurality of clutch pre-load springs that cooperate to apply the left and right pre-load pressures to the left and right clutch packs. The clutch pre-load springs can be positioned inboard of the left and right clutch packs and each have a left portion positioned within one of the spring through-holes of the left clutch housing and a right portion positioned within one of the spring through-holes of the right clutch housing. Each of the clutch pre-load springs can be configured to apply a portion of the left pre-load pressure to the left clutch pack and a portion of the right pre-load pressure to the right clutch pack. Contact between the cross-shaft and one of the first and second ramp surfaces of the left clutch housing causes the left clutch engagement pressure to be applied to the left clutch pack. Contact between the cross-shaft and one of the first and second ramp surfaces of the right clutch housing causes the right clutch engagement pressure to be applied to the right clutch pack. The left engagement pressure is not applied to the left clutch pack when the cross-shaft aligns with the neutral position of the left clutch housing. The right engagement pressure is not applied to the right clutch pack when the cross-shaft aligns with the neutral position of the right clutch housing.

Another aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential includes a right clutch pack that prevents relative rotation between the right clutch actuator and the right axle hub about the axis of rotation when a right clutch engagement pressure is applied to the right clutch pack. The differential further includes a rotation limiting arrangement at the inboard sides of the left and right clutch actuators for limiting relative rotation between the left and right clutch actuators about the axis of rotation. The rotation limiting arrangement includes a limiter captured between first and second stop surfaces which cooperate to define a limited range of relative rotational movement between the left and right clutch actuators. The limiter has a first location that makes line contact with the first stop surface to stop relative rotation in a first rotational direction between the left and right clutch actuators. The limiter has a second location that makes line contact with the second stop surface to stop relative rotation in a second rotational direction between the left and right clutch actuators. The first rotational direction can be opposite from the second rotational direction. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack.

A further aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned. The inboard sides of the left and right clutch actuators define pockets that cooperate to define a shaft receptacle that receives the cross-shaft and each pocket includes first and second ramp surfaces that are angled relative to one another so as to converge toward a neutral position positioned between the first and second ramp surfaces. The differential has left and right axle hubs positioned on opposite sides of the cross-shaft. The differential has a left clutch pack that prevents relative rotation between the left clutch actuator and the left axle hub about the axis of rotation when a left clutch engagement pressure is applied to the left clutch pack. The differential has a right clutch pack that prevents relative rotation between the right clutch actuator and the right axle hub about the axis of rotation when a right clutch engagement pressure is applied to the right clutch pack. The differential further includes a rotation limiting arrangement at the inboard sides of the left and right clutch actuators for limiting relative rotation between the left and right clutch actuators about the axis of rotation. The rotation limiting arrangement includes a post and a post receptacle provided at the inboard side of each of the left and right clutch actuators. The post receptacles each are located between opposing first and second stop surfaces. The post of the left clutch actuator is received within the post receptacle of the right clutch actuator and the post of the right clutch actuator is received within the post receptacle of the left clutch actuator. The posts have first curved locations that make line contact with the first stop surfaces to stop relative rotation in a first rotational direction between the left and right clutch actuators. The posts have second curved locations that makes line contact with the second stop surfaces to stop relative rotation in a second rotational direction between the left and right clutch actuators. The first rotational direction is opposite from the second rotational direction. Contact between the cross-shaft and the first or second ramp surface at the inboard side of the left clutch actuator causes the left clutch engagement pressure to be applied to the left clutch pack. Contact between the cross-shaft and the first or second ramp surface at the inboard side of the right clutch actuator causes the right clutch engagement pressure to be applied to the right clutch pack. The left engagement pressure is not applied to the left clutch pack when the cross-shaft aligns with the neutral position of the left clutch actuator. The right engagement pressure is not applied to the right clutch pack when the cross-shaft aligns with the neutral position of the right clutch actuator.

A further aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch housings that have opposing inboard sides between which the cross-shaft is positioned and left and right axle hubs positioned on opposite sides of the cross-shaft. The differential includes a left clutch pack positioned within the left clutch housing that prevents relative rotation between the left clutch housing and the left axle hub about the axis of rotation when a left clutch engagement pressure is applied to the left clutch pack. The differential includes a right clutch pack positioned within the right clutch housing that prevents relative rotation between the right clutch actuator and the right axle hub about the axis of rotation when a right clutch engagement pressure is applied to the right clutch pack. The left and right clutch packs each include first and second clutch plates that are interleaved with respect to each other. The first clutch plates interface with the left and right clutch housings at first spline interfaces and the second clutch plates interface with left and right axle hubs at second spline interfaces. The first and second spline interfaces include splines that fit within spline receptacles. The spline receptacles define transverse cross-sectional areas. At least some of the splines include first splines that have transverse cross-sectional areas that occupy no more than 85 percent of the cross-sectional areas of the spline receptacles in which they are received such that axial oil flow paths are defined within the spline receptacles for allowing oil to escape from between the first and second clutch plates when the left and right clutch packs are actuated. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack.

A further aspect still of the present disclosure relates to a differential including a differential case adapted to be rotated about an axis of rotation. The differential case includes left and right axle shaft openings aligned along the axis of rotation. The differential case defines an interior including a main inner chamber and left and right pockets. The left and right pockets are aligned along the axis of rotation. The differential case further includes a side opening and a differential torque transfer assembly that includes left and right clutch actuators having opposing inboard sides between which the cross-shaft is positioned. The differential torque transfer assembly also includes left and right axle hubs positioned on opposite sides of the cross-shaft. The differential torque transfer assembly has a left clutch pack that prevents relative rotation between the left clutch actuator and the left axle hub about the axis of rotation when a left clutch engagement pressure is applied to the left clutch pack. The differential torque transfer assembly further includes a right clutch pack that prevents relative rotation between the right clutch actuator and the right axle hub about the axis of rotation when a right clutch engagement pressure is applied to the right clutch pack. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. The differential torque transfer assembly is moveable between an axially compressed configuration and an axially extended configuration. The differential torque transfer assembly can be loaded into the interior of the differential case through the side opening when the differential torque transfer assembly is in the axially compressed configuration. The left and right axle hubs respectively fit within the left and right pockets of the differential case when the differential torque transfer assembly is in the axially extended configuration.

Another aspect of the present disclosure relates to a method for installing a differential including a differential case and a main torque transfer assembly. The differential case defines axle shaft openings that extend along an axis of the differential case. The main torque transfer assembly includes left and right clutch actuators, left and right axle hubs, and left and right clutches that control relative rotation between the left and right clutch actuators and the left and right axle hubs respectively. The method includes the steps of inserting the main torque transfer assembly into the differential case through a side opening defined by the differential case and expanding the main torque transfer assembly along the axis of the differential case after the main torque transfer assembly has been inserted into the differential case through the side opening.

Another aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned. The differential includes left and right axle hubs positioned on opposite sides of the cross-shaft. The differential further includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential has a first spring arrangement that applies a left clutch pre-load to the left clutch pack and a right clutch pre-load to the right clutch pack and a second spring arrangement that biases the left and right clutch actuators toward one another. The second spring arrangement includes at least one coil spring and is configured to not transfer spring pressure through the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack.

Another aspect of the present disclosure relates to a differential including a differential case adapted to be rotated about an axis of rotation and a cross-shaft operatively coupled to the differential case such that the cross-shaft and the differential case rotate together about the axis of rotation. The cross-shaft can be transversely aligned relative to the axis of rotation. The differential includes left and right clutch housings that have opposing inboard sides between which the cross-shaft is positioned. The inboard sides of the left and right clutch housings define pockets that cooperate to define a shaft receptacle that receives the cross-shaft and each pocket includes first and second ramp surfaces that are angled relative to one another so as to converge toward a neutral position located between the first and second ramp surfaces. The differential further includes left and right axle hubs positioned on opposite sides of the cross-shaft. The left and right axle hubs are co-axially aligned along the axis of rotation. The differential has a left clutch pack housed at least partially within the left clutch housing and a right clutch pack that is housed at least partially within the right clutch housing. The left and right clutch packs each include first clutch plates that are interleaved within respect to second clutch plates. The first clutch plates of the left clutch pack are carried with the left clutch housing and the second clutch plates of the left clutch pack are carried with the left axle hub. Relative rotation about the axis of rotation is prevented between the left clutch housing and the left axle hub when a left clutch engagement pressure is applied to the left clutch pack. Relative rotation about the axis of rotation is permitted between the left clutch housing and the left axle hub when the left clutch engagement pressure is not applied to the left clutch pack. The first clutch plates of the right clutch pack are carried with the right clutch housing and the second clutch plates of the right clutch pack are carried with the right axle hub. Relative rotation about the axis of rotation is prevented between the right clutch housing and the right axle hub when a right clutch engagement pressure is applied to the right clutch pack. Relative rotation about the axis of rotation is permitted between the right clutch housing and the right axle hub when the right clutch engagement pressure is not applied to the right clutch pack. The differential also includes left and right outboard coil springs that bias the left and right clutch housings toward one another and against the cross-shaft. The left and right outboard springs can be configured to not transfer spring pressure through the left and right clutch packs. Contact between the cross-shaft and one of the first and second ramp surfaces of the left clutch housing causes the left clutch engagement pressure to be applied to the left clutch pack. Contact between the cross-shaft and one of the first and second ramp surfaces of the right clutch housing causes the right clutch engagement pressure to be applied to the right clutch pack. The left engagement pressure is not applied to the left clutch pack when the cross-shaft aligns with the neutral position of the left clutch housing. The right engagement pressure is not applied to the right clutch pack when the cross-shaft aligns with the neutral position of the right clutch housing.

A further aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned. The inboard sides of the left and right clutch actuators define pockets that cooperate to define a shaft receptacle that receives the cross-shaft and each pocket includes first and second ramp surfaces that are angled relative to one another so as to converge toward a neutral position located between the first and second ramp surfaces. The differential also includes left and right axle hubs positioned on opposite sides of the cross-shaft. The differential has a left clutch pack that prevents relative rotation between the left clutch actuator and the left axle hub about the axis of rotation when a left clutch engagement pressure is applied to the left clutch pack. The differential has a right clutch pack that prevents relative rotation between the right clutch actuator and the right axle hub about the axis of rotation when a right clutch engagement pressure is applied to the right clutch pack. The differential includes a spring arrangement that biases the left and right clutch actuators toward one another. Contact between the cross-shaft and one of the first and second ramp surfaces of the left clutch actuator causes the left clutch engagement pressure to be applied to the left clutch pack. Contact between the cross-shaft and one of the first and second ramp surfaces of the right clutch actuator causes the right clutch engagement pressure to be applied to the right clutch pack. The left engagement pressure is not applied to the left clutch pack when the cross-shaft aligns with the neutral position of the left clutch housing. The right engagement pressure is not applied to the right clutch pack when the cross-shaft aligns with the neutral position of the right clutch housing. The left and right clutch housings each include inner and outer circumferential boundaries that extend around the axis of rotation. The pockets are defined between the inner and outer circumferential boundaries and the pockets include shaft insertion chamfers positioned at the outer circumferential boundaries in alignment with the neutral positions.

A further aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. A central reference plane extends along an interface between the inboard sides of the left and right clutch actuators. The central reference plane is perpendicular with respect to the axis of rotation and the clutch pre-load spring extends across the central reference plane.

Another aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. A central reference plane extends along an interface between the inboard sides of the left and right clutch actuators. The central reference plane is perpendicular with respect to the axis of rotation and the clutch pre-load spring extends across the central reference plane. A limited range of rotational movement about the axis of rotation is permitted between the left and right clutch actuators. The clutch pre-load spring flexes in response to relative rotation between the left and right clutch actuators about the axis of rotation.

Another aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. A central reference plane extends along an interface between the inboard sides of the left and right clutch actuators. The central reference plane is perpendicular with respect to the axis of rotation and the clutch pre-load spring extends across the central reference plane. A limited range of rotational movement about the axis of rotation is permitted between the left and right clutch actuators. The clutch pre-load spring flexes in response to relative rotation between the left and right clutch actuators about the axis of rotation. The clutch pre-load spring is a coil spring.

A further aspect still of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. A central reference plane extends along an interface between the inboard sides of the left and right clutch actuators. The central reference plane is perpendicular with respect to the axis of rotation and the clutch pre-load spring extends across the central reference plane. A limited range of rotational movement about the axis of rotation is permitted between the left and right clutch actuators. The clutch pre-load spring flexes in response to relative rotation between the left and right clutch actuators about the axis of rotation. The clutch pre-load spring is a coil spring. The inboard sides of the left and right clutch actuators define pockets that cooperate to define a shaft receptacle that receives the cross-shaft. Each pocket includes first and second ramp surfaces separated by a neutral position. The left engagement pressure is not applied to the left clutch pack when the cross-shaft aligns with the neutral position of the left clutch actuator. The right engagement pressure is not applied to the right clutch pack when the cross-shaft aligns with the neutral position of the right clutch actuator.

Another aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. A central reference plane extends along an interface between the inboard sides of the left and right clutch actuators. The central reference plane is perpendicular with respect to the axis of rotation and the clutch pre-load spring extends across the central reference plane. A limited range of rotational movement about the axis of rotation is permitted between the left and right clutch actuators. The clutch pre-load spring flexes in response to relative rotation between the left and right clutch actuators about the axis of rotation. The clutch pre-load spring is a coil spring. The inboard sides of the left and right clutch actuators define pockets that cooperate to define a shaft receptacle that receives the cross-shaft. Each pocket includes first and second ramp surfaces separated by a neutral position. The left engagement pressure is not applied to the left clutch pack when the cross-shaft aligns with the neutral position of the left clutch actuator. The right engagement pressure is not applied to the right clutch pack when the cross-shaft aligns with the neutral position of the right clutch actuator. The differential further includes a plurality of the clutch pre-load springs that cooperate to apply left and right clutch pre-loads respectively to the left and right clutch packs. Each of the clutch pre-load springs applies a portion of the left clutch pre-load and a portion of the right clutch pre-load and none of the clutch pre-load springs apply pressure to the left and right actuators.

Another aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. A central reference plane extends along an interface between the inboard sides of the left and right clutch actuators. The central reference plane is perpendicular with respect to the axis of rotation and the clutch pre-load spring extends across the central reference plane. A limited range of rotational movement about the axis of rotation is permitted between the left and right clutch actuators. The clutch pre-load spring flexes in response to relative rotation between the left and right clutch actuators about the axis of rotation. The clutch pre-load spring is a coil spring. The inboard sides of the left and right clutch actuators define pockets that cooperate to define a shaft receptacle that receives the cross-shaft. Each pocket includes first and second ramp surfaces separated by a neutral position. The left engagement pressure is not applied to the left clutch pack when the cross-shaft aligns with the neutral position of the left clutch actuator. The right engagement pressure is not applied to the right clutch pack when the cross-shaft aligns with the neutral position of the right clutch actuator. The differential further includes a plurality of the clutch pre-load springs that cooperate to apply left and right clutch pre-loads respectively to the left and right clutch packs. Each of the clutch pre-load springs applies a portion of the left clutch pre-load and a portion of the right clutch pre-load and none of the clutch pre-load springs apply pressure to the left and right actuators. The clutch pre-load springs are spaced uniformly about the axis of rotation.

Another aspect of the present disclosure relates to a differential including a differential case adapted to be rotated about an axis of rotation and a cross-shaft operatively coupled to the differential case such that the cross-shaft and the differential case rotate together about the axis of rotation.

The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. A central reference plane extends along an interface between the inboard sides of the left and right clutch actuators. The central reference plane is perpendicular with respect to the axis of rotation and the clutch pre-load spring extends across the central reference plane. A limited range of rotational movement about the axis of rotation is permitted between the left and right clutch actuators. The clutch pre-load spring flexes in response to relative rotation between the left and right clutch actuators about the axis of rotation. The clutch pre-load spring is a coil spring. The inboard sides of the left and right clutch actuators define pockets that cooperate to define a shaft receptacle that receives the cross-shaft. Each pocket includes first and second ramp surfaces separated by a neutral position. The left engagement pressure is not applied to the left clutch pack when the cross-shaft aligns with the neutral position of the left clutch actuator. The right engagement pressure is not applied to the right clutch pack when the cross-shaft aligns with the neutral position of the right clutch actuator. The differential further includes a plurality of the clutch pre-load springs that cooperate to apply left and right clutch pre-loads respectively to the left and right clutch packs. Each of the clutch pre-load springs applies a portion of the left clutch pre-load and a portion of the right clutch pre-load and none of the clutch pre-load springs apply pressure to the left and right actuators. The left and right clutch actuators define a plurality of spring holes each having open inboard and outboard ends. Each of the clutch pre-load springs extend through one of the spring holes of the left clutch actuator and a corresponding one of the spring bores of the right clutch actuator.

Another aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. The deferential further includes a plurality of the clutch pre-load springs that cooperate to apply left and right clutch pre-loads respectively to the left and right clutch packs. Each of the clutch pre-load springs applies a portion of the left clutch pre-load and a portion of the right clutch pre-load without applying the pre-loads through the left and right clutch actuators.

Another aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. The deferential further includes a plurality of the clutch pre-load springs that cooperate to apply left and right clutch pre-loads respectively to the left and right clutch packs. Each of the clutch pre-load springs applies a portion of the left clutch pre-load and a portion of the right clutch pre-load without applying the pre-loads through the left and right clutch actuators. The clutch pre-load springs are spaced uniformly about the axis of rotation.

One aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. The left and right clutch actuators define through-holes that receive the clutch pre-load springs.

One aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. The left and right clutch actuators define through-holes that receive the clutch pre-load springs. The through-holes each include cylindrical portions and tapered portions and the tapered portions define diameters that increase in size as the tapered portions extend in an inboard direction. Major diameters of the tapered portions are positioned at the inboard sides of the left and right clutch actuators.

Another aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. The differential further including a plurality of the clutch pre-load springs that cooperate to apply left and right clutch pre-loads respectively to the left and right clutch packs. Each of the clutch pre-load springs applies a portion of the left clutch pre-load and a portion of the right clutch pre-load without applying the pre-loads through the left and right clutch actuators. The left and right clutch actuators respectively house the left and right clutch packs. The clutch pre-load springs extend through the left and right clutch actuators and across an interface between the left and right clutch actuators and each of the clutch pre-load springs includes opposite ends that abut against inboard thrust washers of the left and right clutch packs.

A further aspect of the present disclosure relates to a differential including a differential case adapted to be rotated about an axis of rotation and a cross-shaft operatively coupled to the differential case such that the cross-shaft and the differential case rotate together about the axis of rotation. The differential includes left and right clutch actuators that have opposing inboard sides between which the cross-shaft is positioned and left and right axle hubs that are positioned on opposite sides of the cross-shaft. The differential includes a left clutch pack that prevents relative rotation between the left clutch actuator and the left axle hub about the axis of rotation when a left clutch engagement pressure is applied to the left clutch pack. The differential also includes a right clutch pack that prevents relative rotation between the right clutch actuator and the right axle hub about the axis of rotation when a right clutch engagement pressure is applied to the right clutch pack. The differential further includes a clutch pre-load spring that applies pressure to both the left and right clutch packs without applying pressure to the left and right clutch actuators. The clutch pre-load spring can be positioned inboard of the left and right clutch packs. Contact between the cross-shaft and a ramp surface at the inboard side of the left clutch actuator causes the left clutch engagement pressure to be applied to the left clutch pack. Contact between the cross-shaft and a ramp surface at the inboard side of the right clutch actuator causes the right clutch engagement pressure to be applied to the right clutch pack. The differential further includes outboard springs that bias the left and right clutch actuators toward one another without applying spring load through the left and right clutch packs.

Another aspect of the present disclosure relates to a differential including a differential case adapted to be rotated about an axis of rotation and a cross-shaft operatively coupled to the differential case such that the cross-shaft and the differential case rotate together about the axis of rotation. The cross-shaft can be transversely aligned relative to the axis of rotation. The differential also includes left and right clutch actuators that have opposing inboard sides between which the cross-shaft is positioned. The inboard sides of the left and right clutch actuators define pockets that cooperate to define a shaft receptacle that receives the cross-shaft. Each pocket can include first and second ramp surfaces separated by a neutral position. The left and right clutch actuators can define spring through-holes each having open inboard and outboard ends. The differential further includes left and right axle hubs that can be positioned on opposite sides of the cross-shaft and a left clutch pack that prevents relative rotation between the left clutch actuator and the left axle hub about the axis of rotation when a left clutch engagement pressure is applied to the left clutch pack. The differential has a right clutch pack that prevents relative rotation between the right clutch actuator and the right axle hub about the axis of rotation when a right clutch engagement pressure is applied to the right clutch pack. The differential has clutch pre-load springs that each applies pre-load pressure to both the left and right clutch packs. The clutch pre-load springs can be positioned inboard of the left and right clutch packs. The clutch pre-load springs can have left portions positioned in the spring through-holes of the left clutch actuator and right portions positioned in the spring through holes of the right clutch actuator. The clutch pre-load springs can extend across an interface between the left and right clutch actuators. Contact between the cross-shaft and one of the first and second ramp surfaces of the left clutch actuator causes the left clutch engagement pressure to be applied to the left clutch pack. Contact between the cross-shaft and one of the first and second ramp surfaces of the right clutch actuator causes the right clutch engagement pressure to be applied to the right clutch pack. The left engagement pressure is not applied to the left clutch pack when the cross-shaft aligns with the neutral position of the left clutch actuator. The right engagement pressure is not applied to the right clutch pack when the cross-shaft aligns with the neutral position of the right clutch actuator. The spring through-holes each have cylindrical portions adjacent the outboard ends and tapered portions adjacent the inboard ends. The tapered portions have major diameters at the inboard sides of the left and right clutch actuators.

Another aspect of the present disclosure relates to a differential including a differential case adapted to be rotated about an axis of rotation and a cross-shaft operatively coupled to the differential case such that the cross-shaft and the differential case rotate together about the axis of rotation. The cross-shaft can be transversely aligned relative to the axis of rotation. The differential also includes left and right clutch actuators that have opposing inboard sides between which the cross-shaft is positioned. The inboard sides of the left and right clutch actuators define pockets that cooperate to define a shaft receptacle that receives the cross-shaft. Each pocket can include first and second ramp surfaces separated by a neutral position. The left and right clutch actuators can define spring through-holes each having open inboard and outboard ends. The differential further includes left and right axle hubs that can be positioned on opposite sides of the cross-shaft and a left clutch pack that prevents relative rotation between the left clutch actuator and the left axle hub about the axis of rotation when a left clutch engagement pressure is applied to the left clutch pack. The differential has a right clutch pack that prevents relative rotation between the right clutch actuator and the right axle hub about the axis of rotation when a right clutch engagement pressure is applied to the right clutch pack. The differential has clutch pre-load springs that each applies pre-load pressure to both the left and right clutch packs. The clutch pre-load springs can be positioned inboard of the left and right clutch packs. The clutch pre-load springs can have left portions positioned in the spring through-holes of the left clutch actuator and right portions positioned in the spring through holes of the right clutch actuator. The clutch pre-load springs can extend across an interface between the left and right clutch actuators. Contact between the cross-shaft and one of the first and second ramp surfaces of the left clutch actuator causes the left clutch engagement pressure to be applied to the left clutch pack. Contact between the cross-shaft and one of the first and second ramp surfaces of the right clutch actuator causes the right clutch engagement pressure to be applied to the right clutch pack. The left engagement pressure is not applied to the left clutch pack when the cross-shaft aligns with the neutral position of the left clutch actuator. The right engagement pressure is not applied to the right clutch pack when the cross-shaft aligns with the neutral position of the right clutch actuator. The spring through-holes each have cylindrical portions adjacent the outboard ends and tapered portions adjacent the inboard ends. The tapered portions have major diameters at the inboard sides of the left and right clutch actuators. The pre-load springs each have opposite ends that bias against inboard thrust washers of the left and right clutch packs.

Another aspect of the present disclosure relates to a differential including a differential case adapted to be rotated about an axis of rotation and a cross-shaft operatively coupled to the differential case such that the cross-shaft and the differential case rotate together about the axis of rotation. The cross-shaft can be transversely aligned relative to the axis of rotation. The differential also includes left and right clutch actuators that have opposing inboard sides between which the cross-shaft is positioned. The inboard sides of the left and right clutch actuators define pockets that cooperate to define a shaft receptacle that receives the cross-shaft. Each pocket can include first and second ramp surfaces separated by a neutral position. The left and right clutch actuators can define spring through-holes each having open inboard and outboard ends. The differential further includes left and right axle hubs that can be positioned on opposite sides of the cross-shaft and a left clutch pack that prevents relative rotation between the left clutch actuator and the left axle hub about the axis of rotation when a left clutch engagement pressure is applied to the left clutch pack. The differential has a right clutch pack that prevents relative rotation between the right clutch actuator and the right axle hub about the axis of rotation when a right clutch engagement pressure is applied to the right clutch pack. The differential has clutch pre-load springs that each applies pre-load pressure to both the left and right clutch packs. The clutch pre-load springs can be positioned inboard of the left and right clutch packs. The clutch pre-load springs can have left portions positioned in the spring through-holes of the left clutch actuator and right portions positioned in the spring through holes of the right clutch actuator. The clutch pre-load springs can extend across an interface between the left and right clutch actuators. Contact between the cross-shaft and one of the first and second ramp surfaces of the left clutch actuator causes the left clutch engagement pressure to be applied to the left clutch pack. Contact between the cross-shaft and one of the first and second ramp surfaces of the right clutch actuator causes the right clutch engagement pressure to be applied to the right clutch pack. The left engagement pressure is not applied to the left clutch pack when the cross-shaft aligns with the neutral position of the left clutch actuator. The right engagement pressure is not applied to the right clutch pack when the cross-shaft aligns with the neutral position of the right clutch actuator. The differential further includes outboard springs that bias the left and right clutch actuators toward one another without applying spring load through the left and right clutch packs.

Another aspect of the present disclosure relates to a differential including a differential case adapted to be rotated about an axis of rotation and a cross-shaft operatively coupled to the differential case such that the cross-shaft and the differential case rotate together about the axis of rotation. The cross-shaft can be transversely aligned relative to the axis of rotation. The differential includes left and right clutch housings that have opposing inboard sides between which the cross-shaft is positioned. The inboard sides of the left and right clutch housings define pockets that cooperate to define a shaft receptacle that receives the cross-shaft and each pocket includes first and second ramp surfaces that are angled relative to one another so as to converge toward a neutral position located between the first and second ramp surfaces. The left and right clutch housings define spring through-holes each having open inboard and outboard ends. The differential includes left and right axle hubs positioned on opposite sides of the cross-shaft. The left and right axle hubs can be co-axially aligned along the axis of rotation. The differential has a left clutch pack that is housed at least partially within the left clutch housing and a right clutch pack that is housed at least partially within the right clutch housing. The left and right clutch packs each include first clutch plates that are interleaved within respect to second clutch plates. The first clutch plates of the left clutch pack are carried with the left clutch housing and the second clutch plates of the left clutch pack are carried with the left axle hub. Relative rotation about the axis of rotation is prevented between the left clutch housing and the left axle hub when a left clutch engagement pressure is applied to the left clutch pack. Relative rotation about the axis of rotation is permitted between the left clutch housing and the left axle hub when only a left clutch pre-load pressure is applied to the left clutch pack. The first clutch plates of the right clutch pack are carried with the right clutch housing and the second clutch plates of the right clutch pack are carried with the right axle hub. Relative rotation about the axis of rotation is prevented between the right clutch housing and the right axle hub when a right clutch engagement pressure is applied to the right clutch pack. Relative rotation about the axis of rotation is permitted between the right clutch housing and the right axle hub when only a right clutch pre-load pressure is applied to the right clutch pack. The differential further includes a plurality of clutch pre-load springs that cooperate to apply the left and right pre-load pressures to the left and right clutch packs. The clutch pre-load springs can be positioned inboard of the left and right clutch packs and each have a left portion positioned within one of the spring through-holes of the left clutch housing and a right portion positioned within one of the spring through-holes of the right clutch housing. Each of the clutch pre-load springs can be configured to apply a portion of the left pre-load pressure to the left clutch pack and a portion of the right pre-load pressure to the right clutch pack. Contact between the cross-shaft and one of the first and second ramp surfaces of the left clutch housing causes the left clutch engagement pressure to be applied to the left clutch pack. Contact between the cross-shaft and one of the first and second ramp surfaces of the right clutch housing causes the right clutch engagement pressure to be applied to the right clutch pack. The left engagement pressure is not applied to the left clutch pack when the cross-shaft aligns with the neutral position of the left clutch housing. The right engagement pressure is not applied to the right clutch pack when the cross-shaft aligns with the neutral position of the right clutch housing. The spring through-holes each have cylindrical portions adjacent the outboard ends and tapered portions adjacent the inboard ends. The tapered portions have major diameters at the inboard sides of the left and right clutch housings.

Another aspect of the present disclosure relates to a differential including a differential case adapted to be rotated about an axis of rotation and a cross-shaft operatively coupled to the differential case such that the cross-shaft and the differential case rotate together about the axis of rotation. The cross-shaft can be transversely aligned relative to the axis of rotation. The differential includes left and right clutch housings that have opposing inboard sides between which the cross-shaft is positioned. The inboard sides of the left and right clutch housings define pockets that cooperate to define a shaft receptacle that receives the cross-shaft and each pocket includes first and second ramp surfaces that are angled relative to one another so as to converge toward a neutral position located between the first and second ramp surfaces. The left and right clutch housings define spring through-holes each having open inboard and outboard ends. The differential includes left and right axle hubs positioned on opposite sides of the cross-shaft. The left and right axle hubs can be co-axially aligned along the axis of rotation. The differential has a left clutch pack that is housed at least partially within the left clutch housing and a right clutch pack that is housed at least partially within the right clutch housing. The left and right clutch packs each include first clutch plates that are interleaved within respect to second clutch plates. The first clutch plates of the left clutch pack are carried with the left clutch housing and the second clutch plates of the left clutch pack are carried with the left axle hub. Relative rotation about the axis of rotation is prevented between the left clutch housing and the left axle hub when a left clutch engagement pressure is applied to the left clutch pack. Relative rotation about the axis of rotation is permitted between the left clutch housing and the left axle hub when only a left clutch pre-load pressure is applied to the left clutch pack. The first clutch plates of the right clutch pack are carried with the right clutch housing and the second clutch plates of the right clutch pack are carried with the right axle hub. Relative rotation about the axis of rotation is prevented between the right clutch housing and the right axle hub when a right clutch engagement pressure is applied to the right clutch pack. Relative rotation about the axis of rotation is permitted between the right clutch housing and the right axle hub when only a right clutch pre-load pressure is applied to the right clutch pack. The differential further includes a plurality of clutch pre-load springs that cooperate to apply the left and right pre-load pressures to the left and right clutch packs. The clutch pre-load springs can be positioned inboard of the left and right clutch packs and each have a left portion positioned within one of the spring through-holes of the left clutch housing and a right portion positioned within one of the spring through-holes of the right clutch housing. Each of the clutch pre-load springs can be configured to apply a portion of the left pre-load pressure to the left clutch pack and a portion of the right pre-load pressure to the right clutch pack. Contact between the cross-shaft and one of the first and second ramp surfaces of the left clutch housing causes the left clutch engagement pressure to be applied to the left clutch pack. Contact between the cross-shaft and one of the first and second ramp surfaces of the right clutch housing causes the right clutch engagement pressure to be applied to the right clutch pack. The left engagement pressure is not applied to the left clutch pack when the cross-shaft aligns with the neutral position of the left clutch housing. The right engagement pressure is not applied to the right clutch pack when the cross-shaft aligns with the neutral position of the right clutch housing. The spring through-holes each have cylindrical portions adjacent the outboard ends and tapered portions adjacent the inboard ends. The tapered portions have major diameters at the inboard sides of the left and right clutch housings. The pre-load springs each have opposite ends that bias against inboard thrust washers of the left and right clutch packs.

Another aspect of the present disclosure relates to a differential including a differential case adapted to be rotated about an axis of rotation and a cross-shaft operatively coupled to the differential case such that the cross-shaft and the differential case rotate together about the axis of rotation. The cross-shaft can be transversely aligned relative to the axis of rotation. The differential includes left and right clutch housings that have opposing inboard sides between which the cross-shaft is positioned. The inboard sides of the left and right clutch housings define pockets that cooperate to define a shaft receptacle that receives the cross-shaft and each pocket includes first and second ramp surfaces that are angled relative to one another so as to converge toward a neutral position located between the first and second ramp surfaces. The left and right clutch housings define spring through-holes each having open inboard and outboard ends. The differential includes left and right axle hubs positioned on opposite sides of the cross-shaft. The left and right axle hubs can be co-axially aligned along the axis of rotation. The differential has a left clutch pack that is housed at least partially within the left clutch housing and a right clutch pack that is housed at least partially within the right clutch housing. The left and right clutch packs each include first clutch plates that are interleaved within respect to second clutch plates. The first clutch plates of the left clutch pack are carried with the left clutch housing and the second clutch plates of the left clutch pack are carried with the left axle hub. Relative rotation about the axis of rotation is prevented between the left clutch housing and the left axle hub when a left clutch engagement pressure is applied to the left clutch pack. Relative rotation about the axis of rotation is permitted between the left clutch housing and the left axle hub when only a left clutch pre-load pressure is applied to the left clutch pack. The first clutch plates of the right clutch pack are carried with the right clutch housing and the second clutch plates of the right clutch pack are carried with the right axle hub. Relative rotation about the axis of rotation is prevented between the right clutch housing and the right axle hub when a right clutch engagement pressure is applied to the right clutch pack. Relative rotation about the axis of rotation is permitted between the right clutch housing and the right axle hub when only a right clutch pre-load pressure is applied to the right clutch pack. The differential further includes a plurality of clutch pre-load springs that cooperate to apply the left and right pre-load pressures to the left and right clutch packs. The clutch pre-load springs can be positioned inboard of the left and right clutch packs and each have a left portion positioned within one of the spring through-holes of the left clutch housing and a right portion positioned within one of the spring through-holes of the right clutch housing. Each of the clutch pre-load springs can be configured to apply a portion of the left pre-load pressure to the left clutch pack and a portion of the right pre-load pressure to the right clutch pack. Contact between the cross-shaft and one of the first and second ramp surfaces of the left clutch housing causes the left clutch engagement pressure to be applied to the left clutch pack. Contact between the cross-shaft and one of the first and second ramp surfaces of the right clutch housing causes the right clutch engagement pressure to be applied to the right clutch pack. The left engagement pressure is not applied to the left clutch pack when the cross-shaft aligns with the neutral position of the left clutch housing. The right engagement pressure is not applied to the right clutch pack when the cross-shaft aligns with the neutral position of the right clutch housing. The differential further includes outboard springs that bias the left and right clutch actuators toward one another without applying spring load through the left and right clutch packs.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the examples disclosed herein are based.

BRIEF DESCRIPTION OF THE DRAWINGS

FIG. 17 is a perspective view showing an outboard side of one of the clutch housings of the differential torque transfer arrangement of FIG. 13;

FIG. 18 is a perspective view showing an inboard side of the clutch housing of FIG. 17;

FIG. 19 is an outboard side view of the clutch housing of FIG. 17;

FIG. 20 is an inboard side view of the clutch housing of FIG. 17;

FIG. 21 is a top view of the clutch housing of FIG. 17;

FIG. 22 is a bottom view of the clutch housing of FIG. 17;

FIG. 23 is a side profile of the clutch housing of FIG. 17;

FIG. 24 is an opposite side profile of the clutch housing of FIG. 17;

FIG. 38 shows a main torque transfer assembly of the differential of FIG. 1 in a compressed configuration suitable for allowing the main torque transfer assembly to be loaded into the differential case of FIGS. 4-11.

DETAILED DESCRIPTION

Figure 1:
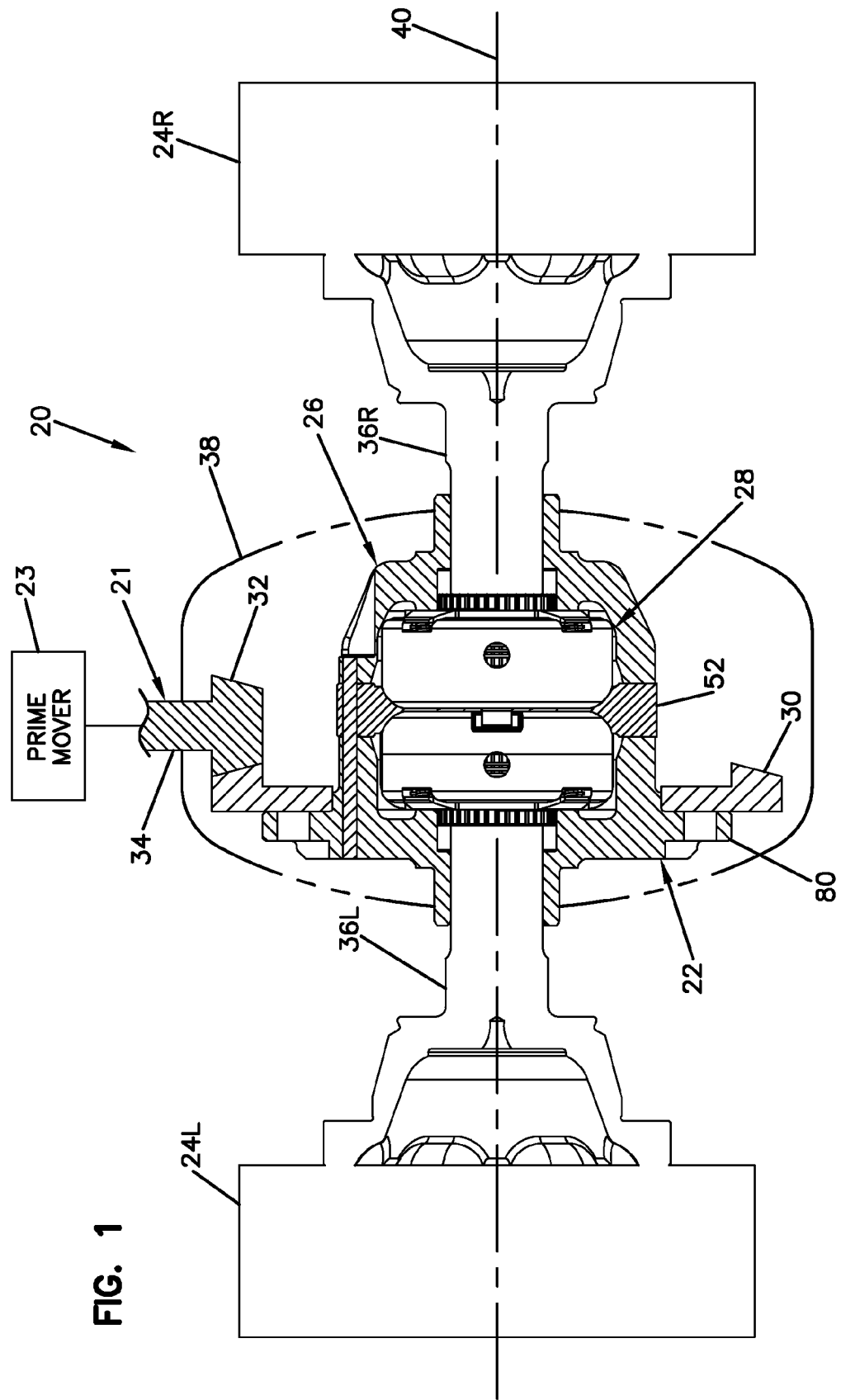
FIG. 1 shows a differential in accordance with the principles of the present disclosure, the differential is shown incorporated into an example axle assembly of a vehicle drivetrain.

FIG. 1 illustrates an axle assembly 20 incorporating a differential 22 in accordance with the principles of the present disclosure. The axle assembly 20 is part of a drive train 21 used to transfer torque from a prime mover 23 (e.g., an engine, a motor, or like power source) to left and right wheels 24L, 24R. The differential 22 includes a differential case 26 and a differential torque transfer arrangement 28 positioned within the differential case 26. The differential case 26 carries a gear 30 (e.g., a ring gear) that intermeshes with a drive gear 32 driven by a driveshaft 34 of the drivetrain 21. The differential torque transfer arrangement 28 is configured to transfer torque from the differential case 26 to left and right axle shafts 36L, 36R that respectively correspond to the left and right wheels 24L, 24R. The differential 22 is enclosed within an axle housing 38 that protects the differential 22 and contains lubricant (e.g., oil) for lubricating moving parts within the axle housing 38. The differential case 26 is mounted to rotate relative to the axle housing 38 about an axis of rotation 40. In one example, bearings can be provided between the differential case 26 and the axle housing 38 to allow the differential case 26 to freely rotate about the axis of rotation 40 relative to the axle housing 38. The left and right axle shafts 36L, 36R are co-axially aligned along the axis of rotation 40.

In certain examples, the axle assembly 20 can be incorporated into a vehicle such as an all-terrain vehicle, a light utility vehicle, or other type of vehicle. The differential 22 of the axle assembly 20 is configured to prevent individual wheel spin and to provide enhanced traction performance on a variety of surfaces such as mud, wet pavement, loose dirt and ice. In use, torque for rotating the differential case 26 about the axis of rotation 40 is provided by the drive gear 32 that intermeshes with gear 30 carried by the differential case 26. The differential torque transfer arrangement 28 includes left and right clutches (e.g., disc style clutches) configured to transfer torque from the rotating differential case 26 to the left and right axle shafts 36L, 36R thereby driving rotation of the left and right wheels 24L, 24R. When the vehicle is driven straight, the left and right clutches are both actuated such that torque from the differential case 26 is transferred equally to the left and right axle shafts 36L, 36R. When the vehicle turns right, the left clutch is deactuated while the right clutch remains actuated. In this state, the differential torque transfer arrangement 28 continues to drive rotation of the right axle shaft 36R while the left axle shaft 36L is allowed to free wheel at a higher rate of rotation than the right axle shaft 36R. When the vehicle makes a left turn, the right clutch is deactuated while the left clutch remains actuated. In this state, the differential torque transfer arrangement 28 continues to drive rotation of the left axle shaft 36L while the right axle shaft 36R is allowed to free wheel at a higher rotational speed than the left axle shaft 36L.

It will be appreciated that the differential case 26 can also be referred to as a differential carrier, a ring gear carrier, a carrier, a differential casing, a differential housing or like terms. Also, the axle housing 38 can be referred to as a carrier housing, a service housing or like terms.

Figure 2:
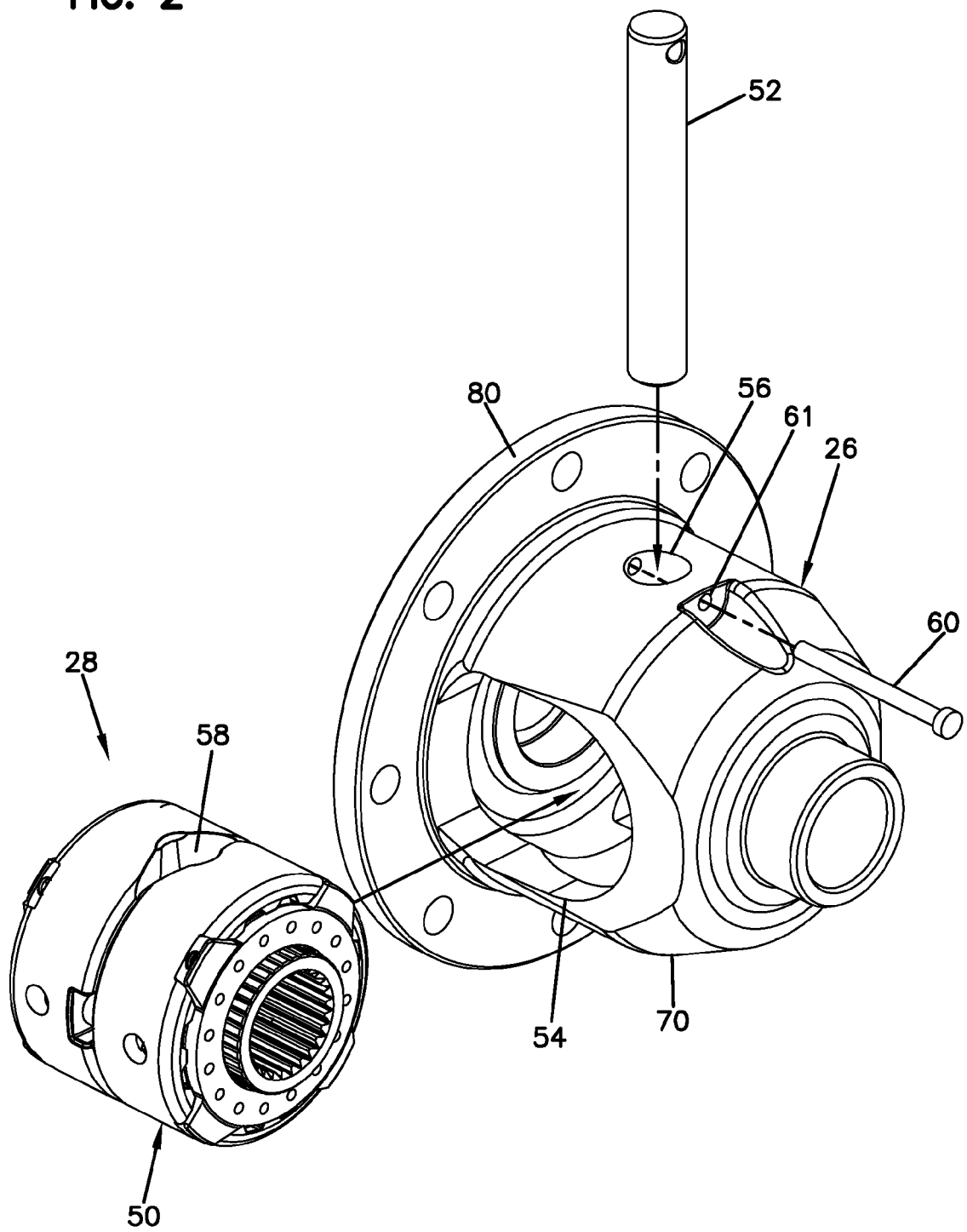
FIG. 2 is a partial exploded view of the differential of FIG. 1 showing a differential torque transfer arrangement exploded from a differential case of the differential.
Figure 3:
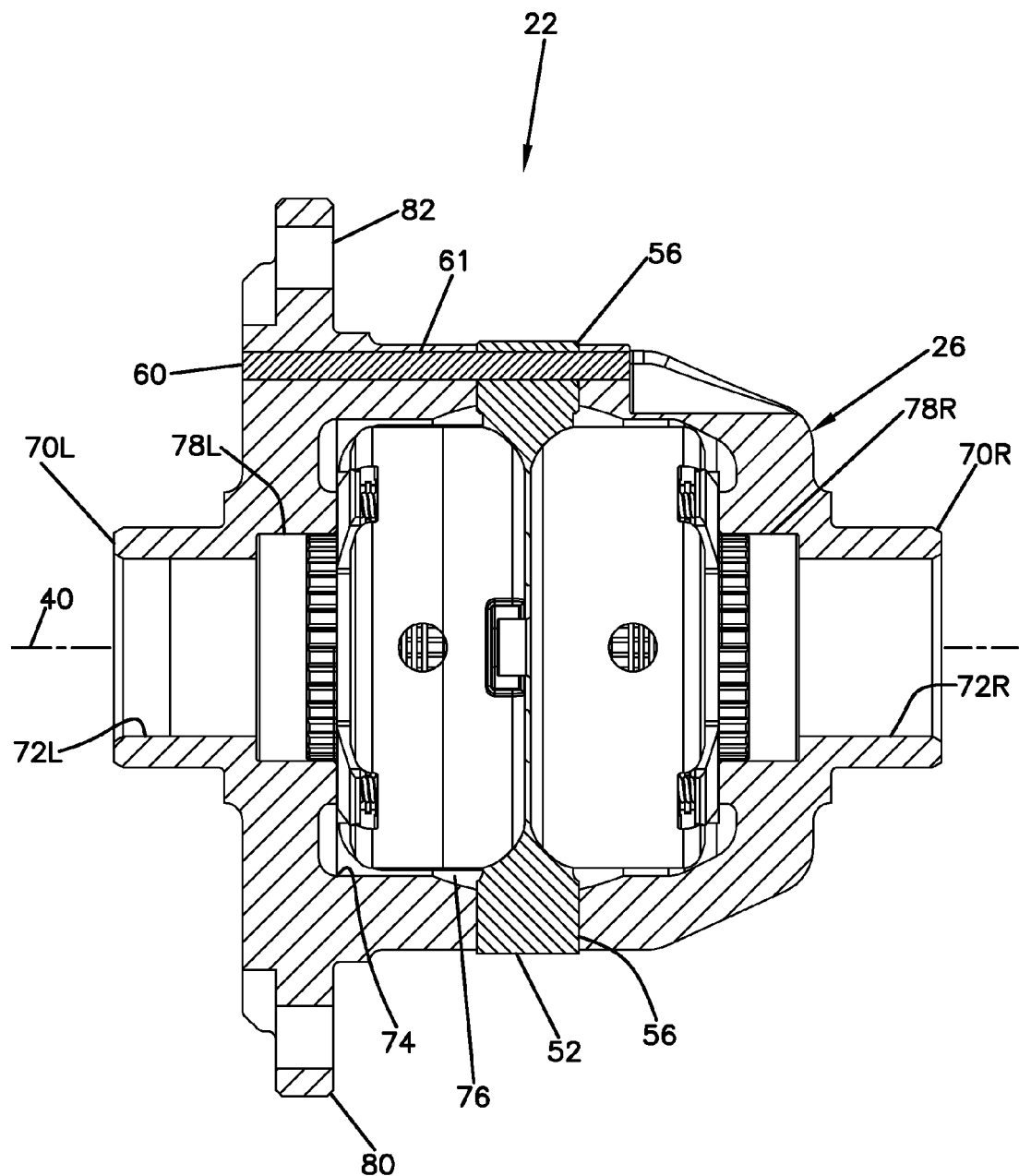
FIG. 3 is a partial cross sectional view of the differential of FIG. 1.
Figure 4:
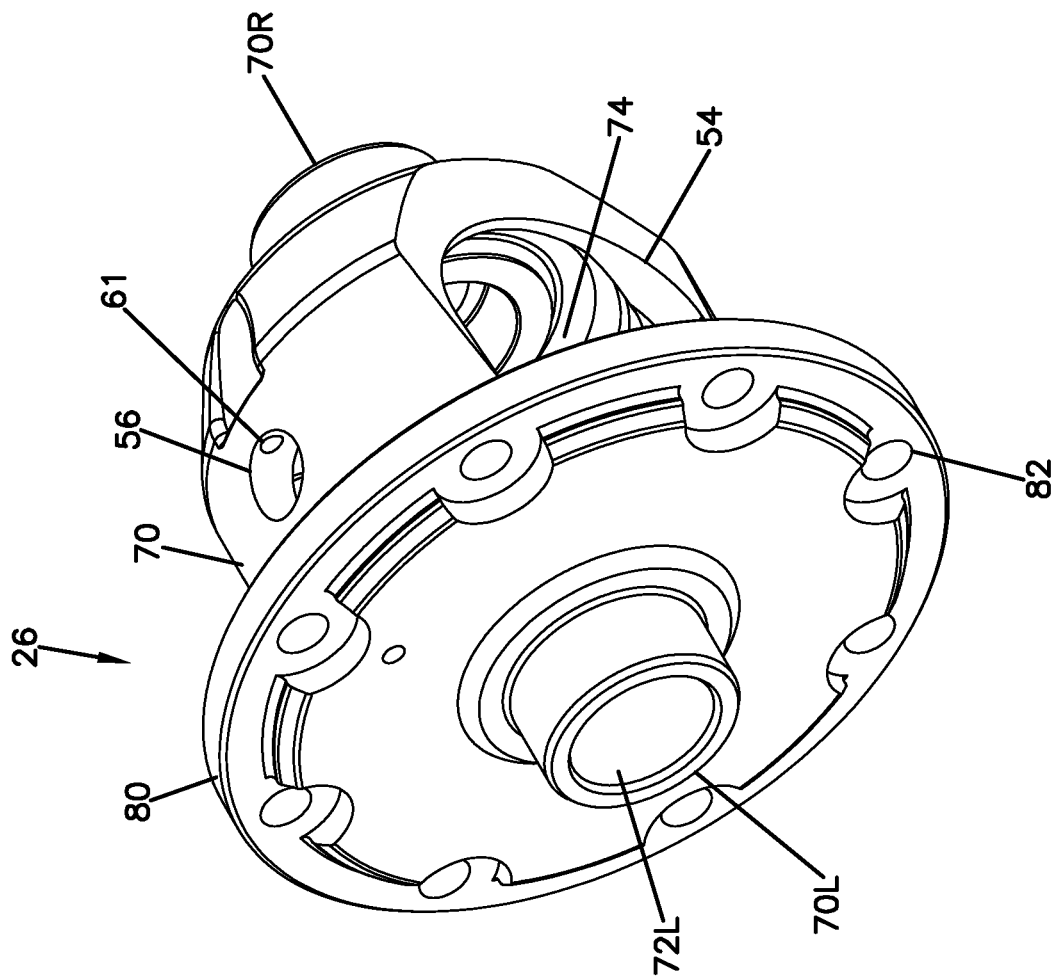
FIG. 4 is a perspective view of the differential case of the differential of FIG. 1.
Figure 5:
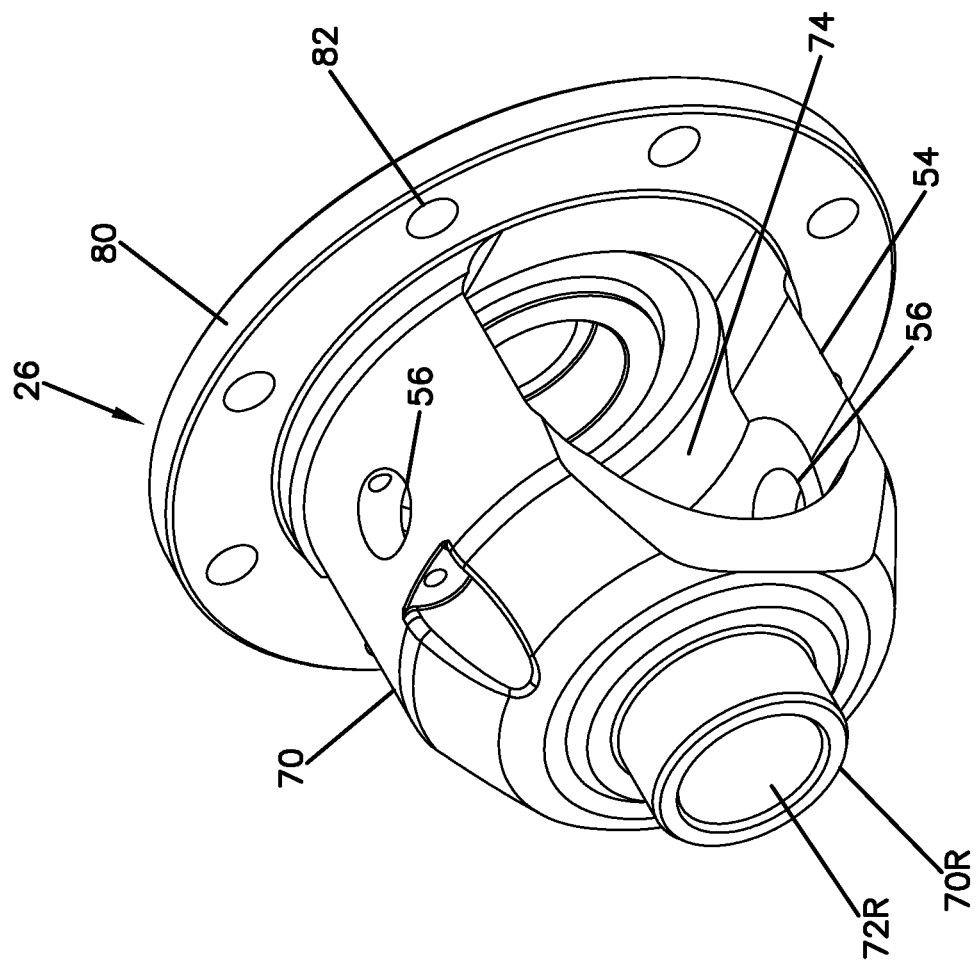
FIG. 5 is another perspective view of the differential case of FIG. 4.
Figure 6:
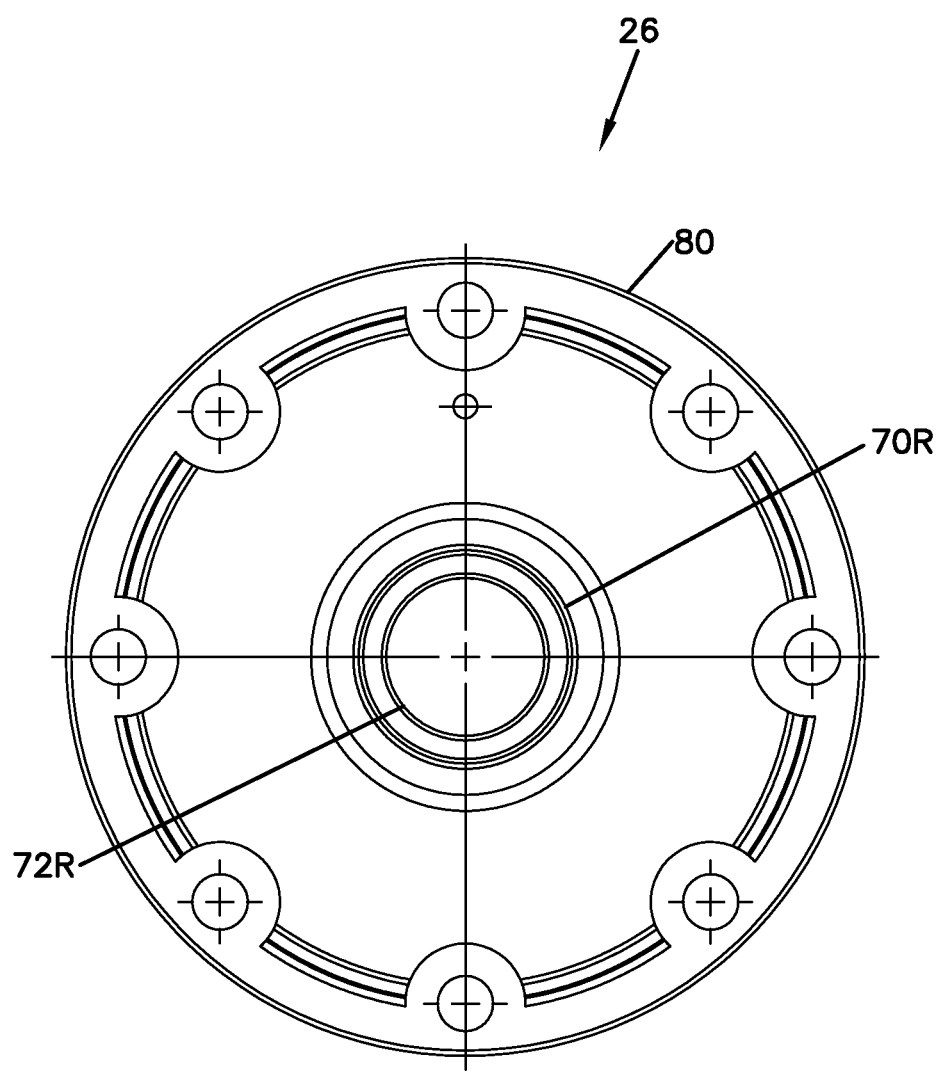
FIG. 6 is an end view of the differential case of FIGS. 4 and 5.
Figure 7:
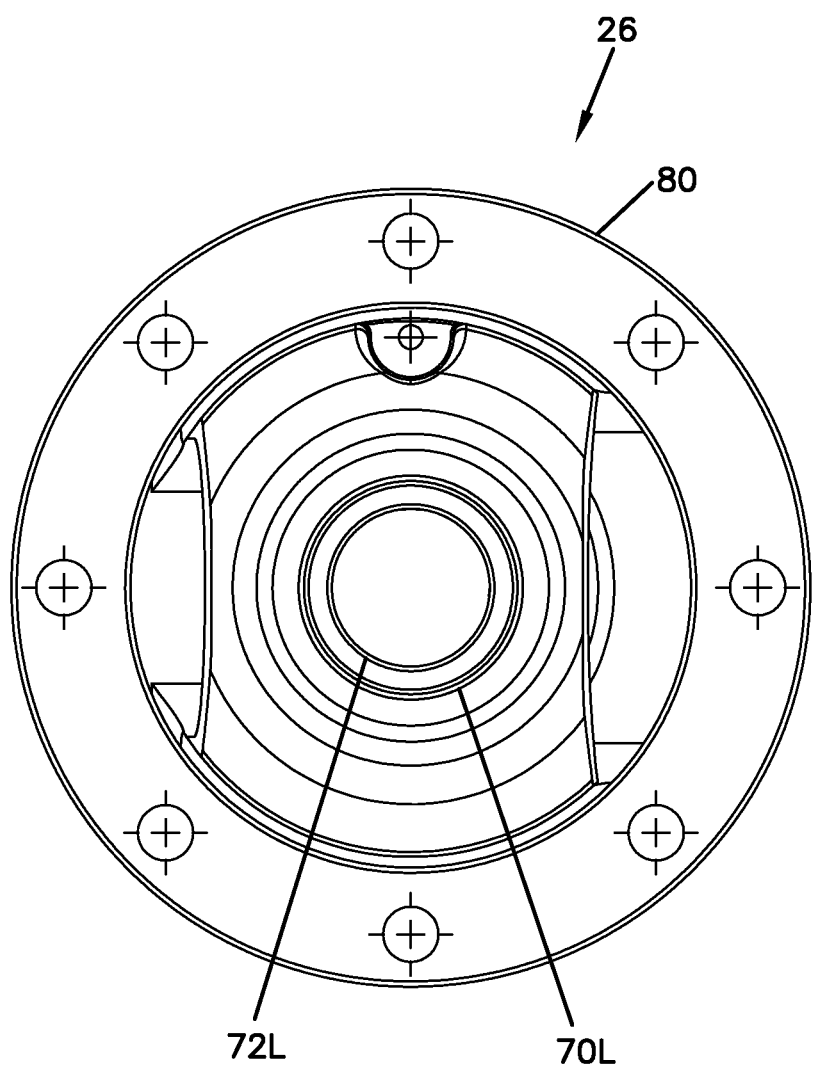
FIG. 7 is an opposite end view of the differential case of FIGS. 4 and 5.
Figure 8:
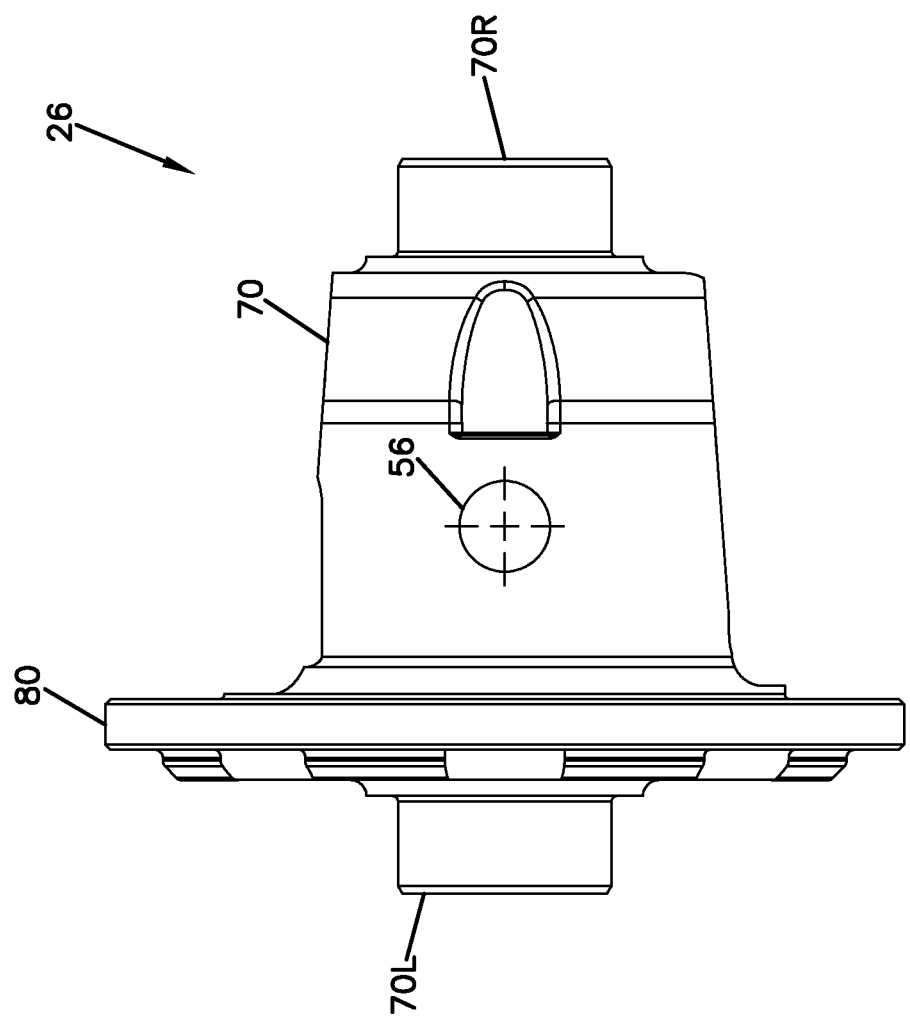
FIG. 8 is a top view of the differential case of FIGS. 4 and 5.
Figure 9:
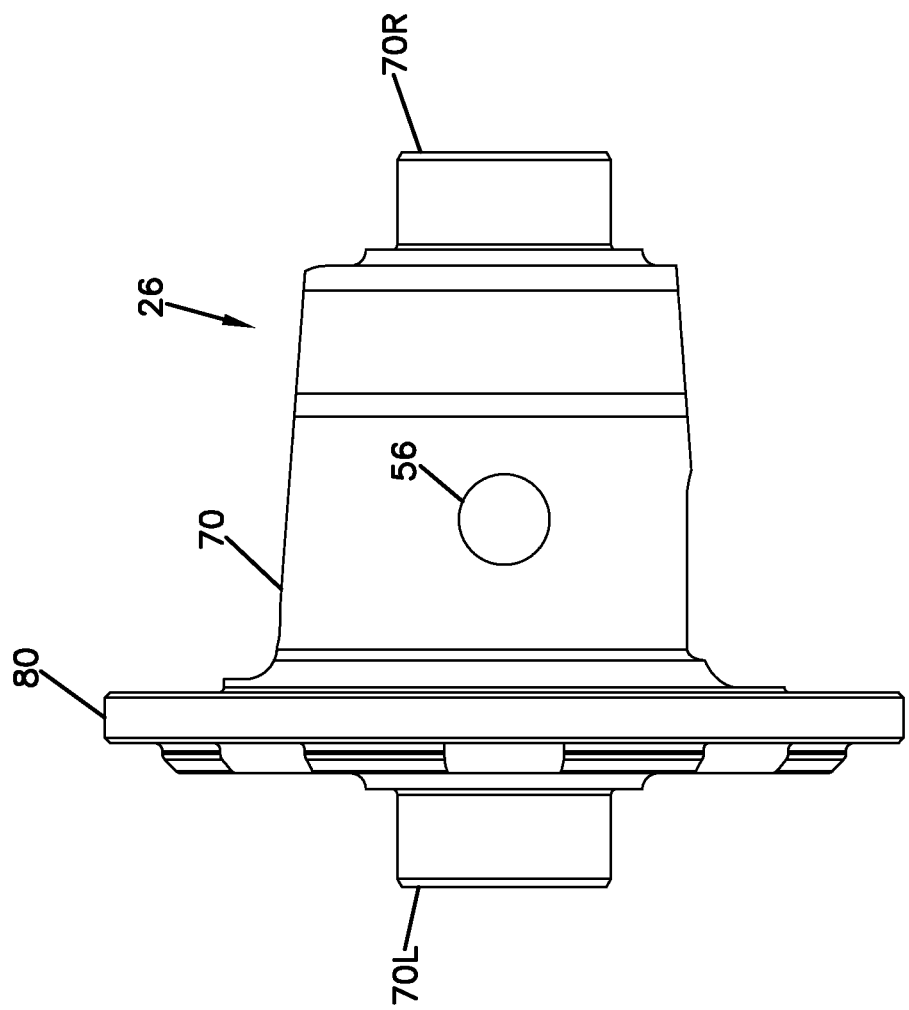
FIG. 9 is a bottom view of the differential case of FIGS. 4 and 5.

Referring to FIG. 2, the differential torque transfer arrangement 28 is shown exploded from the differential case 26. The differential torque transfer arrangement 28 includes a main assembly 50 and a cross-shaft 52. To install the differential torque transfer arrangement 28 in the differential case 26, the main assembly 50 of the differential torque transfer arrangement 28 is inserted laterally into the differential case 26 through a main side opening 54. Once the main assembly 50 is inserted within the differential case 26, the cross-shaft 52 is used to retain the main assembly 50 within the differential case 26. For example, the differential case 26 defines oppositely positioned shaft openings 56 that align with a shaft receptacle 58 of the main assembly 50 when the main assembly 50 is loaded within the differential case 26. By inserting the cross-shaft 52 through the shaft openings 56 and the shaft receptacle 58, the main assembly 50 is secured within the differential case 26 as shown at FIG. 3. In the assembled configuration of FIG. 3, the cross-shaft 52 is positioned within the shaft receptacle 58 and extends through the main assembly 50. Opposite ends of the cross-shaft 52 are positioned within the shaft openings 56 of the differential case 26. A retaining pin 60 can be used to lock the cross-shaft 52 in position relative to the differential case 26. The retaining pin 60 fits within a retaining pin opening 61 defined by the differential case 26. When the cross-shaft 52 is locked in place relative to the differential case 26 as shown at FIG. 3, the differential case 26 is configured to carry the cross-shaft 52 such that the cross-shaft 52 and the differential case 26 rotate in unison with one another as the differential case 26 is rotated about the axis of rotation 40 by the drive gear 32. The configuration allows torque from the drive gear 32 to be transferred through the differential case 26 to the cross-shaft 52.

The differential case 26 includes a main case body 70 having an integral construction. The term "integral construction" means that the main case body 70 is not intended to be taken apart. For example, the main case body 70 can have a unitary, one piece construction. Alternatively, the main case body 70 can include multiple pieces that are connected together by a fastenerless-type connection (e.g., a weld) that is intended to be permanent. In certain examples, the main case body 70 has a construction that cannot be taken apart with destroying the main case body 70.

Figure 10:
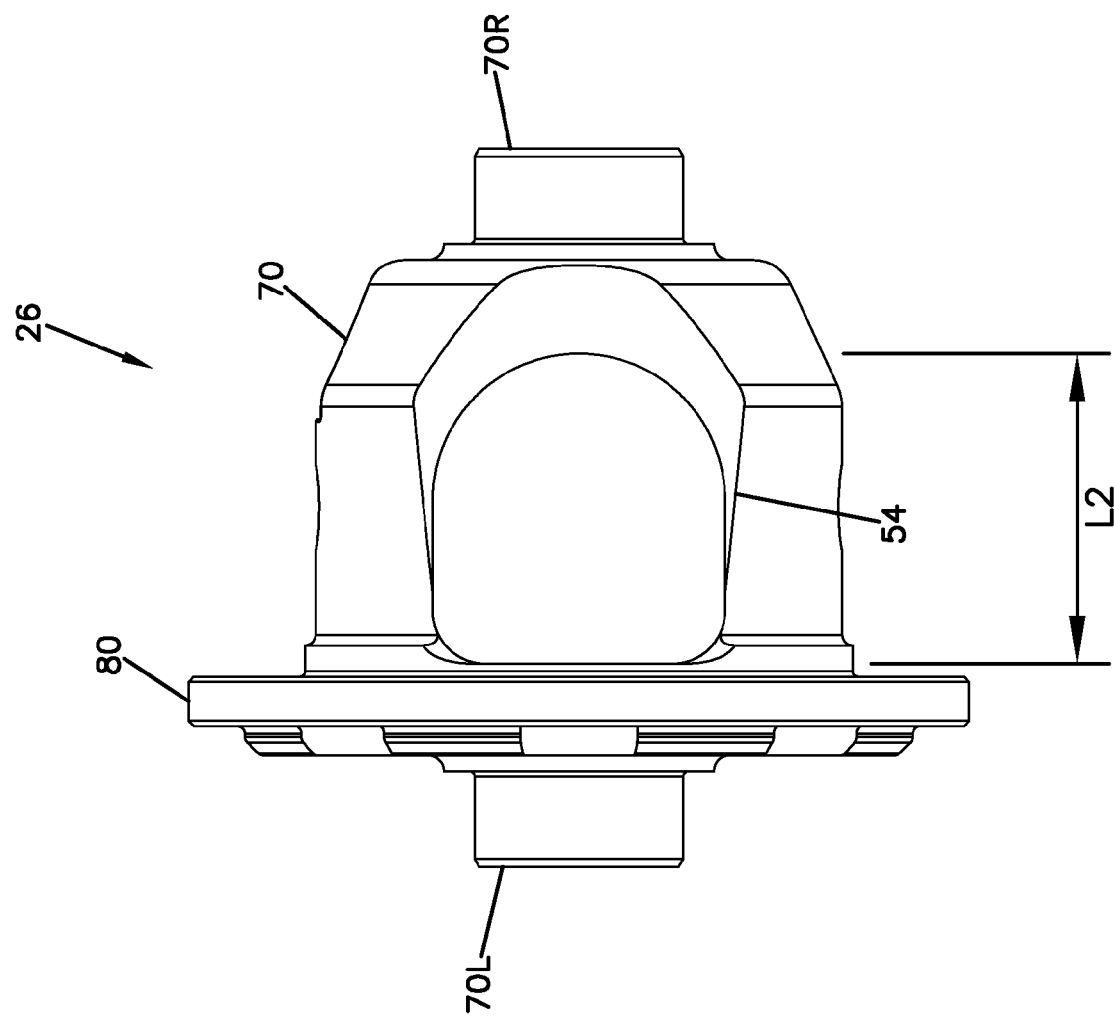
FIG. 10 is a side view of the differential case of FIGS. 4 and 5.
Figure 11:
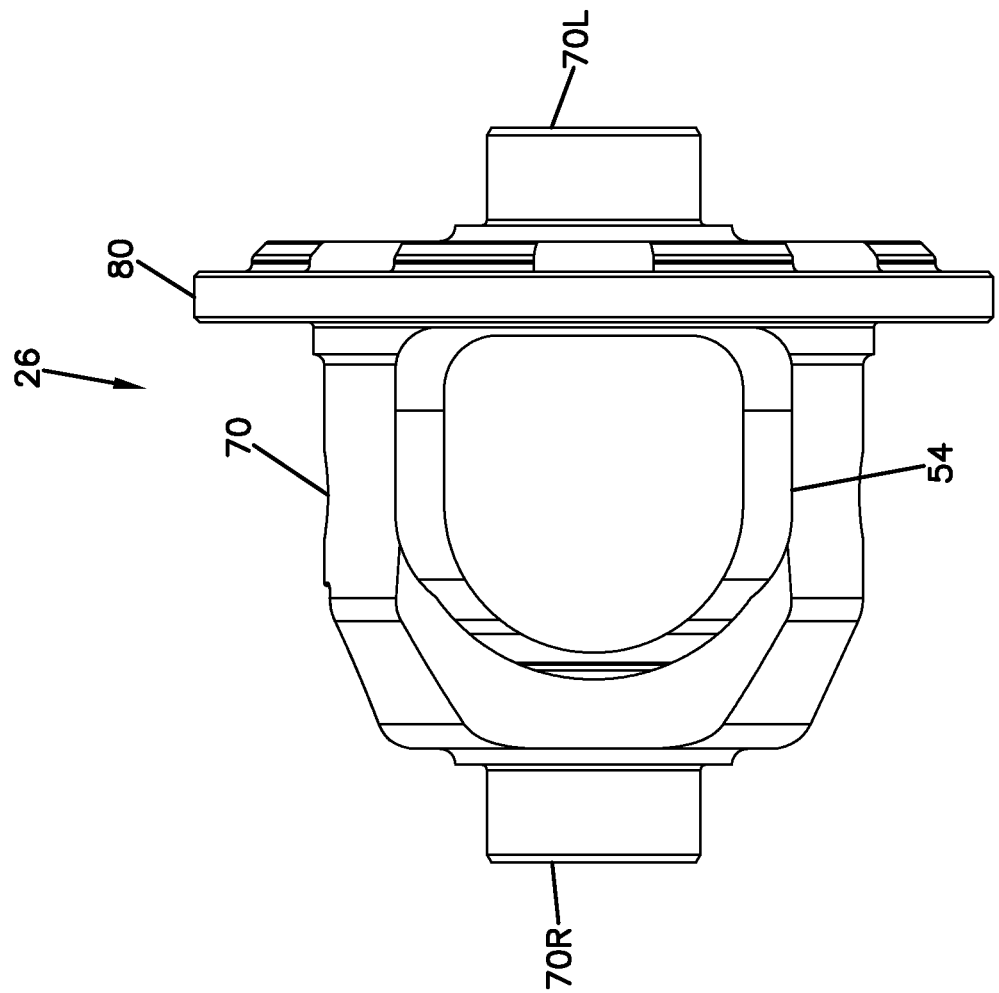
FIG. 11 is an opposite side view of the differential case of FIGS. 4 and 5.

Referring to FIGS. 4-11, the main case body 70 includes a left end 70L and right end 70R. The left end 70L of the main case body 70 defines a left axle shaft opening 72L and the right end 70R of the main case body 70 defines a right axle shaft opening 72R. The left and right axle shaft openings 72L, 72R are coaxially aligned along the axis of the rotation 40 of the differential case 26. As best shown at FIGS. 10 and 11, the main case body 70 defines the main side openings 54 and the shaft openings 56 of the differential case 26. The main side openings 54 provide access to an interior 74 of the main case body 70 and are positioned at diametrically opposite sides of the main case body 70. The shaft openings 56 are configured to receive end portions of the cross-shaft 52 and are positioned at diametrically opposite sides of the main case body 70. In the depicted example, the main side openings 54 are defined at front and back sides of the main case body 70 and the shaft openings are defined at top and bottom sides of the main case body 70.

Referring back to FIG. 3, the interior 74 of the main case body 70 includes a main chamber 76 and left and right pockets 78L, 78R. The left and right pockets 78L, 78R are depicted as being coaxially aligned with the axis of rotation 40 of the differential case 26. The main case body 70 further includes a gear mounting flange 80 that extends circumferentially around an exterior of the main case body 70. The gear mounting flange 80 is depicted as being coaxially aligned with the axis of rotation 40 of the differential case 26. In one example, the gear mounted flange 80 is configured for facilitating mounting the gear 30 to the main case body 70. For example, the gear mounted flange 80 can define fastener openings 82 for receiving fasteners used to attach the gear 30 to the main case body 70. Once the gear 30 has been attached to the main case body 70, the gear 30 and the differential case 26 are configured to rotate in unison with one another about the axis of rotation 40 when the gear 30 is driven by the drive gear 32.

Figure 12:
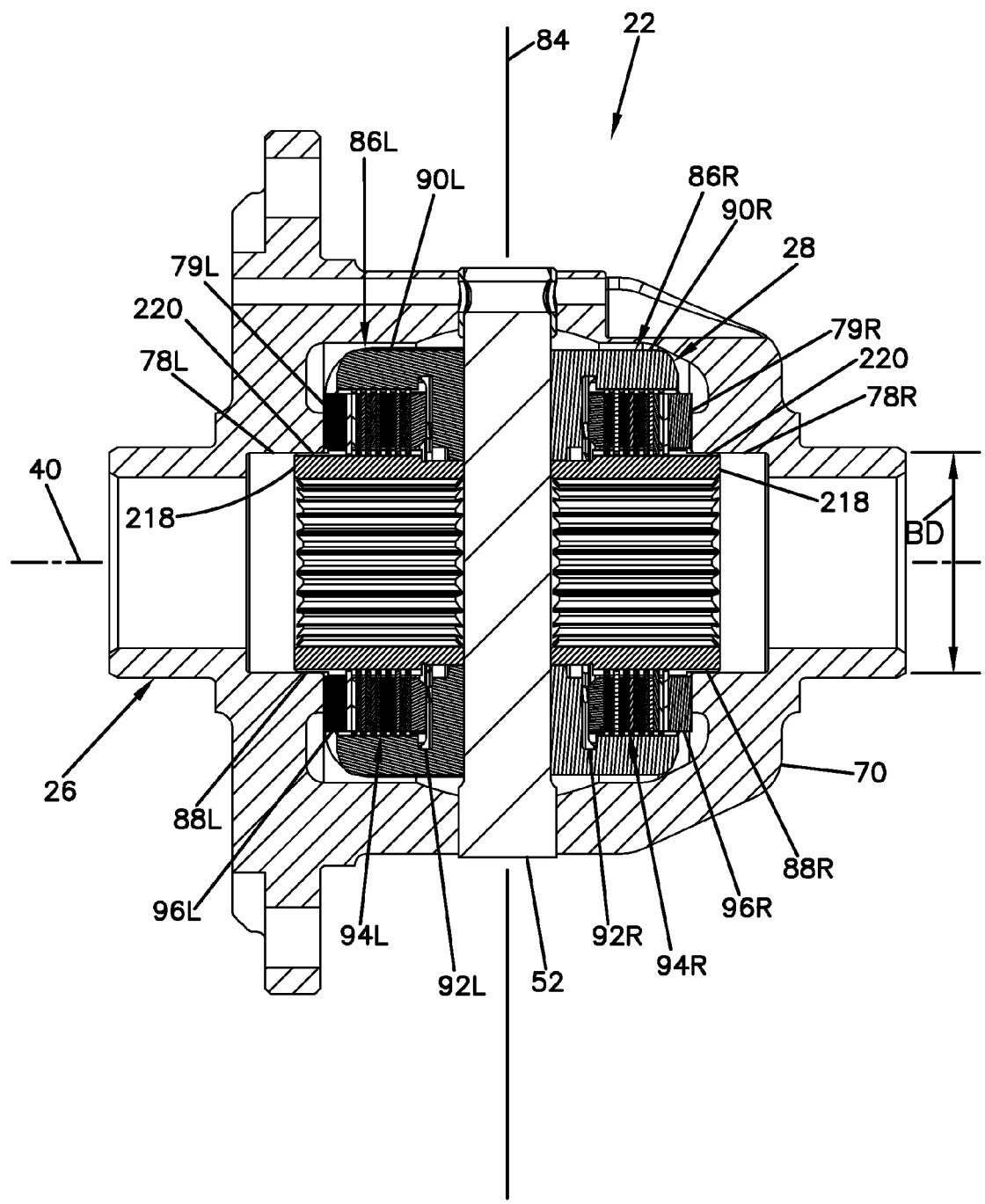
FIG. 12 is a full cross sectional view of the differential of FIG. 1.
Figure 13:
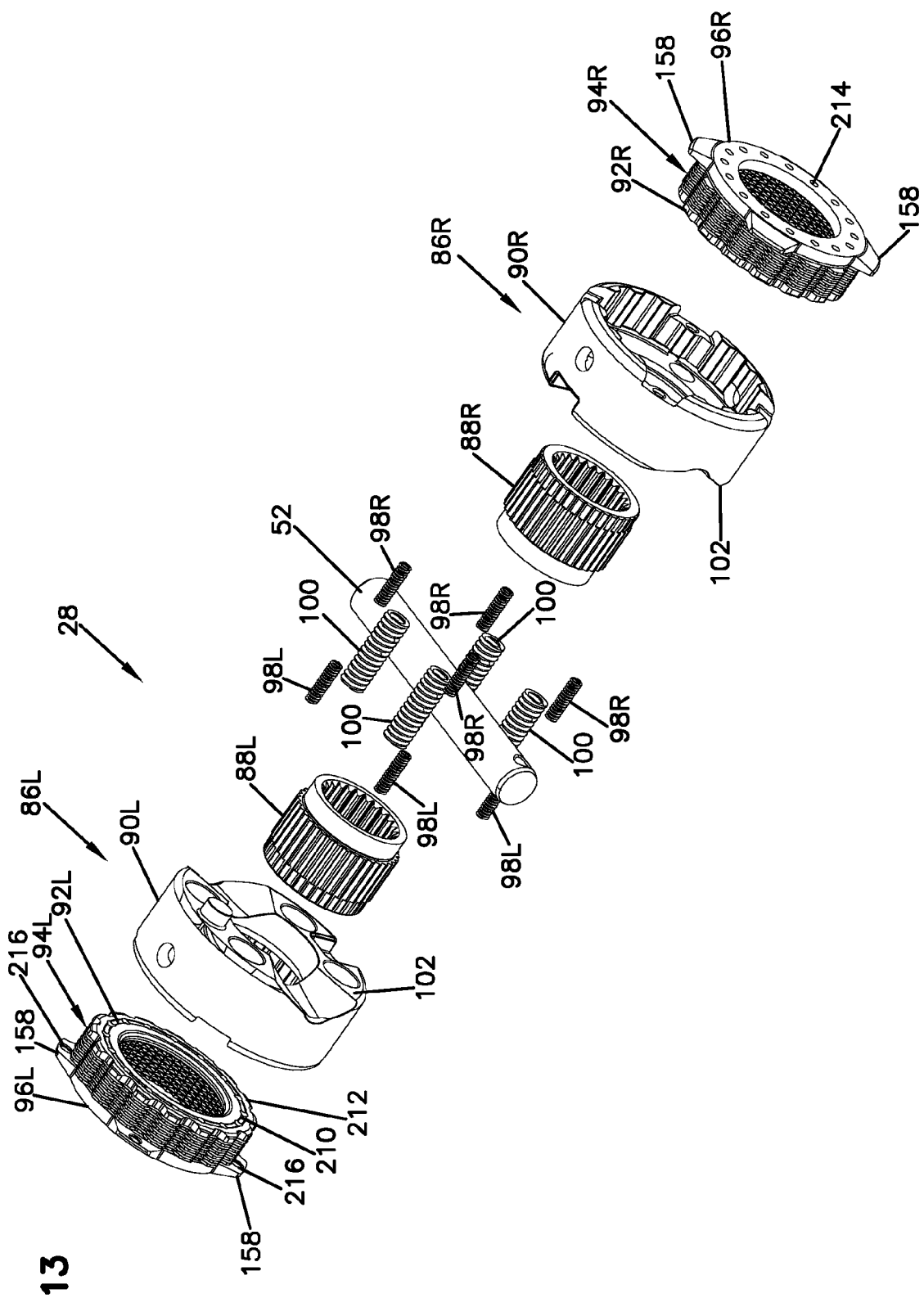
FIG. 13 is a fully exploded view of the differential torque transfer arrangement of FIG. 12.

Referring now to FIGS. 12 and 13, the differential torque transfer arrangement 28 defines a central reference plane 84 that longitudinally bisects the cross-shaft 52 of the differential torque transfer arrangement 28. The differential torque transfer arrangement 28 includes left and right assemblies 86L, 86R positioned generally on opposite sides of the central reference plane 84. The left assembly 86L includes a left axle hub 88L, a left clutch actuator 90L, a left inboard thrust washer 92L, a left clutch pack 94L, a left outboard thrust washer 96L and left outboard springs 98L. The right assembly 86R includes a right axle hub 88R, a right clutch actuator 90R, a right inboard thrust washer 92R a right clutch pack 94R, a right outboard thrust washer 96R and right outboard springs 98R. The differential torque transfer arrangement 28 also includes clutch pre-load springs 100 that traverse (i.e., extend across, intersect, etc.) the central reference plane 84 (see FIG. 31). The central reference plane 84 extends along an interface between the left and right clutch actuators 90L, 90R and is perpendicular with respect to the axis of rotation 40.

The clutch pre-load springs 100 form a first spring arrangement that applies pre-loads to the left and right clutch packs 94L, 94R. In one example, each of the clutch pre-load springs 100 applies pre-load pressure to both the left and right clutch packs 94L, 94R without applying pressure to the left and right clutch actuators 90L, 90R. Thus, the clutch pre-load springs 100 do not bias the left and right clutch actuators 90L, 90R apart from one another. The clutch pre-load springs 100 are positioned inboard of the left and right clutch packs 94L, 94R. The left and right outboard springs 98L, 98R form second spring arrangements configured to bias the left and right clutch actuators 90L, 90R toward one another (see FIG. 30). In one example, the second spring arrangement is configured to not transfer spring pressure through the left and right clutch packs 94L, 94R.

In certain examples of the present disclosure, the left and right clutch actuators 90L, 90R can be referred to as left and right clutch housings. In such examples, the left and right clutch actuators 90L, 90R can include structure for at least partially housing left and right clutch packs 94L, 94R. In the depicted example, the components of the left and right assemblies 86L, 86R can have identical constructions. Thus, the left and right axle hubs 88L, 88R can be referred to generally as axle hubs 88; the left and right clutch actuators 90L, 90R can be referred to generally as a clutch actuators 90; the left and right inboard thrust washers 92L, 92R can be referred to generally as inboard thrust washers 92; the left and right clutch packs 94L, 94R can be referred to generally as clutch packs 94; the left and right outboard thrust washers 96L, 96R can be referred to generally as outboard thrust washers 96; and the left and right outboard springs 98L, 98R can be referred to generally as outboard springs 98.

Referring again to FIG. 12, the differential torque transfer arrangement 28 is shown mounted within the differential case 26. With the differential torque transfer arrangement 28 mounted within the differential case 26 as shown at FIG. 12, the axle hubs 88, the clutch actuators 90, the inboard thrust washers 92, the clutch packs 94, and the outboard thrust washers 96 are all generally coaxially aligned with the axis of rotation 40 of the differential case 26. Outboard end portions of the left and right axle hubs 88L, 88R fit within the left and right pockets 78L, 78R of the main case body 70 of the differential case 26. The left and right outboard thrust washers 96L, 96R respectively abut against left and right stops 79L, 79R defined by the main case body 70. The left and right stops 79L, 79R oppose the pre-load pressure applied to the left and right clutch packs 94L, 94R by the clutch pre-load springs 100. For example, the clutch pre-load springs 100 apply outward axial spring load through the inboard thrust washers 92 to the clutch packs 94. In this way, the clutch packs 94 are axially compressed between the inboard thrust washers 92, (which are outwardly biased by the clutch pre-load springs 100) and the outboard thrust washers 96 (which are held in place by the stops 79 of the main case body 70).

Figure 14:
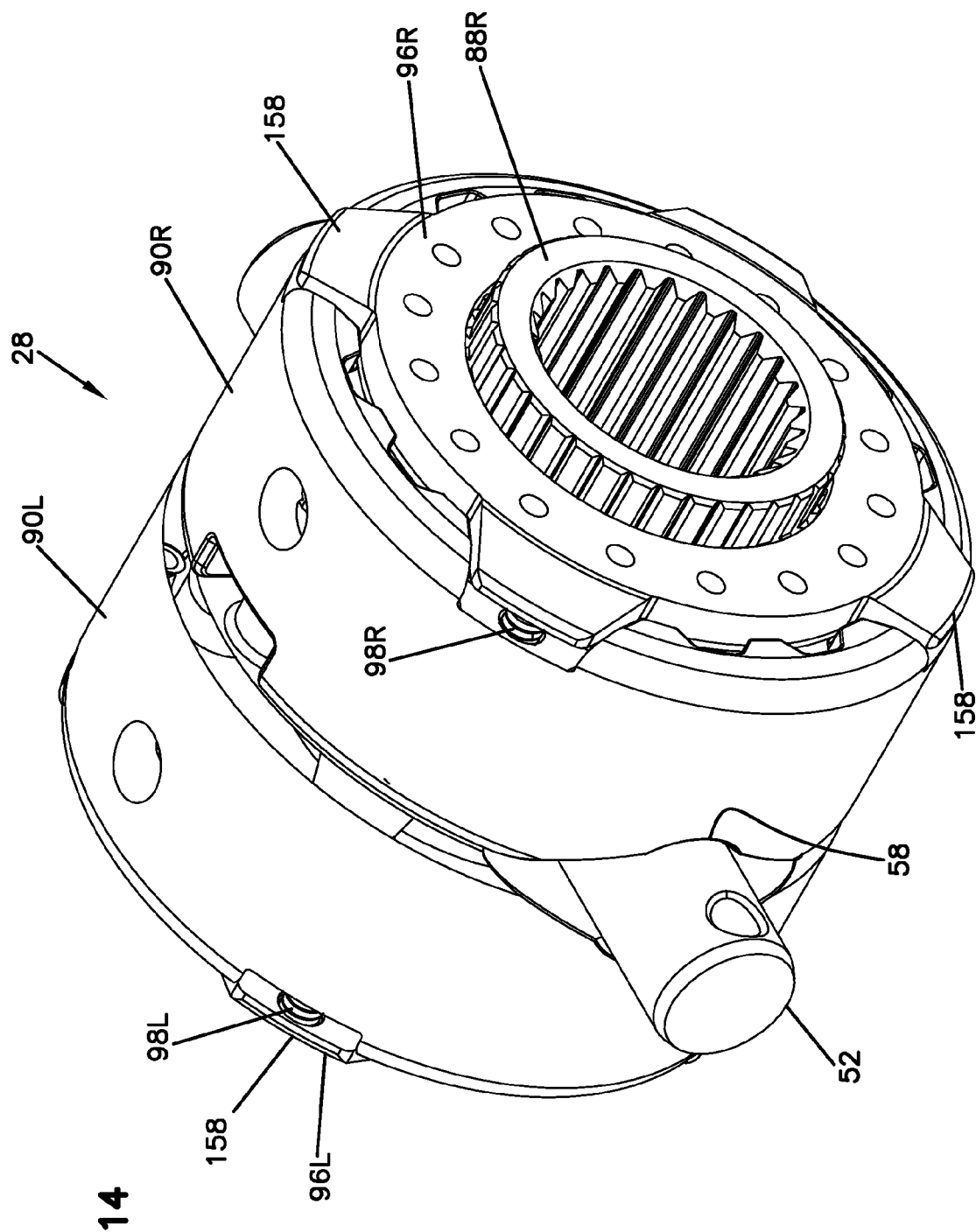
FIG. 14 is a perspective view of the differential torque transfer arrangement of the differential of FIG. 13.
Figure 15:
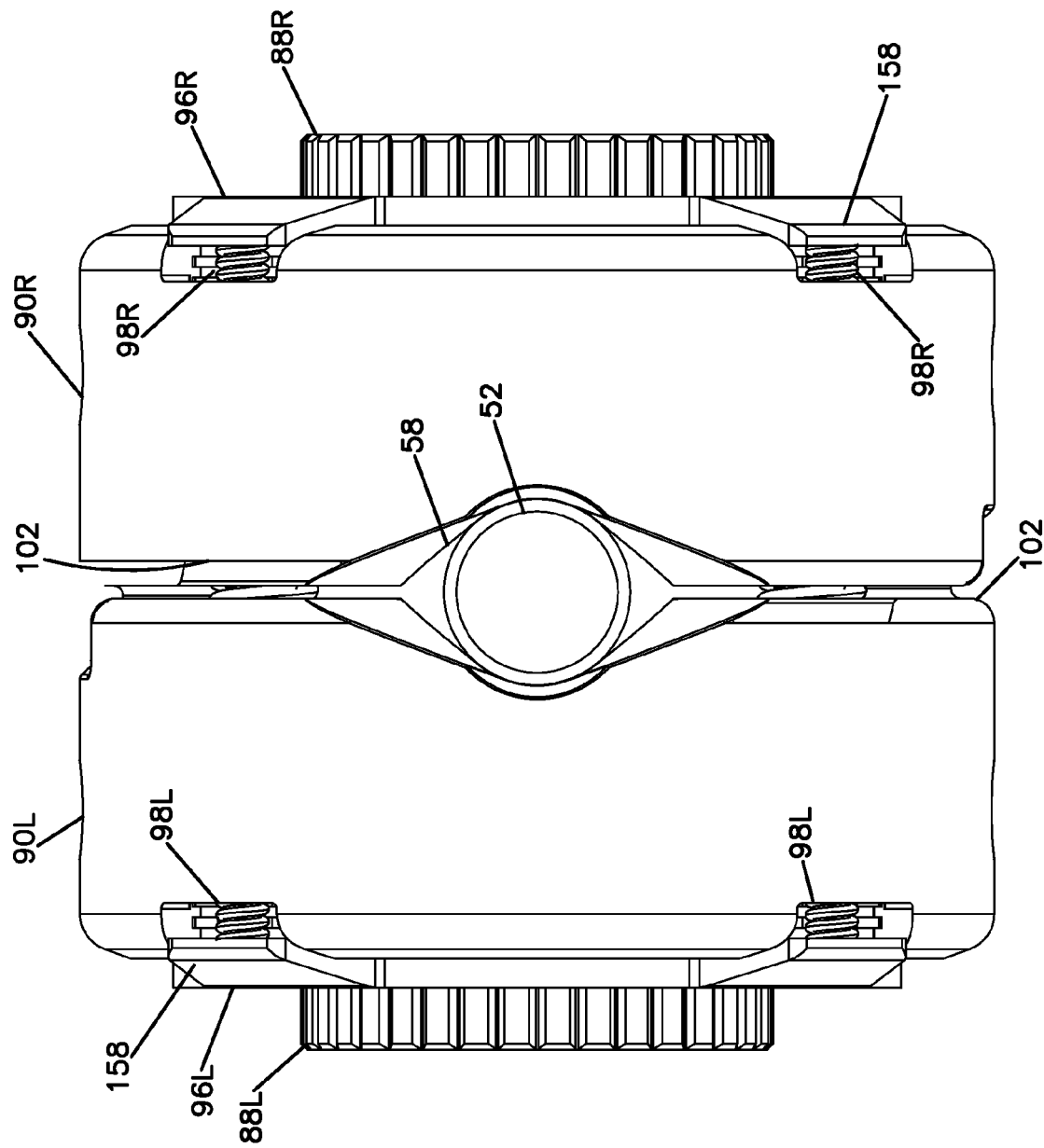
FIG. 15 is a top view of the differential torque transfer arrangement of FIG. 13.
Figure 16:
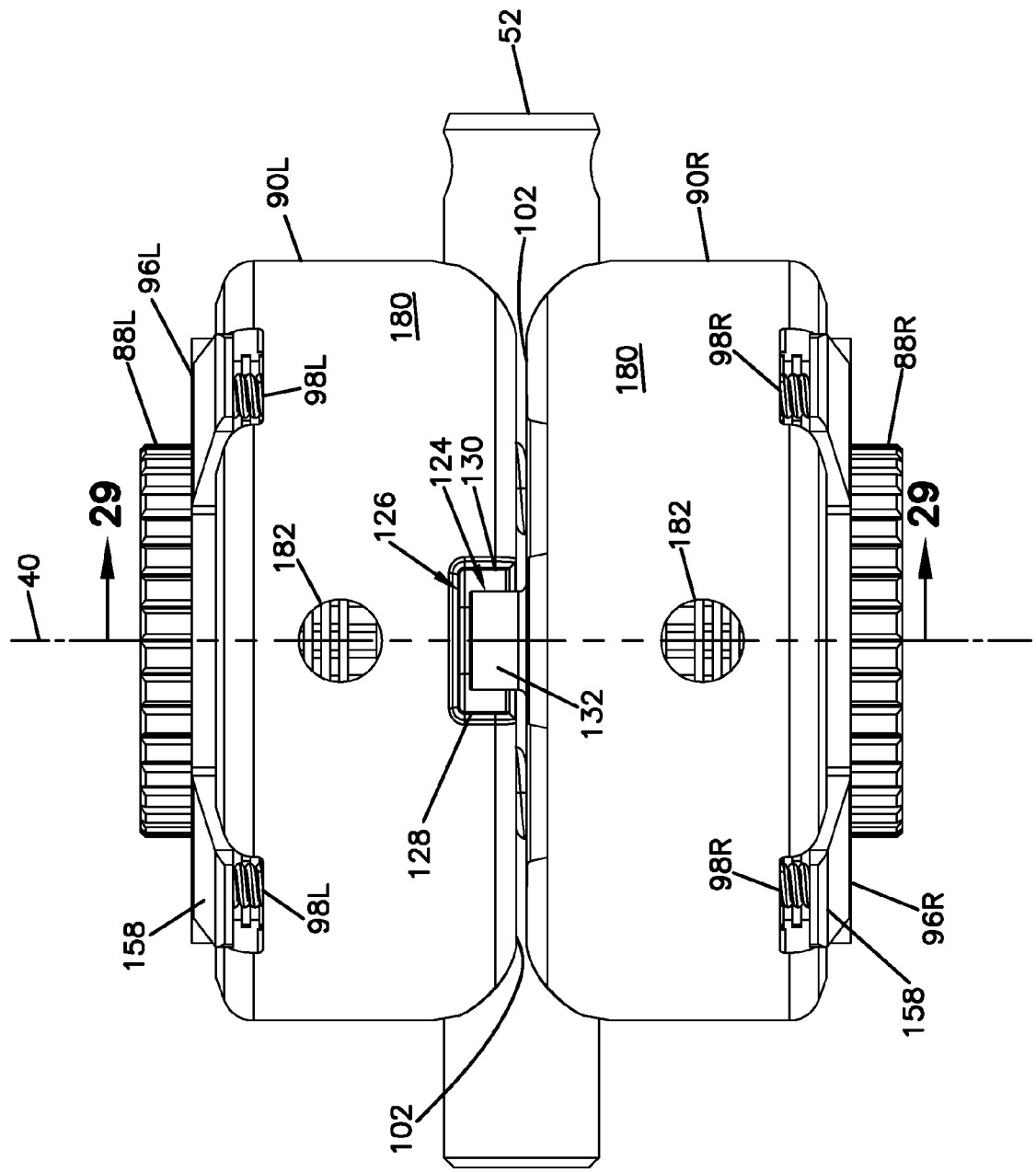
FIG. 16 is a side view of the differential torque transfer arrangement of FIG. 13.

FIGS. 14-16 show the differential torque transfer arrangement 28 in an assembled configuration and FIGS. 17-24 show one of the clutch actuators 90 in isolation from the remainder of the differential torque transfer arrangement 28. When the differential torque transfer arrangement 28 is in the assembled configuration as shown at FIGS. 14-16, inboard sides 102 of the left and right clutch actuators 90L, 90R cooperate to define the shaft receptacle 58 in which the cross-shaft 52 is received. For example, as shown at FIGS. 18 and 20, the inboard side 102 of each clutch actuator 90 includes first and second actuator pockets 104, 106. The actuator pockets 104, 106 are positioned between inner and outer circumferential boundaries B1, B2 of each clutch actuator 90. The inner circumferential boundary B1 corresponds to an inner diameter D1 of each clutch actuator 90 and the outer circumferential boundary B2 corresponds to an outer diameter D2 of each clutch actuator 90. The inner circumferential boundary B1 defines a central opening 108 of each clutch actuator 90. The inner and outer circumferential boundaries B1, B2 are cylindrical and are centered about a central axis 110 of each clutch actuator 90. When the left and right clutch actuators 90L, 90R are mounted within the differential case 26, the central axes 110 coaxially align with the axis of rotation 40 of the differential case 26.

As best shown at FIGS. 18 and 20, each of the actuator pockets 104, 106 includes a neutral position 112 that corresponds to a deepest portion of each of the actuator pockets 104, 106. The neutral positions 112 are positioned on diametrically opposite sides of the central axes 110 of the clutch actuators 90 (i.e., the neutral positions are aligned along a diameter line of each clutch actuator 90). The actuator pockets 104, 106 are each defined in part by first and second ramp surfaces 114, 116. The first and second ramp surfaces 114, 116 are angled to converge toward the neutral positions 112. The first ramp surfaces 114 angle away from the neutral positions 112 as the first ramp surfaces 114 extend in a first rotational direction 118 (FIG. 20) about the central axis 110. The second ramp surfaces angle away from the neutral positions 112 as the second ramp surfaces 116 extend in a second rotational direction 120 (FIG. 20) about the central axis 110. The actuator pockets 104, 106 also include shaft insertion chamfers 122 positioned at the neutral positions 112 of the actuator pockets 104, 106 adjacent the outer circumferential boundary B2 of each clutch actuator 90. When the differential torque transfer arrangement 28 is assembled, the first and second actuator pockets 104, 106 of the left clutch actuator 90L cooperate with the first and second actuator pockets 104, 106 of the right clutch actuator 90R to define the shaft receptacle 58. The shaft insertion chamfers 122 provide an angle transition at the outer circumferential boundaries B2 of the left and right clutch actuators 90L, 90R for providing a gradual lead-in to the first and second actuator pockets 104, 106. The gradual lead-in is configured to facilitate inserting the cross-shaft 52 into the shaft receptacle 58 to secure the main assembly 50 of the differential torque transfer arrangement 28 within the differential case 26 during assembly of the differential 22. The shaft insertion chamfers 122 assist in facilitating forcing the left and right clutch actuators 90L, 90R apart against the bias of the outboard springs 98 as the cross-shaft 52 is inserted into the shaft receptacle 58.

Figure 29:
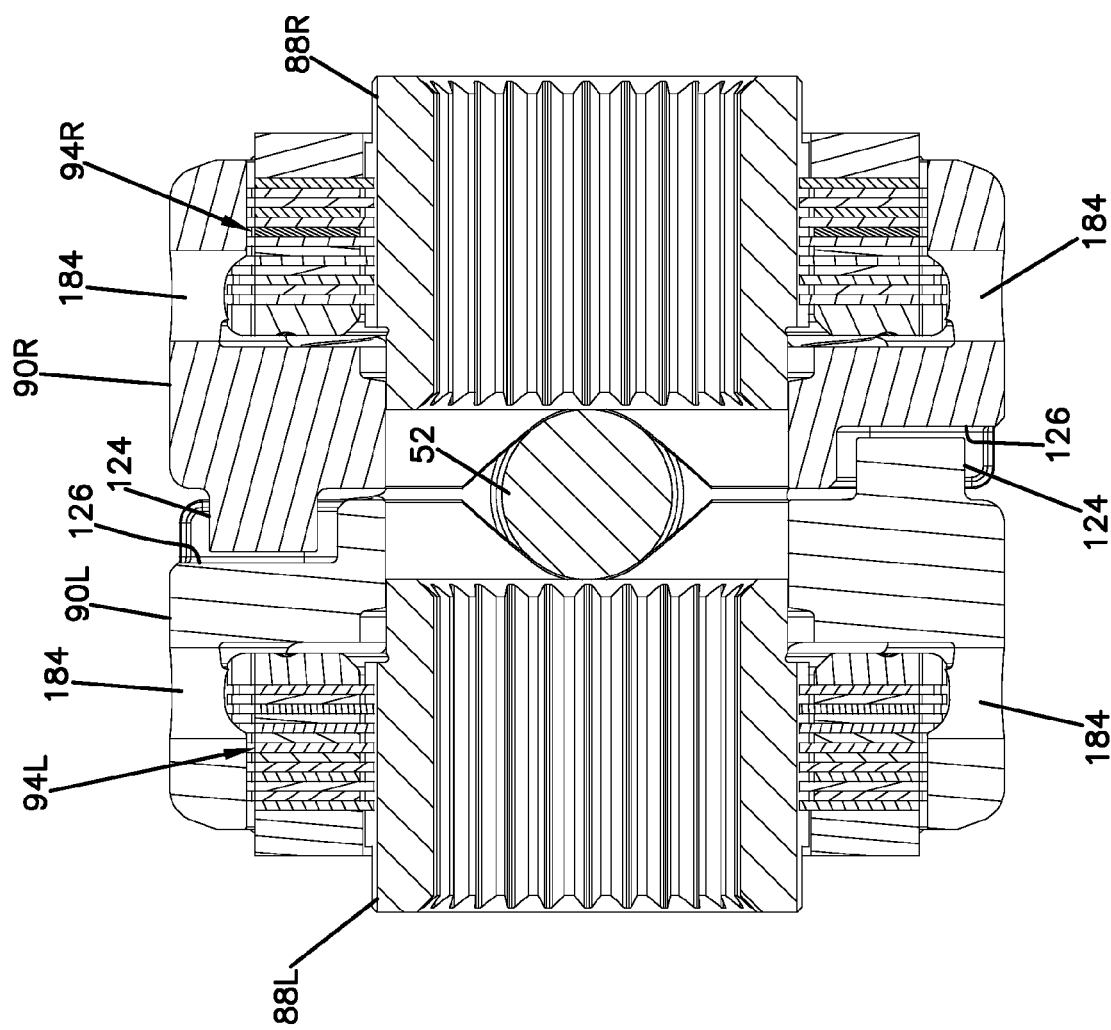
FIG. 29 is a cross sectional view taken along section line 29-29 of FIG. 16.

The left and right clutch actuators 90L, 90R also include an interlock structure for limiting relative rotation between the left and right clutch actuators 90L, 90R about the axis of rotation 40 of the differential 22. For example, referring to FIGS. 18 and 20, the inboard sides 102 of the clutch actuator 90 include relative rotation limiters in the form of posts 124 and post receptacles 126. As shown in FIG. 20, the post 124 and the post receptacle 126 of each clutch actuator 90 are positioned on diametrically opposite sides of the central opening 108 and are aligned along a diameter line of each clutch actuator 90. Each post receptacle 126 is defined in part by opposing first and second stops surfaces 128, 130. A spacing S between the stops surfaces 128, 130 is larger than a cross dimension CD of each post 124. When the torque transfer arrangement 28 is assembled, the post 124 of the left clutch actuator 90L fits within the post receptacle 126 of the right clutch actuator 90R and the post 124 of the right actuator 90R fits within the post receptacle 126 of left clutch actuator 90L (see FIGS. 16 and 29).

Contact between the posts 124 and the stop surfaces 128, 130 allows for only a limited range of relative rotational movement between the left and right clutch actuators 90L, 90R about the axis of rotation 40. Each of the posts 124 has a contact surface of 132 that engages the stop surfaces 128, 130 to limit relative rotation between the left and right clutch actuators 90L, 90R. For example, the contact surfaces 132 engage the first stop surfaces 128 to limit the amount that: a) the left clutch actuator 90L can rotate in the first direction 118 relative to the right clutch actuator 90R; and b) the right clutch actuator 90R can rotate in the second direction 120 relative to the left clutch actuator 90L. Similarly, the contact surfaces 132 engage the second stop surfaces 130 to limit the amount that: a) the left clutch actuator 90L can rotate in the second direction 120 relative to the right clutch actuator 90R; and b) the right clutch actuator 90R can rotate in the first direction 118 relative to the left clutch actuator 90L. In one example, the stop surfaces 128, 130 have a different shape or profile than the contact surfaces 132. In one example, the contact surfaces 132 are curved and the stop surfaces 128, 130 are planar. In the depicted example, the contact surface 132 of each of the posts 124 is cylindrical and extends around a periphery of each of the posts 124. In certain examples, the contact surfaces 132 are configured to make line contact with the stop surfaces 128, 130.

During normal straight, forward driving conditions, the cross-shaft 52 engages the ramp surfaces 114 (see FIG. 34) causing actuation of the clutch packs 94 such that torque is transferred from the cross-shaft 52 through the actuators 90, the clutch packs 94 and the side hubs 88 to the axle shafts 36. In this condition, the posts 124 are centered within the post receptacles 126 (see FIG. 34). Since the spacings S between the stop surfaces 128, 130 of the post receptacles 126 are larger than the cross-dimension CD of the posts 124, gaps G are defined between the posts 124 and the stop surfaces 128, 130 when the posts 124 are centered within the post receptacles 126. The gaps G are sized to correspond with a distance D. The distance D represents the distance of relative movement between the cross-shaft 52 and one of the actuators 90 as the actuator 90 moves/rotates relative to the cross-shaft 52 from a fully engaged position (e.g., see actuator 90L at FIG. 34) to a non-engaged position (e.g., see actuator 90L at FIG. 35). In the fully engaged position, engagement exists between the cross-shaft 52 and the ramp surfaces 114 of the actuator 90 such that the clutch pack 94 corresponding to the actuator 90 is axially compressed and fully actuated. In the non-engaged position, the ramp surfaces 114 of the actuator 90 are disengaged from the cross-shaft 52 such that only pre-load pressure is applied to the corresponding clutch pack 94. The centerline of the cross-shaft 52 aligns with the neutral position 112 of the actuator 90 when the actuator 90 is in the non-engaged position.

Figure 35:
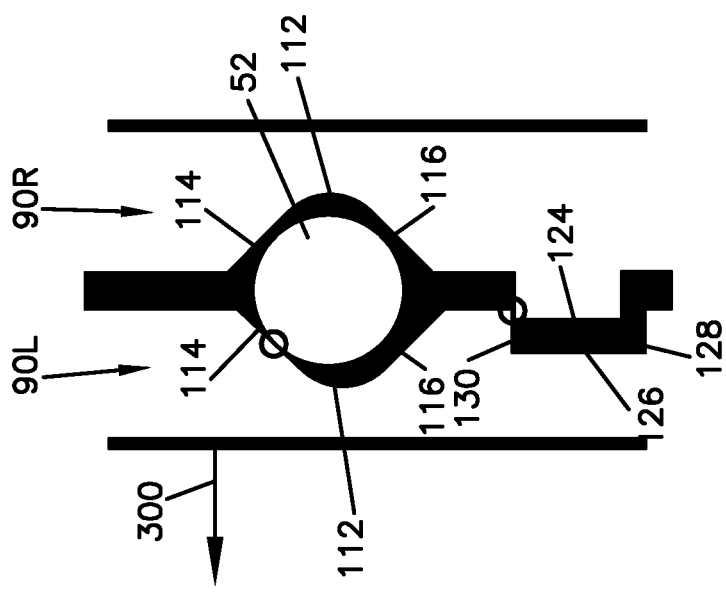
FIG. 35 schematically shows the differential torque transfer arrangement of FIG. 13 in a forward ring drive condition with left wheel over-speed.
Figure 36:
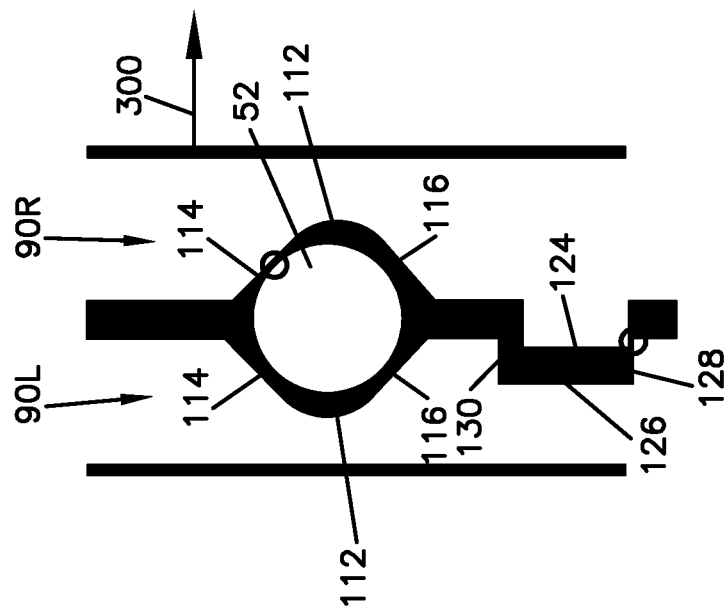
FIG. 36 schematically shows the differential torque transfer arrangement of FIG. 13 in a forward ring drive condition with right wheel over-speed.

During an overspeed condition, the actuator 90 corresponding to the overspeeding wheel rotates relative to the cross-shaft 52 and the other actuator 90 from the engaging position toward the non-engaging position. One of the gaps G of each relative rotation limiter (e.g., of each post 124 and post receptacle 126) closes as the actuator 90 moves toward the non-engaging position. Contact between the posts 124 and corresponding ones of the stop surfaces 128, 130 positively stops the actuator 90 at the non-engagement position. For example, FIG. 35 shows a condition where one of the posts 124 engages the stop surface 128 to positively stop the actuator 90L in the non-engaging position. Similarly, FIG. 36 shows a condition where one of the posts 124 engages the stop surface 130 to positively stop the actuator 90R in the non-engaging position.

The distance D is dependent upon the angle of the ramp surfaces 114 and the axial displacement needed to fully compress the clutch pack 94; and the amount of relative rotation required to achieve D is dependent upon the distance the contact locations between the cross-shaft and the ramp surfaces are radially spaced from the axis of rotation 40 of the differential. It is beneficial for the gaps G to precisely correspond to the distance D to ensure precise alignment of the cross-shaft 52 with the neutral position 112 when the actuator 90 is in the non-engaged position. In determining the value of G required to achieve a desired value of D, the radial spacing from the axis 40 of the lines of contact of the interlock structures as well as the radial spacing from the axis 40 of the contact locations between the ramps and the cross-shaft are taken into consideration. The degree of relative rotation allowed between the left and right clutch actuators 90L, 90R precisely corresponds to the rotational distance between the fully engaged position and the non-engaged position. This precision is enabled at least in part by the precise nature of the line contact configuration used by the relative rotation limiters (i.e., the post 124 and stop surfaces 128, 130). Such precision ensures that during an overspeed condition, the neutral position 112 of the actuator 90 corresponding to the overspeeding wheel does not rotate past the center of the cross-shaft 52 and inadvertently engage the trailing ramp surface thereby causing the clutch 94 to be re-actuated and the wheel to be unintentionally locked-up. In this way, the durability and lifespan of the differential 22 is enhanced by inhibiting heat and wear associated with unintentional wheel lock-ups and minimization of parasitic driveline losses.

The left and right clutch actuators 90L, 90R also include structure for receiving the clutch pre-load springs 100. For example, as shown in FIGS. 17-20, each of the clutch actuators 90 includes a plurality of through-holes 134 that extend through each clutch actuator 90 from the inboard side 102 to an outboard side 136. The through-holes 134 can define through-hole axes 138 that are parallel with respect to the central axis 110. The through-holes 134 are shown circumferentially spaced about the central axis 110. In the depicted example, four of the through-holes 134 are defined by each of the clutch actuators 90. The through-holes 134 are located between the inner and outer circumferential boundaries B1, B2 of each clutch actuator 90. In the example of FIG. 20, a first of the through-holes 134 is located circumferentially between the first actuator pocket 104 and the post receptacle 126; a second of the through-holes 134 is located circumferentially between the post receptacle 126 and the second actuator pocket 106; a third of the through-holes 134 is located circumferentially between the second actuator pocket 106 and the stop post 124; and a fourth of the through-holes 134 is located circumferentially between the stop post 124 and the first actuator pocket 104.

Figure 31:
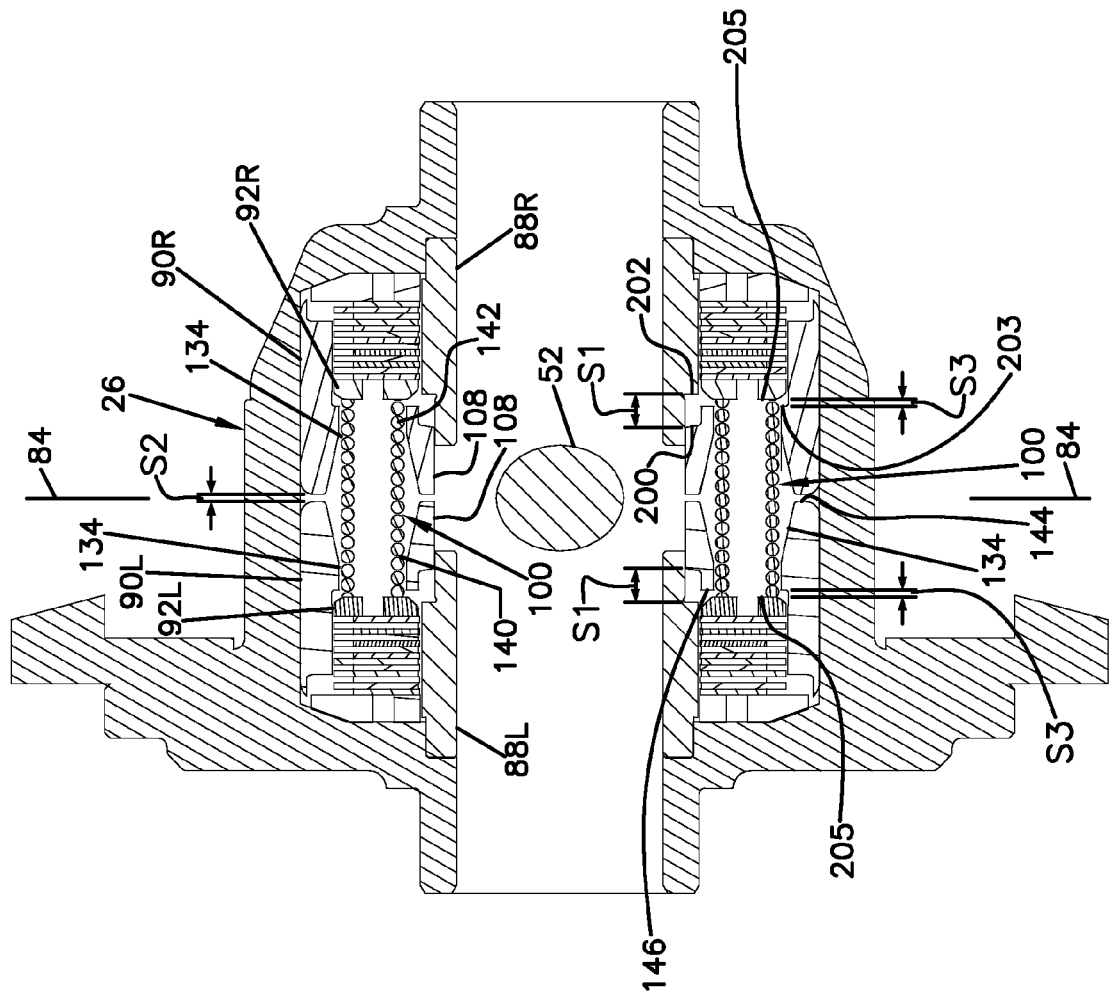
FIG. 31 is a cross sectional view taken along section line 31-31 of FIG. 17.

FIG. 31 is a cross-sectional view showing the assembled torque transfer arrangement 28. As shown at FIG. 31, the pre-load springs 100 are mounted within the through-holes 134 of the left and right clutch actuators 90L, 90R. For example, each of the pre-load springs 100 includes a first portion 140 that extends through one of the through-holes 134 of the left clutch actuator 90L and an second portion 142 that extends through one of the through-holes 134 of the right clutch actuator 90R. The pre-load springs 100 traverse the central reference plane 84 and are compressed between the left and right inboard thrust washers 92L, 92R. In this way, each of the pre-load springs 100 applies a pre-load force to both the left and right clutch packs 94L, 94R without applying pre-load pressure to the left and right clutch actuators 90L, 90R. In the depicted example, each of the through-holes 134 has open inboard and outboard ends 144, 146 and the pre-load springs 100 extend completely through the through-holes 134. A benefit of the pass-through mounting configuration of the pre-load springs 100 is that the pre-loads are equally balanced on both the left and right clutch packs 94L, 94R. This is true even if variations exist in the internal side-to-side comparative measurement between the centerline of the cross-shaft 52 and internal thrust surfaces of the differential casing 26 and or relative axial sizing variations in the left and right clutch actuators 90L, 90R and and/or sizing variations in the clutch packs 94L, 94R themselves. In other words, the pass-through configuration of the pre-load springs is adapted to take-up or otherwise compensate for tolerance mismatches within the differential such that equal pre-loads are applied to both the left and right clutch packs 94L, 94R. The pass-through mounting configuration of the pre-load springs also assist in maintaining uniform pre-loads even in the case of non-uniform clutch wear.

Figure 32:
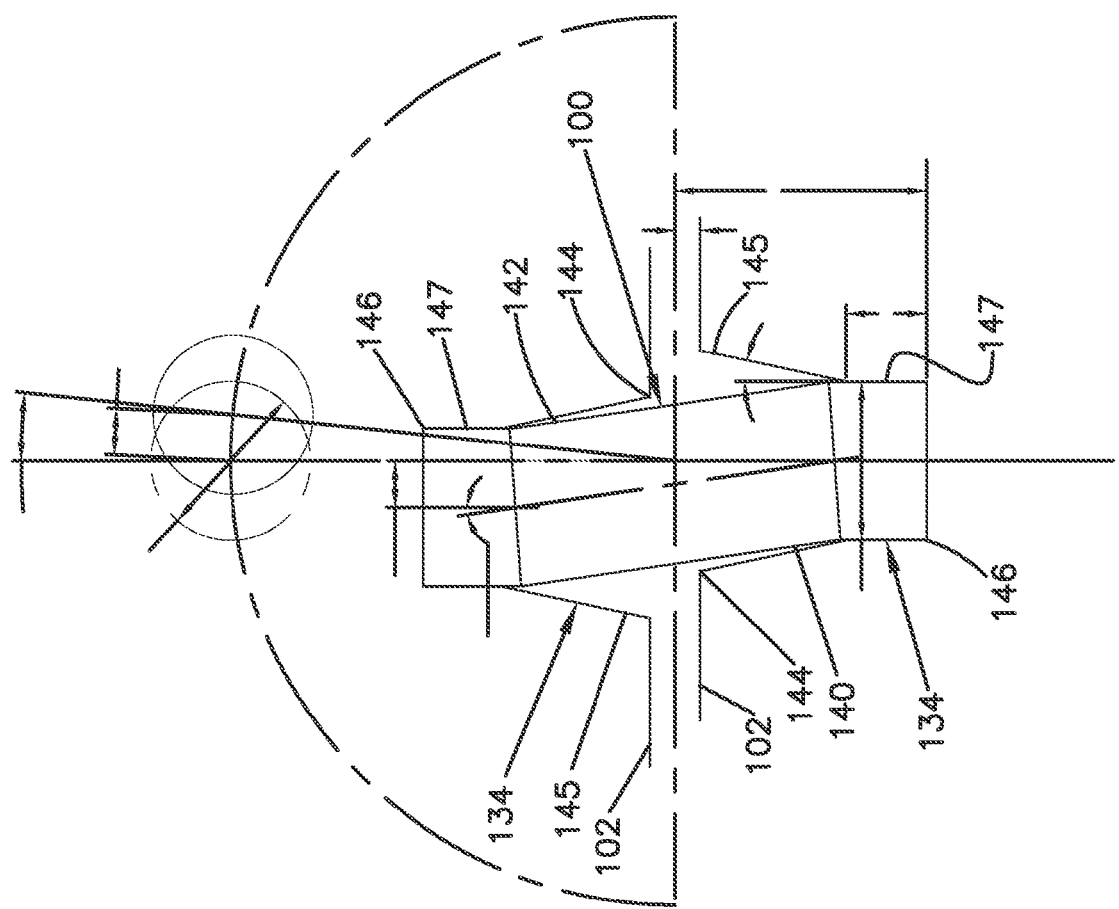
FIG. 32 shows a pre-load spring of the differential torque transfer arrangement of FIG. 13, the pre-load spring is shown deformed in response to relative rotation between clutch housings of the torque transfer arrangement.

Since the pre-load springs 100 extend across the central reference plane 84, it will be appreciated that the pre-load springs 100 flex when the left and right clutch actuators 90L, 90R rotate relative to one another within the range of relative rotational movement allowed by the rotation limiting arrangement (i.e., the stop posts 124 and the post receptacles 126). For example, FIG. 32 shows one of the pre-load springs 100 flexed to accommodate relative rotational movement between the left and right clutch actuators 90L, 90R. This provides torsional rotational dampening between the left and right clutch actuators 90L, 90R. To better allow the pre-load springs 100 to accommodate the limited amount of rotational movement allowed between the left and right clutch actuators 90L, 90R, the through-holes 134 can have a tapered configuration. For example, the through-holes 134 can have truncated conical configuration defining major diameters and minor diameters. In other examples, other taper configurations can be used where the cross-dimensions of the through-holes vary along the lengths of the through holes. In one example, the through holes can have a greater rate of taper in a circumferential orientation as compared to a radial orientation.

As shown at FIG. 31, the through-holes 134 are configured to have tapered portions 145 that provide the through-holes 134 with larger diameters (i.e., major diameters) adjacent the inboard ends 144 as compared to the outboard ends 146. In certain embodiments, the major diameters of the through-holes 134 are located at the inboard sides of the clutch actuators 90. In certain examples, the at least portions of the through-holes 134 can gradually enlarge in diameter as the through-holes 134 extend in inboard directions along the tapered portions 145. In certain examples, the through-holes 134 can have cylindrical, non-tapered portions 147 adjacent the outboard ends 146 of the through-holes 134. The non-tapered portions 147 are located at the roots of the tapered portions 145 and form cylindrical portions that closely fit about end portions of the pre-load springs 100. The non-tapered portions 147 provide a piloting function to fix the position of the ends of the springs 100 relative to the actuators 90 to assist in providing torsional control for dynamic dampening. In one example, the non-tapered portions 147 extend axially for at least one coil length to provide suitable piloting and stabilizing of the ends of the springs 100. The combination of the tapered portions 145 and non-tapered portions 147 assists in optimizing the rotational dampening provided by the pre-load springs 100 between the left and right clutch actuators 90L, 90R.

Figure 30:
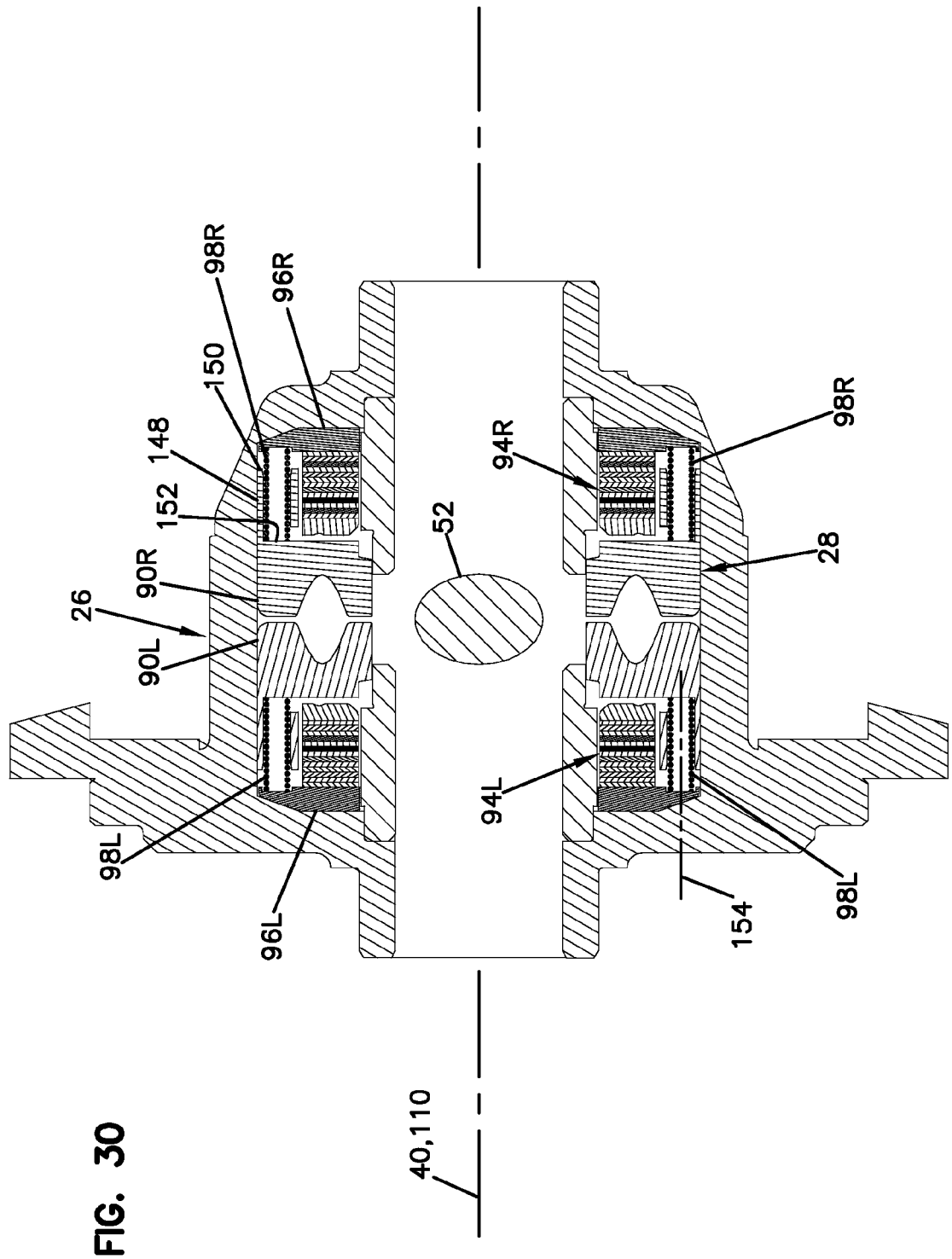
FIG. 30 is a cross sectional view taken along section line 30-30 of FIG. 17.

Referring to FIGS. 17 and 19, the outboard side 136 of each of the clutch actuators 90 includes structure for accommodating the outboard springs 98. For example, the clutch actuators 90 have outboard spring holes 148 for receiving the outboard springs 98. As shown in FIG. 30, the outboard spring holes 148 have open ends 150 at the outboard side 136 of each clutch actuator 90 and closed ends 152 positioned opposite the open ends 150. The outboard spring holes 148 define spring hole axes 154 that are parallel to the central axis 110. The outboard spring holes 148 are circumferentially spaced about the central axis 110 and are positioned near the outer circumferential boundary B2 of each clutch actuator 90.

Referring still to FIGS. 17 and 19, the open ends 150 of the outboard spring holes 148 are positioned within tab pockets 156 defined by the outboard side 136 of each of the clutch actuators 90. The tab pockets 156 are shown having a truncated, triangular shape. In the depicted example, the tab pockets 156 are configured to receive tabs 158 (see FIGS. 13-16) of the outboard thrust washers 96. The tabs 158 can have truncated, triangular shapes that complement the truncated, triangular shapes of the tab pockets 156. The tabs 158 function to retain the outboard springs 98 within the outboard spring holes 148 (see FIGS. 14-16 and 30). When the torque transfer arrangement 28 is assembled, the tabs 158 fit within the tab pockets 156 to provide a keying function that prevents relative rotation between the clutch actuators 90 and the outboard thrust washers 96. The tabs 158 also function to retain the outboard springs 98 within the corresponding outboard spring holes 148. In this regard, the tabs 158 also define locator holes 216 (see FIG. 13) that receive the outboard ends of the outboard springs 98. The locator holes 216 maintain the springs 98 along their functional axes regardless of rotational speed and inertia. The locator holes 216 also prevent the springs 98 from slipping out of position and possibly damaging the differential.

FIG. 30 is a cross-sectional view showing the differential 22. As shown at FIG. 30, when the differential torque transfer arrangement 28 is assembled within the differential case 26, the outboard springs 98 are compressed between the outboard thrust washers 96 and the clutch actuators 90. Thus, the outboard springs 98 function to bias the left and right clutch actuators 90L, 90R together against the cross-shaft 52. The compressive spring load provided by the outboard springs 98 assists in limiting rattle or vibrations between the cross-shaft 52 and the left and right clutch actuators 90L, 90R. In one example, the outboard springs 98 are laterally offset from the clutch packs 94 and do not apply a compressive load through the clutch packs 94. Instead, only the clutch pre-load springs 100 apply pre-load to the clutch packs 94. Since the pre-load springs 100 extend through the through-holes 134 and therefore do not apply pre-load pressure to the clutch actuators 90, the pre-load force provided by the pre-load springs 100 does not oppose the compressive load provided by the outboard springs 98. Thus, the spring loads applied by the outboard springs 98 and the pre-load springs 100 are isolated from one another such that the clutch-pre load applied to the clutches 94 and the compressive load applied to the clutch actuators 90 can be independently established.

In one example, the clutch pre-load applied to each clutch pack allows the clutch packs to transfer a pre-load torque value that is less than a representative wheel slip torque value corresponding to the outside wheel during a turn. The representative wheel slip torque value (i.e., the torque required to have the wheel slip relative to the ground) is dependent upon the gross weight of the vehicle and a selected coefficient of friction between the ground and the wheel that corresponds to a low traction condition.

Figure 27:
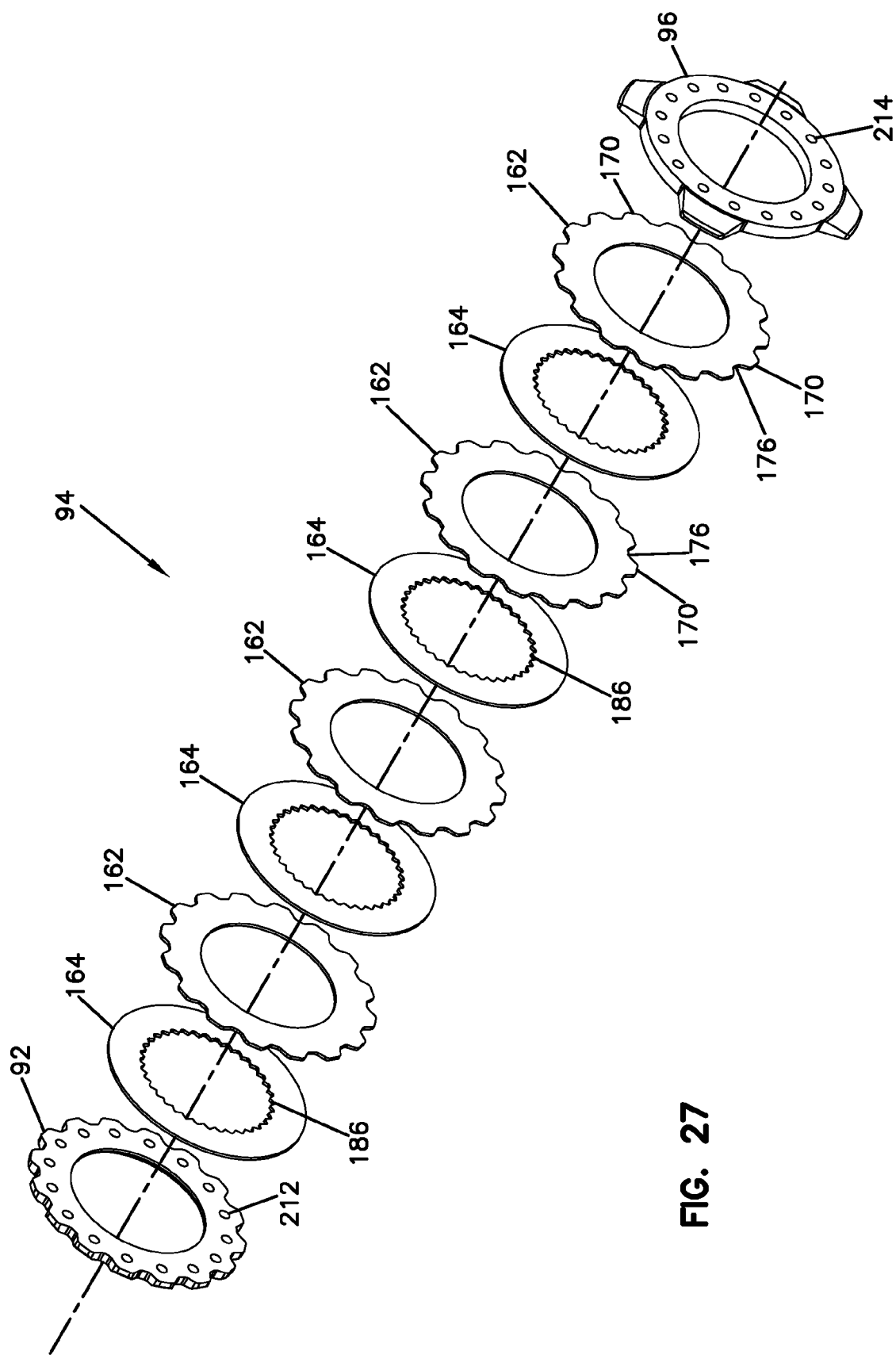
FIG. 27 is an exploded, perspective view of one of the clutch packs of the differential torque transfer arrangement of FIG. 13.

Referring to FIGS. 17 and 19, the outboard sides 136 of the clutch actuators 90 form clutch housings 160 for receiving and housing the clutch packs 94. For example, the outboard sides 136 of the clutch actuators 90 define receptacles for receiving the clutch packs 94. As shown at FIG. 27, each of the clutch packs 94 includes first and second clutch plates 162, 164 (e.g., friction disks) that are interleaved relative to one another. The first clutch plates 162 interface with the clutch actuators 90 at first mechanical interfaces 166 (see FIGS. 28 and 28A) and the second clutch plates 164 interface with the axle hubs 88 at second mechanical interfaces 168 (see FIGS. 28 and 28A). In one example, first mechanical interface 166 is configured to prevent relative rotation between the first clutch plates 162 and the actuators 90 and the second mechanical interface 168 is configured to prevent relative rotation between the second clutch plates 164 and the axle hubs 88. In one example, first and second mechanical interfaces 166, 168 include splined interfaces. It will be appreciated that other types of mechanical interfaces for preventing relative rotation can also be used.

Figure 28:
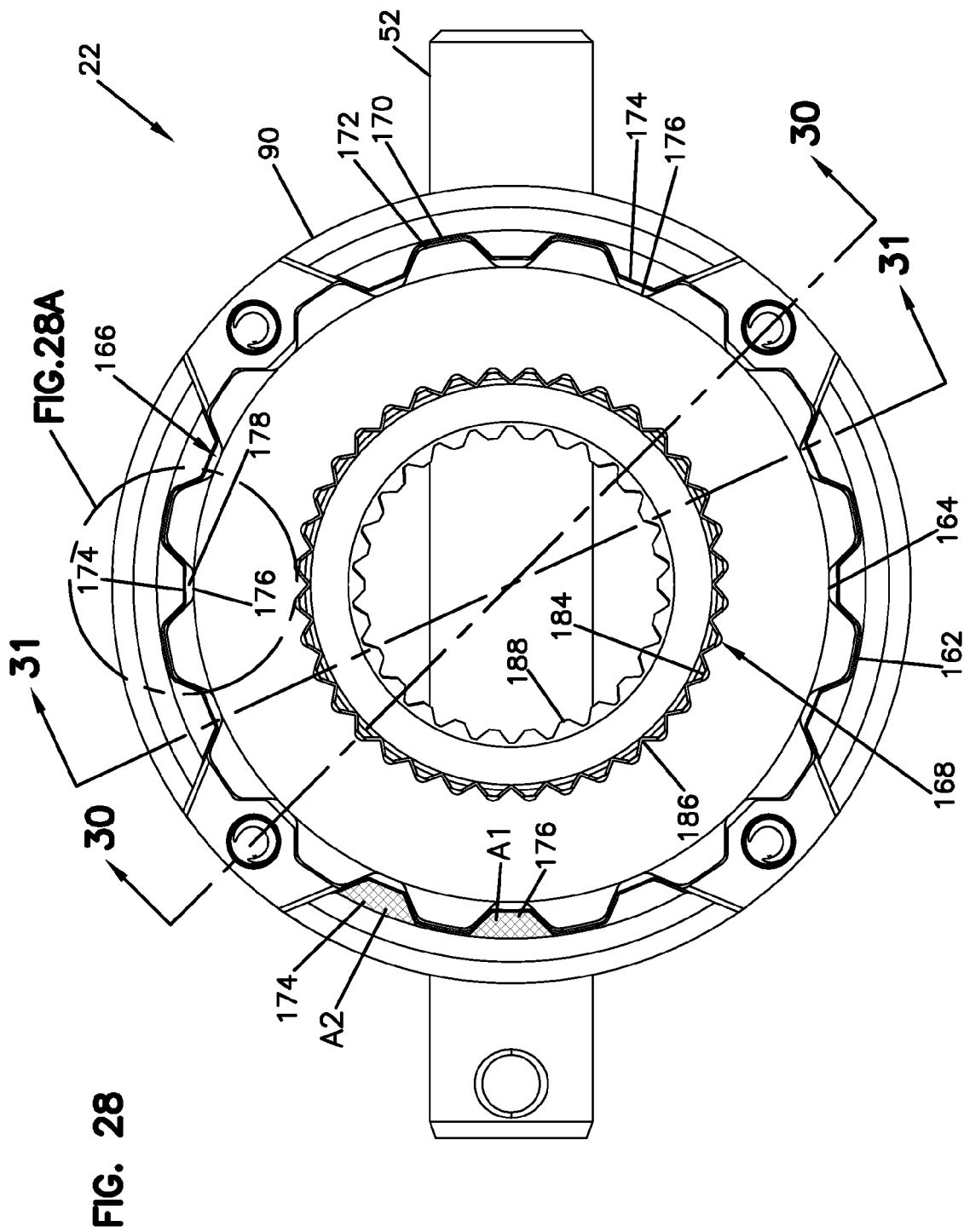
FIG. 28 is an end view of the differential torque transfer arrangement of FIG. 13 with an outboard thrust washer removed.
Figure 28A:
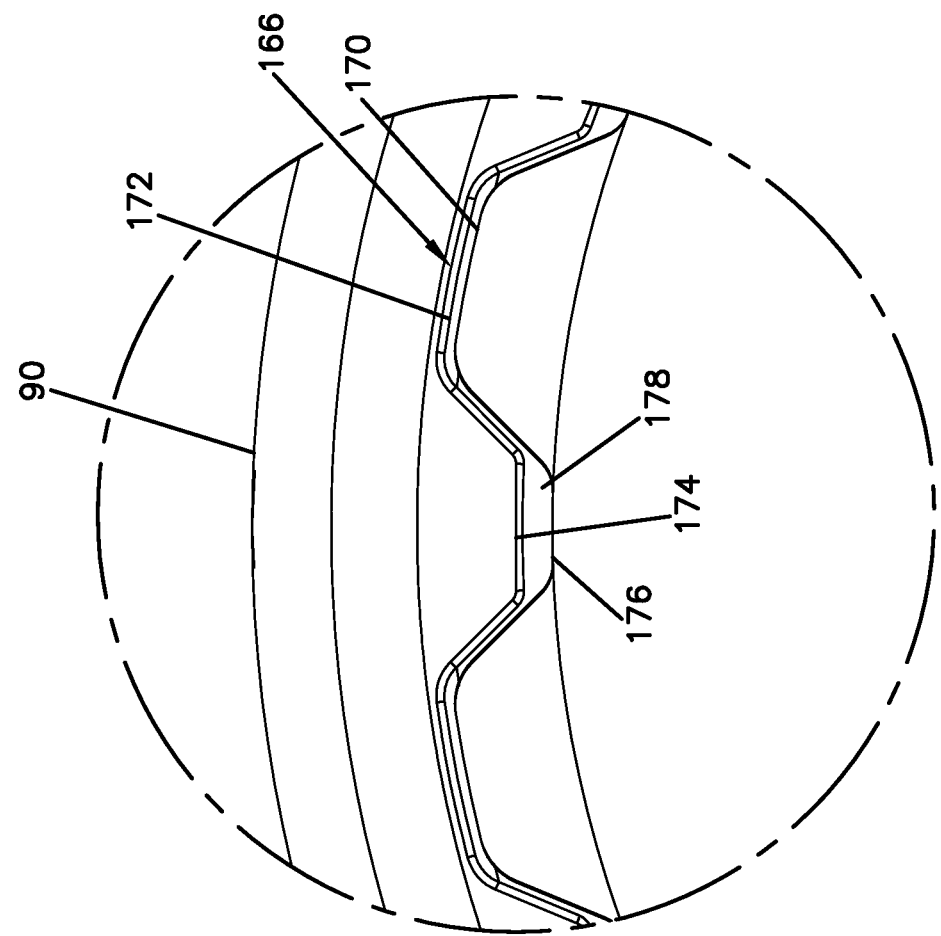
FIG. 28A is an enlarged view of a portion of FIG. 28.

In the depicted example of FIGS. 28 and 28A, the first mechanical interface 166 is a splined interface. For example, the first clutch plates 162 include splines 170 that fit within spline receptacles 172 defined by the clutch actuators 90. Also, the clutch actuators 90 define splines 174 that fit within spline receptacles 176 defined by the first clutch plates 162. In the depicted example, the spline receptacles 176 have transverse cross-sectional areas A1 (see FIG. 28) and the splines 174 have transverse cross-sectional areas A2 (see FIGS. 19 and 28). In one example, the transverse cross-sectional areas A2 of the splines 174 each occupy no more than 85% of the corresponding transverse cross-sectional areas A1 of the spline receptacles 176 in which they are received.

The unoccupied space within the spline receptacles 176 forms axial oil flow paths 178 within the spline receptacles 176 for allowing lubricant (e.g., oil) to escape from between the first and second clutch plates 162, 164 when the clutch packs 94 are actuated. By providing an escape path for the lubricant, the responsiveness of the clutch packs 94 to actuation are enhanced. In the depicted example, the splines 174 have truncated triangular profiles having truncated ends and the spline receptacles 176 include unoccupied portions located adjacent to the truncated ends of the splines 174. The unoccupied portions of the spline receptacles 176 define the axial lubricant flow paths 178. In the depicted example, the spline receptacles 176 have truncated triangular profiles having receptacle heights that are larger than corresponding spline heights of the truncated triangular profiles of splines 174. In the depicted, the axial flow paths 178 are provided at the first mechanical interface 166. In other examples, similar axial flow paths can be provided at the second mechanical interface 168. Additionally, it will be appreciated that spline shapes other than those specifically depicted can also be used.

Referring to FIG. 19, the clutch actuators 90 includes circumferential walls 180 that surround the clutch packs 94 and also surround the axes of rotation 110. The circumferential walls 180 form at least portions of the clutch housings 160. The circumferential walls 180 define openings 182 (see FIGS. 16-18) that provide radial flow paths that allow lubricant (e.g., oil) to escape from between the first and second clutch plates 162, 164 when the clutch packs 94 are compressed together during actuation. The side positioning of the openings 182 allows centrifugal force to assist in exhausting lubricant from the clutch packs 94 through the clutch housings 160. The through-holes 134 receiving the pre-load springs 100 also assist in enlarging the venting area provided for allowing lubricant to escape from between the first and second clutch plates 162, 164 when the clutch packs 94 are compressed together during actuations. In this regard, the through-holes 134 are in fluid communication with annular grooves 200 defined at the interface between the clutch actuators 90 and the inboard sides of the inboard thrust washers 92. In the depicted example, the annular grooves 210 are defined within the inboard sides of the inboard thrust washers 92. The inboard thrust washers 90 also define circumferentially spaced-apart axial through-holes 212 that intersect the annular grooves 210. During actuation of the clutch packs 94, oil/lubricant is pressed from between the clutch plates 160, 162 of the clutch packs 94, travels through the spline receptacles 176 and exits the inboard sides of the clutch packs 94 through the axial through-holes 212. From the axial through-holes 202, the oil/lubricant flows through the annular grooves 210 to the through-holes 134 which provide a path for allowing the oil/lubricant to axially exit the clutch housings 164 of the clutch actuators 90. Circumferentially spaced-apart axial through-holes 214 can also be defined though the outboard thrust washers 96 for venting oil/lubricant out the outboard ends of the clutch packs 94 during axial compression of the clutch packs 94. The effective venting/exhausting of lubricant from the clutch packs 94 assists in improving the responsiveness and actuation time of the clutch packs 94.

Figure 25:
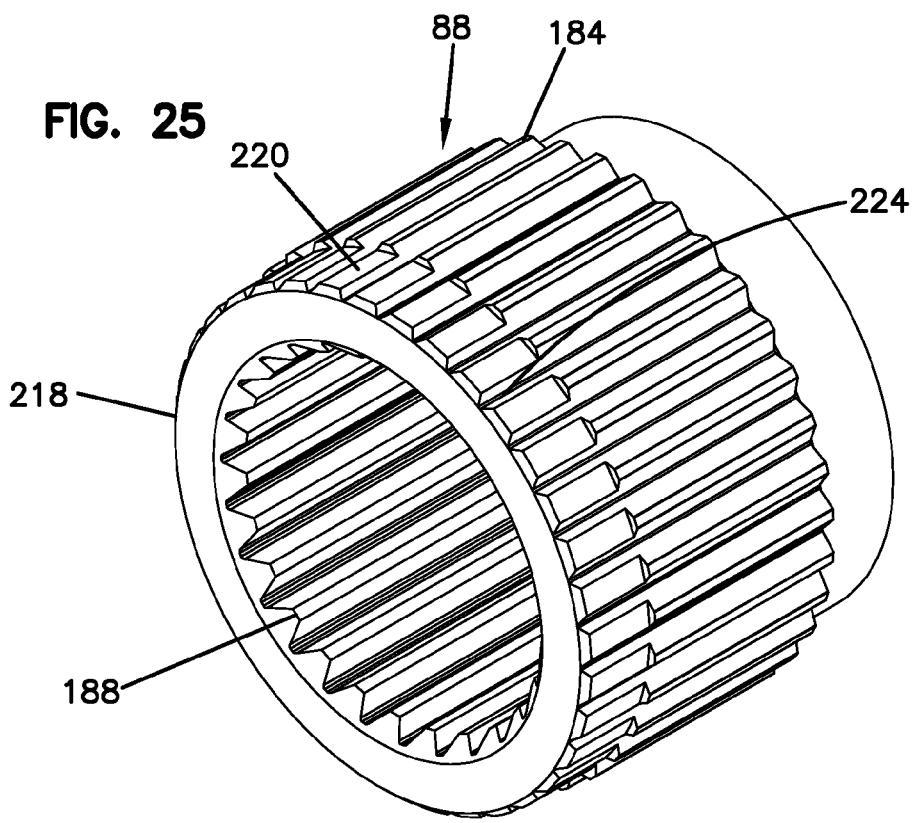
FIG. 25 is a perspective view showing an inboard end of one of the axle hubs of the differential torque transfer arrangement of FIG. 17.
Figure 26:
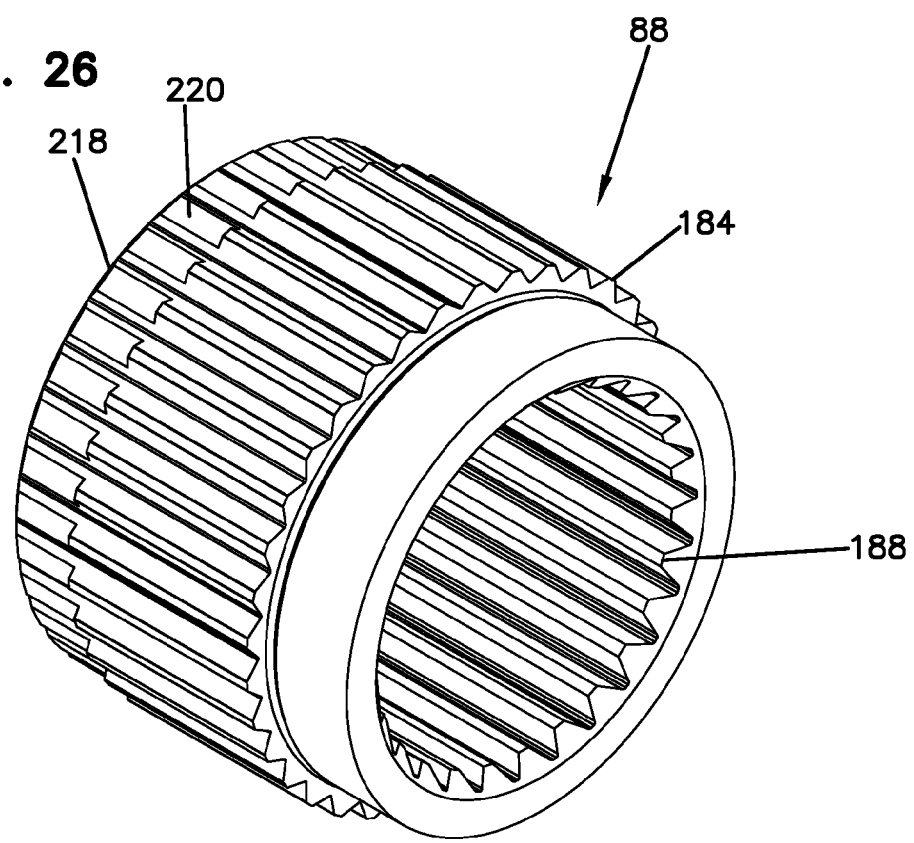
FIG. 26 is a perspective view showing an outboard end of the axle hub of FIG. 25.

Referring to FIGS. 25 and 26, the axle hubs 88 are generally cylindrical in shape and include outer splines 184 that mate with corresponding inner splines 186 (see FIG. 27) of the second clutch plates 164 to form the second mechanical interface 168 (see FIG. 28). As indicated above, the second mechanical interface 168 is configured to prevent relative rotation between the axle hubs 88 and the second clutch plates 164 such that the second clutch plates 164 rotate in unison with the axle hubs 88. Similarly, first mechanical interfaces 166 prevent relative rotation between clutch actuators 90 and the first clutch plates 162 such that the first clutch plates 162 rotate in unison with the clutch actuators 90. The axle hubs 80 are also configured to rotate in unison with the axle shafts 36. For example, the axle shafts 36 can be connected to the axle hubs 88 by mechanical interfaces that prevent relative rotation between the axle hubs 88 and the axle shafts 36. As shown at FIGS. 25 and 26, the axle hubs 88 include inner splines 188 that mate with corresponding outer splines of the axle shafts 36 such that relative rotation is provided between the axle hubs 88 and the axle shafts 36. When the differential 22 is assembled as shown at FIG. 31, the axle hubs 88 extend through the clutch packs 94 and inboard ends of the axle hubs 88 fit within the central openings 108 of the clutch actuators 90.

In use of the differential 22, torque from the drive gear 32 can be used to rotate the differential case 26 in either a forward rotational direction or a reverse rotational direction about the axis of rotation 40. When the differential case 26 is rotated in a forward rotational direction under normal straight driving conditions, the vehicle is propelled in a forward direction. In contrast, when the differential case 26 is rotated in the reverse rotational direction under normal straight driving conditions, the vehicle is propelled in a reverse direction.

When the differential case 26 is rotated in the forward direction under normal straight driving conditions, contact between the cross-shaft 52 and the ramp surfaces 114 of the actuators 90 causes the actuators 90 to be forced in outboard axial directions thereby causing the clutch packs 94 to be actuated. When the clutch packs 94 are actuated, the clutch plates 162, 164 are axially compressed together thereby preventing the clutch plates 162, 164 from rotating relative to one another. When this occurs, forward driving torque is transferred from the cross-shaft 52 through the actuators 90 and the clutch packs 94 to the corresponding axle hubs 88. The axle hubs 88 then transfer the forward driving torque to their corresponding axle shafts 36 which transfer the forward torque to their corresponding wheels 24 thereby causing rotation of the wheels 24 in the forward direction.

When the differential case 26 is rotated in the reverse direction under normal straight driving conditions, contact between the cross-shaft 52 and the ramp surfaces 116 of the actuators 90 causes the actuators 90 to be forced in outboard axial directions thereby causing the clutch packs 94 to be actuated. When the clutch packs 94 are actuated, the corresponding clutch plates 162, 164 are axially compressed together thereby preventing the clutch plates 162, 164 from rotating relative to one another. When this occurs, reverse driving torque is transferred from the cross-shaft 52 through the actuators 90 and the clutch packs 94 to the corresponding axle hubs 88. The axle hubs 88 then transfer the reverse driving torque to their corresponding axle shafts 36 which transfer the reverse torque to their corresponding wheels 24 thereby causing rotation of the wheels 24 in the reverse direction.

When the cross-shaft 52 is aligned with the neutral position 112 of one of the actuation pockets 104, 106, the corresponding clutch pack 94 is not axially compressed by the corresponding actuator 90 and is therefore in a non-actuated state. When the clutch pack 94 is in a non-actuated state, the first clutch plates 162 and the second plates 164 are only subject to pre-load pressure and can rotate relative to one another during a wheel overspeed condition thereby permitting the corresponding axle hub 88 and its corresponding axle shaft 36 to rotate relative to the corresponding actuator 90 during the wheel overspeed condition.

The pre-load provided on the left and right clutch packs 94L, 94R by the pre-load springs 100 insures that proper actuation takes place when the cross-shaft 52 engages the ramp surfaces 116, 118. The pre-load provided by the springs 100 should be large enough such that the clutch packs provide sufficient resistance to rotational movement of the actuators 90 about the axis 40 for the cross-shaft 52 to ride up on the ramps 116, 118 and cause actuation of the clutch packs as differential case 26 and the cross-shaft 52 carried therewith are rotated about the axis 40 during normal driving conditions. Absent the friction between the clutch plates 162, 164 generated by the pre-load, insufficient axial actuation force can be generated by the contact between the cross-shaft 52 and the ramp surfaces 116, 118. In this situation, the cross-shaft 52 would merely rotate the left and right clutch actuators 90L, 90R about the axis of rotation 40 without generating enough force to axially compress and actuate the left and right clutch packs 94L, 94R. Thus, a free-spin condition would exist where torque would not be applied through the clutch packs 94L, 94R to the left and right axle hubs 88L, 88R and their corresponding axle shafts 36L, 36R. When only pre-load pressure is applied to the clutch packs 94, insufficient friction is provided between the clutch plates 162, 164 to prevent the clutch plates from rotating relative to one another during a free-wheel (i.e., wheel overspeed) condition as would occur during a vehicle turn.

Figure 33:
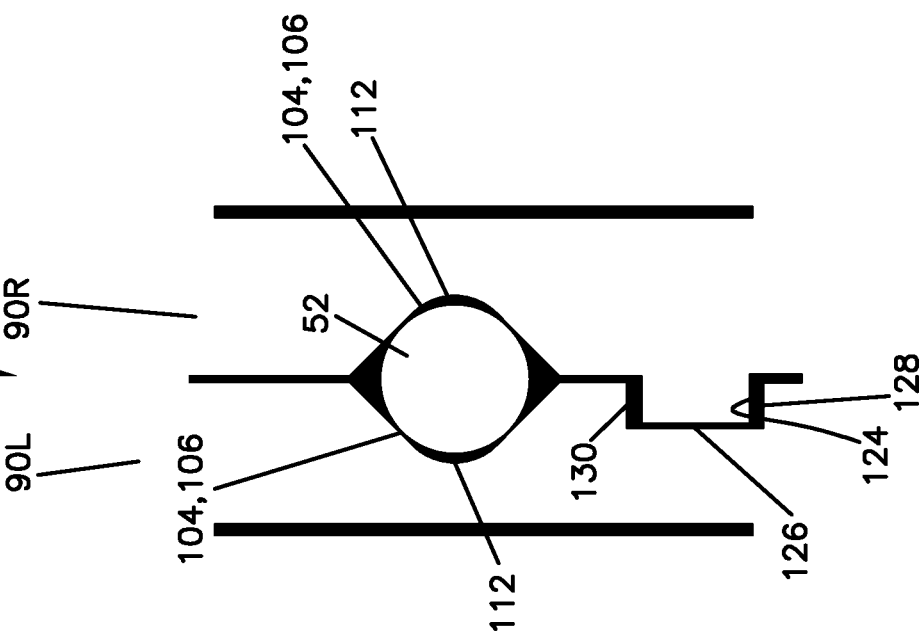
FIG. 33 schematically shows the differential torque transfer arrangement of FIG. 13 oriented in a zero-ring speed condition.

FIGS. 33-37 schematically illustrate various operational states of the differential 22. For example, FIG. 33 shows the differential 22 in a "zero ring speed" state in which no torque is being applied to the differential case 26 by the drive gear 32 and the differential case 26 is not rotating about the axis of rotation 40. In the "zero ring speed" state, the stop posts 124 are centered between the stop surfaces 128, 130 of the post receptacles 126 and the cross-shaft 52 is aligned with the neutral positions 112 of the actuation pockets 104, 106.

Figure 34:
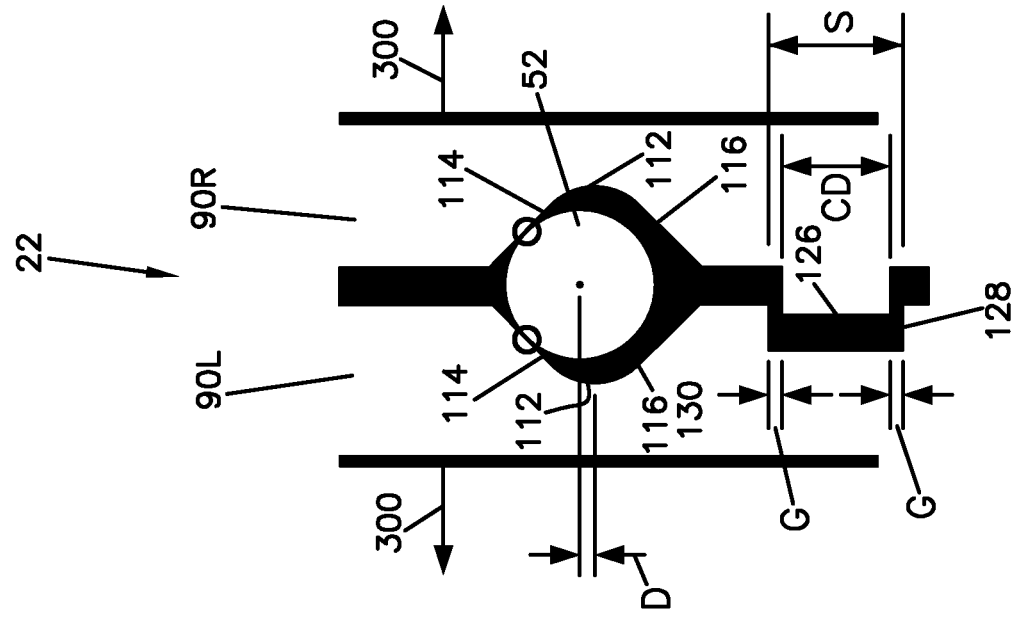
FIG. 34 schematically shows the differential torque transfer arrangement of FIG. 13 in a forward ring drive condition with equal wheel speed.

FIG. 34 shows the differential 22 in a state in which the differential case 26 is being rotated in the forward rotational direction about the axle of rotation 40 by the drive shaft 34 and the vehicle is being driven straight. In this condition, the cross-shaft 52 engages the first ramp surfaces 114 of the left and right clutch actuators 90L, 90R thereby by forcing the left and right clutch actuators 90L, 90R outwardly (see arrows 300) to actuate the left and right clutch packs 94L, 94R by axially compressing the left and right clutch packs 94L, 94R. With the left and right clutch packs 94L, 94R actuated, relative rotation is prevented between the first and second clutch plates 162, 164 of the clutch packs 94L, 94R. Thus, torque from the differential case 26 and the cross-shaft 52 is transferred from the left and right clutch actuators 90L, 90R through the left and right clutch packs 94L, 94R to the left and right axle hubs 88L, 88R and the left and right axle shafts 36L, 36R to cause the left and right wheels 24L, 24R to be rotated in the forward direction. In the forward drive condition of FIG. 34, the stop posts 124 are centered between the stop surfaces 128, 130 of the post receptacles 126. Thus, FIG. 34 shows forward rotational drive with equal wheel speed.

FIG. 35 shows a condition where the differential case 26 is being rotated in the forward direction about the axis of rotation 40 and the left wheel 24L is being rotated in the forward direction faster than the right wheel 24R. This type of condition occurs when the vehicle is making a right turn. When a right turn is being made, the increased speed of the left wheel 24L causes the left clutch actuator 90L to rotate forward relative to the right clutch actuator 90R. As the left clutch actuator 90L rotates forward relative to the right clutch actuator 90R, the first ramp surface 114 of the left clutch actuator 90L disengages from the cross-shaft 52 such that the left clutch pack 94L is no longer actuated. While the left clutch pack 94L is in a non-actuated state, the first and second clutch plates 162, 164 of the left clutch pack 94L can rotate relative to one another thereby allowing the left axle hub 88L and the left axle shaft 36L to rotate faster in a forward direction than the left clutch actuator 90L. In this way, the de-actuation of the left clutch actuator 90L permits the left wheel 24L to rotate at a faster speed in the forward direction as compared to the right wheel 24R. When the differential 22 is operating in the left over-speed condition of FIG. 35, the stop posts 124 contact the stop surfaces 128 to limit the amount of relative rotation that is permitted between the left and right clutch actuators 90L, 90R. This prevents the neutral position 112 of the left actuator 90L from rotating past the cross-shaft 52. In this way, the second ramp surfaces 116 of the left clutch actuator 90L are prevented from contacting the shaft 52. Unintended engagement between the cross-shaft 52 and the second ramp surface 116 during an overspeed condition would cause the left clutch pack 94L to be actuated which would lock-up the left wheel.

FIG. 36 shows the differential 22 in a condition in which the differential case 26 is being driven in a forward rotational direction about the axis of rotation 40 and the right wheel 24R is rotating at a higher speed than the left wheel 24L. This condition would occur when the vehicle is making a left turn. When a left turn takes place, the right clutch actuator 90R rotates forwardly relative to the left clutch actuator 90L causing the first ramp surfaces 114 of the right clutch actuator to disengage from the cross-shaft 52 such that the right clutch pack 94R is de-actuated. With the right clutch pack 94R de-actuated, the right axle hub 88R and is corresponding right axle shaft 36R are permitted to rotate relative to the right clutch actuator 90R to allow the right wheel 24R to rotate faster in a forward direction than the left wheel 24L. Contact between the stop posts 124 and the second stop surfaces 130 limit relative rotation between the right clutch actuator 90R and the left clutch actuator 90L to prevent the second ramp surfaces 116 of the right clutch actuator 90R from engaging the cross-shaft 52 as the right wheel 24R rotates at a higher forward speed than the left wheel 24L. Rotation of the right clutch actuator 90R relative to the left clutch actuator 90L stops when the neutral position 112 of the right clutch actuator 90R aligns with the cross-shaft 52. With the right clutch 94R disengaged, contact between the cross-shaft 52 and the first ramp surfaces 114 of the left clutch actuator 90L continues such that the left clutch pack 94L remains actuated by force 300 such that torque continues to be transferred to the left axle shaft 36L.

Figure 37:
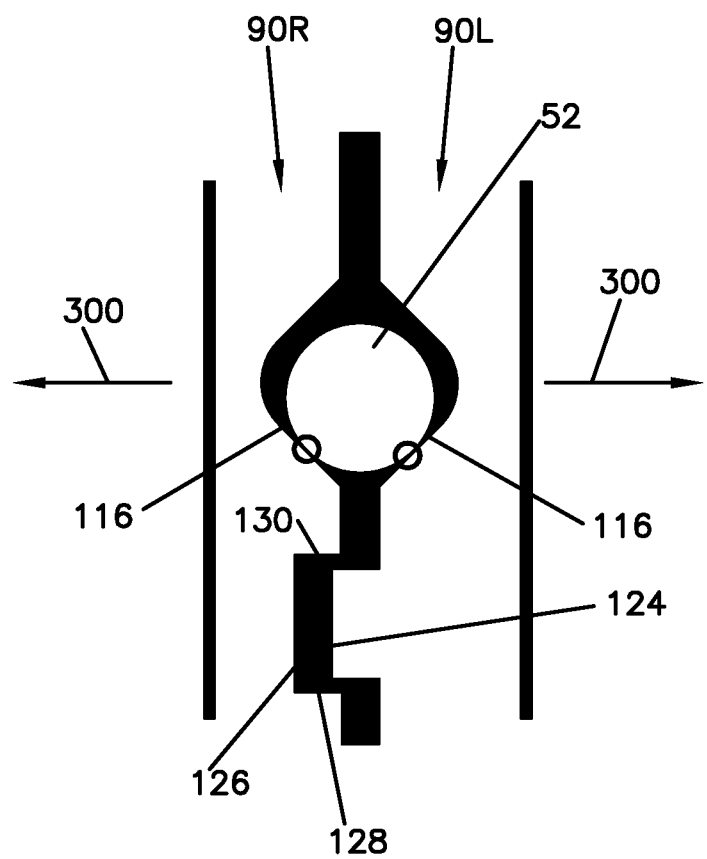
FIG. 37 schematically shows the differential torque transfer arrangement of FIG. 13 in a reverse ring drive condition with equal wheel speed.

FIG. 37 shows the differential 22 in a condition where the differential case 26 is being rotated in a reverse rotational direction and the vehicle is being driven straight. In this condition, the cross-shaft 52 engages the second ramp surfaces 116 causing the left and right clutch actuators 90L, 90R to be forced axially outwardly to actuate the left and right clutch packs 94L, 94R via forces 300. With the left and right clutch packs 94L, 94R actuated, reverse torque is transferred equally to the left and right axle hubs 88L, 88R, and their corresponding left and right axle shafts 36L, 36R thereby causing the left and right wheels 24L, 24R to be driven rearwardly at the same speed. As shown at FIG. 37, while the wheels 24L, 24R are being driven rearwardly at the same speed by torque transferred through the differential 22, the stop posts 124 are centered between the stop surfaces 128, 130. While the vehicle is being driven in the reverse direction, it will be appreciated that the differential 22 can accommodate over speed of the left and right wheels in the same manner described with respect to the forward direction.

For assembly purposes, the main assembly 50 of the torque transfer arrangement 28 is moveable between an axially extended configuration (see FIG. 31) and an axially compressed configuration (see FIG. 38). The axially extended configuration corresponds with the configuration of the main assembly 50 of the torque transfer arrangement 28 when the torque transfer arrangement 28 is installed within the differential case 26 and the cross-shaft 52 has been inserted within the shaft receptacle 58 of the main assembly 50 of the differential torque transfer arrangement 28. The main assembly 50 of the differential torque transfer arrangement 28 has a configuration that allows the main assembly 50 to be moved to the axially compressed configuration of FIG. 38 when the cross-shaft 52 is not present within the shaft receptacle 58. For example, as shown at FIG. 31, first spacings S1 are defined between a shoulder 200 of each clutch actuator 90 and an opposing shoulder 202 of each axle hub 88; a second spacing S2 is defined between the inboard sides 102 of the clutch actuators 90; and third spacings S3 are defined between inboard sides 205 of the inboard thrust washers 92 and opposing shoulders 203 of the actuators 90. With the cross-shaft 52 is removed from the shaft receptacle 58, the main assembly 50 can be axially compressed by sliding the axle hubs 88 inwardly relative to the clutch actuators 90 to take up the spacings S1, by sliding clutch actuators 90 together to take up the spacing S2 and by sliding the clutch packs 94 and thrust washers 92, 96 inwardly against the bias of the pre-load springs 100 to take-up the spacings S3.

FIG. 38 shows the differential 22 in the axially compressed configuration. In the axially compressed configuration, the main assembly 50 of the torque transfer arrangement 28 has an axial length L1 that is smaller than a corresponding primary axial length L2 (see FIG. 10) of the main side openings 54 of the differential case 26. With the main assembly 50 of the differential torque transfer arrangement 28 in the axially compressed configuration of FIG. 38, the main assembly 50 can be inserted laterally into the interior of the differential case 26 through one of the main side openings 54. Once the main assembly 50 has been loaded into the interior of the differential case 26, the shaft receptacle 58 of the main assembly 50 can be aligned with the shaft openings 56 of the differential case 26 and the cross-shaft 52 can be inserted through the shaft openings 56 and the shaft receptacle 58. As the cross-shaft 52 is inserted into the shaft receptacle 58, the axle hubs 88 are forced axially outwardly to open the spacings S1 and the clutch actuators 90 are forced apart to open the spacing S2. Thus, insertion of the cross-shaft 52 through the shaft receptacle 58 moves the main assembly 50 of the differential torque transfer arrangement 28 from the axially compressed configuration of FIG. 38 to the axially expanded configuration of FIGS. 30 and 31. It will be appreciated that a fixture or other handling tool can be used to hold the main assembly 50 in the axially compressed configuration of FIG. 38 while the main assembly 50 is loaded into the differential case 26. Once the main assembly 50 is released from the fixture within the differential case 26, spring load from the pre-load springs 100 can force the clutch packs 94 and thrust washers 92, 96 in outboard direction to open the spacings S3.

As shown at FIG. 12, with the main assembly 50 in the axially extended orientation, outboard ends 218 of the axle hubs 88 fit within the left and right pockets 78L, 78R of the differential case 26 such that the main assembly 50 is captured within the differential case 26. The outboard ends 218 include outer bearing surfaces 220 that engage corresponding cylindrical surfaces 222 of the pockets 78. The outer bearing surfaces 220 define outer bearing diameters BD of the axle hubs 88. Additionally, the left and right outboard thrust washers 96L, 96R abut against the left and right stops 79L, 79R such that the compression load of the outboard springs 98 and the clutch pre-load of the springs 100 are applied against the differential case 26 through the outboard thrust washers 96. Thus, once assembled, the clutch packs 94 can be effectively axially compressed between clutch actuators 90 and the differential case 26. Also, the outboard springs 98 are axially compressed between clutch actuators 90 and the tabs of the outboard washers 98 that bear against the differential case 26. The assembly of the differential 22 is completed by inserting the locking pin 60 in place to prevent the cross-shaft 52 from disengaging from the shaft openings 56.

The outer bearing diameters BD of the axle hubs 88 are larger than the inner diameters defined by the inner splines 186 of the of the second clutch plates 164. As shown at FIGS. 25 and 26, serrations 224 (i.e., receptacles, notches, spline receivers, etc.) are defined within the outer bearing surfaces 220 in alignment with the valleys of the outer splines 184 of the axle hubs 88. When the main assembly 50 is moved to the axially compressed orientation, the teeth of the inner splines 184 of at least some of the second clutch plates 164 slide axially into corresponding serrations 224 defined at adjacent the bearing surfaces 220. In this way, the serrations 224 provide a keying function for maintaining rotational alignment between the teeth of the inner splines 186 and the valleys of their corresponding outer splines 184 when the main assembly is in the axially compressed orientation. Thus, because of this keying function, the inner splines 186 readily mate with their corresponding outer splines 184 when the main assembly 50 is moved from the axially compressed orientation back to the axially extended orientation. Maintaining rotational alignment of the splines 184, 186 is significant because once pre-load is applied to the clutch packs 94, providing relative rotation between the clutch plates 162, 164 would be difficult and could cause damage to the clutch plates 162, 164. In other embodiments, the clutch plates can have main splines defining an inner diameter larger than the outer diameter of the bearing surfaces, and a limited number (e.g., three) of keying splines defining an inner diameter smaller than the outer diameter of the bearing surfaces. The keying splines can fit within keying receptacles defined within the bearing surfaces when the differential is collapsed to maintain rotational alignment of the clutch plates relative to the main splines. Because a reduced number of keying splines is provided, the amount the bearing surfaces are interrupted by the keying receptacles is reduced thereby providing a greater bearing surface area.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A differential comprising:
a differential case adapted to be rotated about an axis of rotation;
a cross-shaft operatively coupled to the differential case such that the cross-shaft and the differential case rotate together about the axis of rotation;
left and right clutch actuators having opposing inboard sides between which the cross-shaft is positioned;
left and right axle hubs positioned on opposite sides of the cross-shaft; a left clutch pack that prevents relative rotation between the left clutch actuator and the left axle hub about the axis of rotation when a left clutch engagement pressure is applied to the left clutch pack;
a right clutch pack that prevents relative rotation between the right clutch actuator and the right axle hub about the axis of rotation when a right clutch engagement pressure is applied to the right clutch pack;
a rotation limiting arrangement at the inboard sides of the left and right clutch actuators for limiting relative rotation between the left and right clutch actuators about the axis of rotation, the rotation limiting arrangement including a limiter captured between first and second stop surfaces which cooperate to define a limited range of relative rotational movement between the left and right clutch actuators, wherein the limiter has a first location that makes line contact with the first stop surface to stop relative rotation in a first rotational direction between the left and right clutch actuators, and wherein the limiter has a second location that makes line contact with the second stop surface to stop relative rotation in a second rotational direction between the left and right clutch actuators, the first rotational direction being opposite from the second rotational direction; and wherein contact between the cross-shaft and a ramp surface at the inboard side of the left clutch actuator causes the left clutch engagement pressure to be applied to the left clutch pack, and wherein contact between the cross-shaft and a ramp surface at the inboard side of the right clutch actuator causes the right clutch engagement pressure to be applied to the right clutch pack.

2. The differential of claim 1, wherein the limiter is a post including a curved side surface, wherein a first portion of the curved side surface defines the first location, and wherein a second portion of the curved side surface defines the second location.

3. The differential of claim 2, wherein the first and second stop surfaces are planar.

4. The differential of claim 1, wherein the limiter is centered between the first and second stop surfaces when the cross-shaft concurrently contacts the ramp surfaces of both the left and right clutch actuators.

5. The differential of claim 1, wherein the limiter is carried with the left clutch actuator and the first and second stop surfaces are carried with the right clutch actuator.

6. The differential of claim 1, wherein the limiter is carried with the right clutch actuator and the first and second stop surfaces are carried with the left clutch actuator.

7. The differential of claim 1, wherein the limiter is carried with one of the left and right clutch actuators, wherein the first and second stop surfaces are carried with the other of the left and right clutch actuators.

8. The differential of claim 7, wherein the inboard sides of the left and right clutch actuators define pockets that cooperate to define a shaft receptacle that receives the cross-shaft, and wherein each pocket includes first and second ramp surfaces that are angled relative to one another so as to converge toward a neutral position positioned between the first and second ramp surfaces, wherein the left engagement pressure is not applied to the left clutch pack when the cross-shaft aligns with the neutral position of the left clutch actuator, and wherein the right engagement pressure is not applied to the right clutch pack when the cross-shaft aligns with the neutral position of the right clutch actuator.

9. The differential of claim 8, wherein the limiter contacts the first stop surface when the cross-shaft is in engagement with the first ramp surface of the left clutch actuator and the cross-shaft is in alignment with the neutral position of the right clutch actuator, and wherein the limiter contacts the second stop surface when the cross-shaft is in engagement with the first ramp surface of the right clutch actuator and the cross-shaft is in alignment with the neutral position of the left clutch actuator.

10. A differential comprising:
a differential case adapted to be rotated about an axis of rotation;
a cross-shaft operatively coupled to the differential case such that the cross-shaft and the differential case rotate together about the axis of rotation;
left and right clutch actuators having opposing inboard sides between which the cross-shaft is positioned, the inboard sides of the left and right clutch actuators defining pockets that cooperate to define a shaft receptacle that receives the cross-shaft, and each pocket including first and second ramp surfaces that are angled relative to one another so as to converge toward a neutral position positioned between the first and second ramp surfaces;
left and right axle hubs positioned on opposite sides of the cross-shaft; a left clutch pack that prevents relative rotation between the left clutch actuator and the left axle hub about the axis of rotation when a left clutch engagement pressure is applied to the left clutch pack;
a right clutch pack that prevents relative rotation between the right clutch actuator and the right axle hub about the axis of rotation when a right clutch engagement pressure is applied to the right clutch pack;
a rotation limiting arrangement at the inboard sides of the left and right clutch actuators for limiting relative rotation between the left and right clutch actuators about the axis of rotation, the rotation limiting arrangement including a post and a post
receptacle provided at the inboard side of each of the left and right clutch actuators, the post receptacles each being located between opposing first and second stop surfaces, the post of the left clutch actuator being received within the post receptacle of the right clutch actuator and the post of the right clutch actuator being received within the post receptacle of the left clutch actuator, wherein the posts have first curved locations that make line contact with the first stop surfaces to stop relative rotation in a first rotational direction between the left and right clutch actuators, and wherein the posts have second curved locations that makes line contact with the second stop surfaces to stop relative rotation in a second rotational direction between the left and right clutch actuators, the first rotational direction being opposite from the second rotational direction; and
wherein contact between the cross-shaft and the first or second ramp surface at the inboard side of the left clutch actuator causes the left clutch engagement pressure to be applied to the left clutch pack, wherein contact between the cross-shaft and the first or second ramp surface at the inboard side of the right clutch actuator causes the right clutch engagement pressure to be applied to the right clutch pack, wherein the left engagement pressure is not applied to the left clutch pack when the cross-shaft aligns with the neutral position of the left clutch actuator, and wherein the right engagement pressure is not applied to the right clutch pack when the cross-shaft aligns with the neutral position of the right clutch actuator.

11. The differential of claim 10, wherein the posts include cylindrical side surfaces, wherein first portions of the cylindrical side surfaces define the first curved locations, and wherein second portions of the cylindrical side surfaces define the second curved locations.

12. The differential of claim 11, wherein the first and second stop surfaces are planar.

13. The differential of claim 10, wherein the posts are centered between the first and second stop surfaces when the cross-shaft concurrently contacts the first ramp surfaces of both the left and right clutch actuators, and wherein the posts are also centered between the first and second stop surfaces when the cross-shaft concurrently contacts the second ramp surfaces of both the left and right clutch actuators.

14. The differential of claim 13, wherein the posts contact the first stop surfaces when the cross-shaft is in engagement with the first ramp surface of the left clutch actuator and the cross-shaft is in alignment with the neutral position of the right clutch actuator, and wherein the posts contact the second stop surfaces when the cross-shaft is in engagement with the first ramp surface of the right clutch actuator and the cross-shaft is in alignment with the neutral position of the left clutch actuator.

15. A differential comprising:
- a differential case adapted to be rotated about an axis of rotation;
- a cross-shaft operatively coupled to the differential case such that the cross-shaft and the differential case rotate together about the axis of rotation;
- left and right clutch housings having opposing inboard sides between which the cross-shaft is positioned;
- left and right axle hubs positioned on opposite sides of the cross-shaft; a left clutch pack positioned within the left clutch housing that prevents relative rotation between the left clutch housing and the left axle hub about the axis of rotation when a left clutch engagement pressure is applied to the left clutch pack;
- a right clutch pack positioned within the right clutch housing that prevents relative rotation between the right clutch actuator and the right axle hub about the axis of rotation when a right clutch engagement pressure is applied to the right clutch pack;
- the left and right clutch packs each including first and second clutch plates that are interleaved with respect to each other, the first clutch plates interfacing with the left and right clutch housings at first spline interfaces and the second clutch plates interfacing with left and right axle hubs at second spline interfaces;
- the first and second spline interfaces including splines that fit within spline receptacles, the spline receptacles defining transverse cross-sectional areas, and wherein at least some of the splines include first splines having transverse cross-sectional areas that occupy no more than 85 percent of the cross-sectional areas of the spline receptacles in which they are received such that axial oil flow paths are defined within the spline receptacles for allowing oil to escape from between the first and second clutch plates when the left and right clutch packs are actuated; and
- wherein contact between the cross-shaft and a ramp surface at the inboard side of the left clutch actuator causes the left clutch engagement pressure to be applied to the left clutch pack, and wherein contact between the cross-shaft and a ramp surface at the inboard side of the right clutch actuator causes the right clutch engagement pressure to be applied to the right clutch pack.

16. The differential of claim 15, wherein the first splines have truncated triangular profiles having truncated ends, wherein the spline receptacles include unoccupied portions located adjacent to the truncated ends of the first splines, and wherein the unoccupied portions of the spline receptacles define the axial oil flow paths.

17. The differential of claim 16, wherein the spline receptacles have truncated triangular profiles having receptacle heights that are larger than corresponding spline heights of the truncated triangular profiles of the first splines.

18. The differential of claim 16, wherein the first splines are provided at the first spline interfaces.

19. The differential of claim 16, wherein the left and right clutch packs include circumferential walls that surround the left and right clutch packs and also surround the axis of rotation, the circumferential walls defining openings that provide radial flow paths for allowing oil to escape from between the first and second clutch plates when the left and right clutch packs are actuated.

20. The differential of claim 15, wherein the left and right clutch housings define through-holes that receive pre-load springs for applying pre-load pressure to the left and right clutch packs, and wherein the cross-sectional areas of the spline receptacles are in fluid communication with the through-holes such that the oil from the axial oil flow paths defined by the cross-sectional areas can be directed through the through-holes during actuation of the left or right clutch pack.

* * * * *